(12) United States Patent
Ober et al.

(10) Patent No.: US 9,410,016 B2
(45) Date of Patent: *Aug. 9, 2016

(54) AROMATIC POLYACETALS AND ARTICLES COMPRISING THEM

(71) Applicant: ROHM AND HAAS ELECTRONIC MATERIALS LLC, Marlborough, MA (US)

(72) Inventors: Matthias S. Ober, Midland, MI (US); Duane R. Romer, Midland, MI (US); John B. Etienne, Mount Pleasant, MI (US); Pulikkottil J. Thomas, Midland, MI (US)

(73) Assignee: DOW GLOBAL TECHNOLOGIES LLC, Midland, MI (US)

(*) Notice: Subject to any disclaimer, the term of this patent is extended or adjusted under 35 U.S.C. 154(b) by 183 days.

This patent is subject to a terminal disclaimer.

(21) Appl. No.: 13/943,169

(22) Filed: Jul. 16, 2013

(65) Prior Publication Data

US 2015/0025278 A1    Jan. 22, 2015

(51) Int. Cl.
  *C08G 65/38*  (2006.01)
  *C08G 65/40*  (2006.01)
  (Continued)

(52) U.S. Cl.
  CPC .............. *C08G 65/40* (2013.01); *C08G 65/38* (2013.01); *C08G 65/485* (2013.01); *C08G 2650/12* (2013.01)

(58) Field of Classification Search
  CPC ....................................................... C08G 65/00
  USPC ....................................................... 568/592
  See application file for complete search history.

(56) References Cited

U.S. PATENT DOCUMENTS

| 2,760,863 A | 8/1956 | Plambeck, Jr. |
| 2,850,445 A | 9/1958 | Oster |

(Continued)

FOREIGN PATENT DOCUMENTS

| CN | 102584741 A | 7/2012 |
| DE | 19710614 | 9/1998 |

(Continued)

OTHER PUBLICATIONS

Carvalho et al., "2,2',3,3',5,5'-Hexaphenyl-[1,1'-Biphenyl]-4,4'-Diols as Monomer units for redox polymers: Synthesis and Polymerization Strategies," Journal of Macromolecular Science—Pure and Applied Chemistry, A30 (6&7), pp. 385-397 (1993).*

(Continued)

*Primary Examiner* — Randy Gulakowski
*Assistant Examiner* — Ha Nguyen
(74) *Attorney, Agent, or Firm* — Cantor Colburn LLP

(57) ABSTRACT

A polymer includes repeat units having the structure

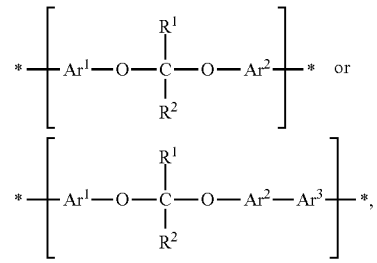

wherein $R^1$, $R^2$, $Ar^1$, $Ar^2$, and $Ar^3$ are defined herein. The polymer can be prepared by Suzuki polycondensation. The acetal and/or ketal functionality in the polymer backbone make the backbone-cleavable in acid. The polymer is useful in applications including lithographic photoresists.

10 Claims, 1 Drawing Sheet

(51) Int. Cl.
*C08G 65/48* (2006.01)
*C07C 43/23* (2006.01)
*C07C 43/21* (2006.01)

(56) References Cited

U.S. PATENT DOCUMENTS

| | | | |
|---|---|---|---|
| 2,875,047 | A | 2/1959 | Oster |
| 3,081,343 | A | 3/1963 | Merten et al. |
| 3,097,096 | A | 7/1963 | Oster |
| 3,427,161 | A | 2/1969 | Laridon et al. |
| 3,479,185 | A | 11/1969 | Chambers, Jr. |
| 3,519,605 | A | 7/1970 | Takekoshi |
| 3,549,367 | A | 12/1970 | Chang et al. |
| 4,180,646 | A | 12/1979 | Choi et al. |
| 4,189,323 | A | 2/1980 | Buhr |
| 4,343,885 | A | 8/1982 | Reardon, Jr. |
| 4,442,197 | A | 4/1984 | Crivello et al. |
| 4,603,101 | A | 7/1986 | Crivello |
| 4,624,912 | A | 11/1986 | Zweifel et al. |
| 4,898,928 | A | 2/1990 | Heller et al. |
| 5,204,442 | A | 4/1993 | Nye |
| 5,344,742 | A | 9/1994 | Sinta et al. |
| 5,512,207 | A | 4/1996 | Manero et al. |
| 5,550,236 | A | 8/1996 | Schlosser et al. |
| 5,597,854 | A | 1/1997 | Birbaum et al. |
| 5,710,121 | A | 1/1998 | Tracy et al. |
| 5,728,835 | A | 3/1998 | Aoki et al. |
| 5,801,288 | A | 9/1998 | Fujii et al. |
| 5,837,712 | A | 11/1998 | Losel et al. |
| 5,847,149 | A | 12/1998 | Fuss et al. |
| 5,919,930 | A | 7/1999 | Haber et al. |
| 6,008,266 | A | 12/1999 | Kuczynski et al. |
| 6,531,291 | B1 | 3/2003 | Kabbash et al. |
| 6,670,387 | B1 | 12/2003 | Luengo et al. |
| 6,867,250 | B1 | 3/2005 | Gupta et al. |
| 6,878,374 | B2 | 4/2005 | Yu et al. |
| 7,097,919 | B2 | 8/2006 | Suzuki |
| 7,442,797 | B2 | 10/2008 | Itoh et al. |
| 7,632,630 | B2 | 12/2009 | Mori et al. |
| 7,892,344 | B2 | 2/2011 | Reipen et al. |
| 8,128,848 | B2 | 3/2012 | Reipen et al. |
| 8,431,325 | B2 | 4/2013 | Hashimoto et al. |
| 8,617,723 | B2 | 12/2013 | Stoessel |
| 2002/0099070 | A1 | 7/2002 | Agrios |
| 2004/0254327 | A1 | 12/2004 | Boyles et al. |
| 2005/0164119 | A1 | 7/2005 | Maeda et al. |
| 2006/0025548 | A1 | 2/2006 | Boussie et al. |
| 2006/0052554 | A1 | 3/2006 | Boussie et al. |
| 2006/0199080 | A1 | 9/2006 | Amine et al. |
| 2007/0103060 | A1 | 5/2007 | Itoh et al. |
| 2008/0033140 | A1 | 2/2008 | Alkatout et al. |
| 2009/0137681 | A1 | 5/2009 | Sinclair et al. |
| 2009/0142681 | A1 | 6/2009 | Reipen et al. |
| 2009/0209533 | A1 | 8/2009 | Zablocki et al. |
| 2012/0141939 | A1 | 6/2012 | Thackeray et al. |

FOREIGN PATENT DOCUMENTS

| | | | |
|---|---|---|---|
| DE | 102008032092 | A1 | 1/2010 |
| EP | 0164248 | A2 | 12/1985 |
| EP | 0182188 | A2 | 5/1986 |
| EP | 0232972 | A2 | 8/1987 |
| EP | 0474596 | A1 | 3/1992 |
| GB | 1185765 | | 3/1970 |
| JP | 04142331 | A * | 5/1992 |
| JP | 200366610 | A | 3/2003 |
| JP | 2006008953 | A | 1/2006 |
| JP | 2007284402 | A | 11/2007 |
| JP | 2008110944 | A | 5/2008 |
| JP | 2009209090 | A | 9/2009 |
| WO | 9641166 | A2 | 12/1996 |
| WO | 9713762 | A1 | 4/1997 |
| WO | 9952915 | A1 | 10/1999 |
| WO | 0136386 | A1 | 5/2001 |
| WO | 0142211 | A2 | 6/2001 |
| WO | 0243760 | A1 | 6/2002 |
| WO | 03091262 | A1 | 11/2003 |
| WO | 2007099392 | A2 | 9/2007 |
| WO | 2008014497 | A2 | 1/2008 |
| WO | 2008021048 | A2 | 2/2008 |
| WO | 2008033197 | A2 | 3/2008 |
| WO | 2008070733 | A2 | 6/2008 |
| WO | 2008088690 | A2 | 7/2008 |
| WO | 2009061924 | A2 | 5/2009 |
| WO | 2011116951 | A1 | 9/2011 |
| WO | 2011159633 | A1 | 12/2011 |
| WO | 2011161451 | A1 | 12/2011 |
| WO | 2012004674 | A2 | 1/2012 |
| WO | 2012004675 | A2 | 1/2012 |
| WO | 2012004676 | A2 | 1/2012 |
| WO | 2012004680 | A2 | 1/2012 |
| WO | 2012004681 | A2 | 1/2012 |
| WO | 2012004683 | A2 | 1/2012 |
| WO | 2012006230 | A1 | 1/2012 |

OTHER PUBLICATIONS

Akimoto et al., "A Novel Main Chain Cleavable Photosensitive Polyimide: Polyimide Containing Acetal Structure with Photoacid Generator" Journal of Photopolymer Science and Technology, vol. 12, No. 2 (1999) pp. 245-248.
Derwent English Abstract for JP2003-66610 (2003).
Non-Final Office Action dated Dec. 3, 2014; U.S. Appl. No. 13/943,007, filed Jul. 16, 2013.
U.S. Appl. No. 13/943,007 filed with the USPTO on Jul. 16, 2013.
U.S. Appl. No. 13/943,196 filed with the USPTO on Jul. 16, 2013.
U.S. Appl. No. 13/943,232 filed with the USPTO on Jul. 16, 2013.
Urawa et al., "Investigations into the Suzuki-Miyaura coupling aiming at multikilogram synthesis of E2040 using (o-cyanophenyl)boronic esters", Journal of Organometallic Chemistry, vol. 653 (2002), pp. 269-278.
Bicerano, J. 2002, "For Tg at infinite molecular weights: Eq. 6.2, 6.3", Prediction of Polymer Properties, Third Edition, Marcel Dekker Inc.: New York, pp. 198-199.
Bicerano, J. 2002, "For Tg at other molecular weights: Eq. 6.4, 6.5, 6.8, 6.10" Prediction of Polymer Properties, Third Edition, Marcel Dekker Inc.: New York, p. 216-217.
Bicerano, J. 2002, "Solubility parameter at 298 K Eq. 5.4" Prediction of Polymer Properties, Third Edition, Marcel Dekker Inc.: New York, p. 137.
Bicerano, J. 2002, "For Tg at other molecular weights: Eq. 6.4, 6.5, 6.8, 6.10" Prediction of Polymer Properties, Third Edition, Marcel Dekker Inc.: New York, p. 212, 2 pages.
Fedors, "A Method for Estimating Both the Solubility Parameters and Molar Volumes of Liquids. Supplement", Polymer Engineering and Science, Jun. 1974, vol. 14, No. 6, p. 472.
Fedors, "A Method for Estimating Both the Solubility Parameters and Molar Volumes of Liquids", Polymer Engineering and Science, Feb. 1974, vol. 14, No. 2, pp. 147-154.
Frahn et al., "Suzuki Polycondensation: on Catalyst Derived Phosphorus Incorporation and Reproducibiilty of Molecular Weights", Tetrahedron, vol. 53, No. 45, pp. 15459-15467, 1997.
Ito, "Chemical Amplification Resists for Microlithography", Adv Polym Sci (2005) 172: 37-245.
Karakaya et al., "Full coverage of a hydroxy-substituted poly(paraphenylene) with first- and second-generation dendritic wedges having isocyanate focal points", Acta Polymer., 47, pp. 79-84 (1996).
Kozawa et al., "Impact of Nonconstant Diffusion Coefficient on Latent Image Quality in 22 nm Fabrication using Extreme Ultraviolet Lithography", Journal of Photopolymer Science and Technology, 2008, vol. 21, No. 3, pp. 421-427.
Onishi et al., "Acid Catalyzed Resist for KrF Excimer Laser Lithography", Journal of Photopolymer Science and Technology, 4(3), pp. 337-340 (1991).
Sakamoto et al., "Suzuki Polycondencation: Polyarylenes a la carte", Macromolecular Rapid Communications, 2009, vol. 30, pp. 653-687.
Scheler et al., "Synthesis and Properties of Alternating Fluorene-Based Oligomers for Sub-mm Photopatterning", Macromol. Chem. Phys. 2010, 211, pp. 2081-2089.

(56) References Cited

OTHER PUBLICATIONS

Schluter et al, "The Tenth Anniversary of Suzuki Polycondensation (SPC)", Journal of Polymer Science, Part A, Polymer Chemistry, 2001, vol. 39, pp. 1533-1556.

Seechurn et al., "Air-Stable Pd(R-allyl)LCI (L= Q-Phos, P(t-Bu)3, etc.) Systems for C-C/N Couplings: Insight into the Structure-Activity Relationship and Catalyst Activation Pathway", J. Org. Chem. 2011, 76, pp. 7918-7932.

Notice of Allowance dated May 1, 2015; U.S. Appl. No. 13/943,007, filed Jul. 16, 2013 (11 pages).

Non-Final Office Action dated Jul. 17, 2014; U.S. Appl. No. 13/943,232, filed Jul. 16, 2013.

Notice of Allowance dated Nov. 3, 2014; U.S. Appl. No. 13/943,232, filed Jul. 16, 2013.

Notice of Allowance dated Nov. 20, 2014; U.S. Appl. No. 13/943,196, filed Jul. 16, 2013.

Hall, "Structure, Properties, and Preparation of Boronic Acid Derivatives, Overview of Their Reactions and Applications" Boronic Acids: Preparation and Applications in Organic Synthesis, Medicine and Materials, Second Edition, 2011 (18 pages).

Masters, et al. "ChemInform Abstract: The Acetal Concept: Regioselective Access to ortho, ortho-Diphenols via Dibenzo-1,3-dioxepines"; Angewandte Chemie International Edition Jan. 2013 (6 pages).

* cited by examiner

AROMATIC POLYACETALS AND ARTICLES COMPRISING THEM

FIELD

The present invention relates to polymers, in particular aromatic polyacetals and polyketals.

INTRODUCTION

Poly(methacrylate)-based and poly(hydroxystyrene)-based chemically amplified photoresists have reached a performance limit that is defined by a trade-off triangle of resolution, line edge roughness, and sensitivity. This is the so-called RLS trade-off. There is empirical evidence that attempts to increase one of the key properties by using a formulation approach hurt the remaining properties of the triangle. This effect limits the achievable feature size in high resolution photolithography, including extreme ultraviolet (EUV) and electron beam. One way to escape the RLS trade-off triangle of poly(methacrylate)-based and poly(hydroxystyrene)-based chemically amplified photoresists would be to create new photoresist compositions based on a different polymer that provides one or more of improved photon absorption, improved quantum efficiency, and improved efficiency of a catalytic chain reaction. An additional way to escape the RLS trade-off triangle of poly(methacrylate)-based and poly(hydroxystyrene)-based chemically amplified photoresists would be to create new photoresist compositions based on a different polymer that exhibits non-constant diffusion behavior (i.e., the diffusion constant of the acid is higher in the exposed area than the unexposed area) during photolithography. Kozawa, T, Tagawa, S., Santillan, J J, Itani, T, Journal of Photopolymer Science and Technology, 2008, volume 21, pages 421-427. Such a behavior may be accomplished with the help of backbone-degradable polymers.

SUMMARY

One embodiment is a polymer comprising a plurality of repeat units having the structure

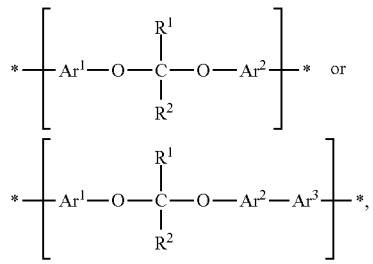

wherein each occurrence of $R^1$ and $R^2$ is independently hydrogen, unsubstituted or substituted $C_{1-18}$ linear or branched alkyl, unsubstituted or substituted $C_{3-18}$ cycloalkyl, unsubstituted or substituted $C_{6-18}$ aryl, or unsubstituted or substituted $C_{3-18}$ heteroaryl; and $R^1$ and $R^2$ are optionally covalently linked to each other to form a ring that includes $-R^1-C-R^2-$, where the central carbon is the acetal carbon; each occurrence of $Ar^1$, $Ar^2$, and $Ar^3$ is independently unsubstituted or substituted $C_{6-18}$ arylene, or unsubstituted or substituted $C_{3-18}$ heteroarylene; provided that at least one occurrence of $Ar^1$, $Ar^2$, and $Ar^3$ is substituted with at least one functional group selected from hydroxyl, acetal, ketal, ester, and lactone.

Another embodiment is an article comprising the polymer. These and other embodiments are described in detail below.

DETAILED DESCRIPTION

Figure 1:
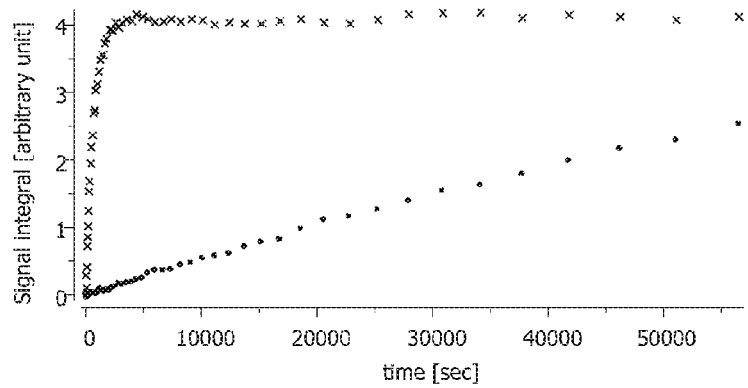
FIG. 1 shows polymer backbone and side chain degradation of the polymer pBEBA-2,4-DBP-CHVE from Example 8 after treatment with dilute aqueous triflic acid.

The present inventors have prepared polymers containing labile acetal groups within the polymer backbone, and, optionally, additional labile functional groups pendant to the polymer. Under acidic conditions, depolymerization and deprotection of any acid-sensitive protecting groups is achieved simultaneously. The polymers therefore provide improved efficiency of the catalytic chain reaction relative to poly(methacrylate)s and poly(hydroxystyrene)s. At the same time, the polymers can exhibit other properties that make them particularly useful for lithography. These properties can include one or more of high glass transition temperature, high ring parameter, low Ohnishi parameter (improved etch resistance), solubility in solvents common for photoresist formulations, heat stability of the polymer backbone, and solubility in aqueous basic developer after depolymerization and deprotection.

This application describes the polymers. Co-filed U.S. application Ser. No. 13/941,232 describes monomers from which the polymers are prepared. Co-filed U.S. application Ser. No. 13/943,196 describes a method of preparing the polymers. And co-filed U.S. application Ser. No. 13/943,007 describes photoresist compositions comprising the polymers.

As used herein, for brevity and except as otherwise noted, the term "acetal" shall be understood to be generic to "acetal" and "ketal", the term "oligoacetal" shall be understood to be generic to "oligoacetal" and "oligoketal", and the term "polyacetal" shall be understood to be generic to "polyacetal" and "polyketal". As used herein, the term "plurality" means at least three. Also, the term "polymer" will be understood to encompass oligomers comprising as few as three repeat units. The desired number of repeat units will depend on the intended use of the polymer. For example, when the polymer is used in a photoresist composition, it may be desirable for the polymer to comprise at least 5 repeat units, specifically 5 to 200 repeat units. As used herein, "substituted" means including at least one substituent such as a halogen (i.e., F, Cl, Br, I), hydroxyl, amino, thiol, carboxyl, carboxylate, amide, nitrile, sulfide, disulfide, nitro, $C_{1-18}$ alkyl, $C_{1-18}$ alkoxyl, $C_{6-18}$ aryl, $C_{6-18}$ aryloxyl, $C_{7-18}$ alkylaryl, or $C_{7-18}$ alkylaryloxyl. It will be understood that any group or structure disclosed with respect to the formulas herein may be so substituted unless otherwise specified, or where such substitution would significantly adversely affect the desired properties of the resulting structure. Also, "fluorinated" means having one or more fluorine atoms incorporated into the group. For example, where a $C_{1-18}$ fluoroalkyl group is indicated, the fluoroalkyl group can include one or more fluorine atoms, for example, a single fluorine atom, two fluorine atoms (e.g., as a 1,1-difluoroethyl group), three fluorine atoms (e.g., as a 2,2,2-trifluoroethyl group), or fluorine atoms at each free valence of carbon (e.g., as a perfluorinated group such as $-CF_3$, $-C_2F_5$, $-C_3F_7$, or $-C_4F_9$).

One embodiment is a polymer comprising a plurality of repeat units having the structure

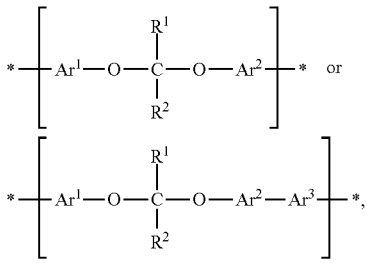   or wherein each occurrence of $R^1$ and $R^2$ is independently hydrogen, unsubstituted or substituted $C_{1-18}$ linear or branched alkyl, unsubstituted or substituted $C_{3-18}$ cycloalkyl, unsubstituted or substituted $C_{6-18}$ aryl, or unsubstituted or substituted $C_{3-18}$ heteroaryl; and $R^1$ and $R^2$ are optionally covalently linked to each other to form a ring that includes —$R^1$—C—$R^2$—, where the central carbon is the acetal carbon; each occurrence of $Ar^1$, $Ar^2$, and $Ar^3$ is independently unsubstituted or substituted $C_{6-18}$ arylene, or unsubstituted or substituted $C_{3-18}$ heteroarylene; provided that at least one functional group selected from hydroxyl, acetal, ketal, ester, and lactone.

When the polymer comprises a plurality of repeat units having the structure

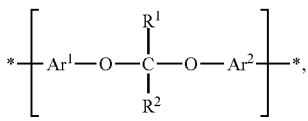

the repeat units can be formed by Suzuki polycondensation of one or more bis(aryl)acetal compounds having the structure

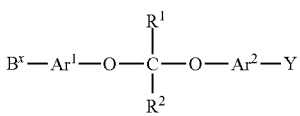

wherein $B^x$ is a boron-containing functional group bonded to $Ar^1$ via a boron atom; Y is chloro, bromo, iodo, triflate, mesylate, or tosylate; and $R^1$, $R^2$, $Ar^1$, and $Ar^2$ are defined above. Examples of $B^x$ groups include —$BF_3^-M^+$, wherein each occurrence of $M^+$ is independently an alkali metal cation, or an unsubstituted or substituted ammonium ion; —$B(OH)_2$; and

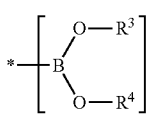

wherein $R^3$ and $R^4$ are each independently $C_{1-18}$ alkyl, $C_{3-18}$ cycloalkyl, or $C_{6-18}$ aryl; and $R^3$ and $R^4$ are optionally covalently linked to each other to form a ring that includes —$R^3$—O—B—O—$R^4$—.

There are at least two methods of forming the polymer comprising a plurality of repeat units having the structure

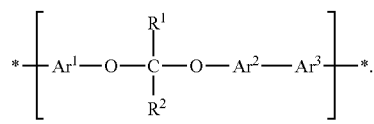

The first method comprises Suzuki polycondensation of a bis(aryl)acetal compound having the structure

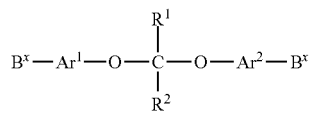

wherein $B^x$, $R^1$, $R^2$, $Ar^1$, and $Ar^2$ are defined above and each occurrence of $B^x$ is defined independently, with a bis(leaving group)arylene having the structure

wherein Y and $Ar^3$ are defined above, and each occurrence of Y is defined independently.

The second method comprises Suzuki polycondensation of a bis(aryl)acetal compound having the structure

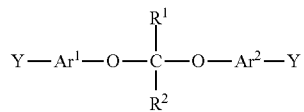

wherein Y, $R^1$, $R^2$, $Ar^1$, and $Ar^2$ are defined above and each occurrence of Y is defined independently, with a bis(leaving group)arylene having the structure

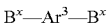

wherein $B^x$ and $Ar^3$ are defined above and each occurrence of $B^x$ is defined independently.

Reviews of Suzuki polycondensation and resulting polymers have been published by Schlüter et al. in *Macromolecular Rapid Communications,* 2009, volume 30, pages 653-687 and *Journal of Polymer Science, Part A, Polymer Chemistry,* 2001, volume 39, pages 1533-1556. The present inventors have determined that particularly active catalysts for polymerization include those having the structure

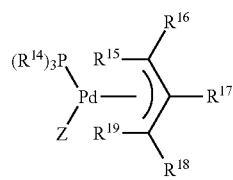

wherein each occurrence of $R^{14}$ is independently unsubstituted or substituted $C_{1-18}$ linear or branched alkyl, unsubstituted or substituted $C_{3-18}$ cycloalkyl, unsubstituted or substituted $C_{6-18}$ aryl, or unsubstituted or substituted ferrocenyl; $R^{15}$, $R^{16}$, $R^{17}$, $R^{18}$, $R^{19}$ are, independently, hydrogen, $C_{1-6}$ linear or branched alkyl, $C_{3-6}$ cycloalkyl, or phenyl; and Z is selected from the group consisting of fluorine, chlorine, bromine, iodine, cyano (—CN), cyanate (—OCN), isocyanate (—NCO), thiocyanate (—SCN), isothiocyanate (—NCS), nitro (—$NO_2$), nitrite (—ON=O), azide (—N=$N^+$=$N^-$), and hydroxyl. Methods of preparing such catalysts are described in C. C. C. Johansson Seechurn, S. L. Parisel, and T. J. Calacot, *J. Org. Chem.* 2011, 76, 7918-7932, where the catalysts are used for bimolecular coupling (not polycondensation).

One advantage of the present polymers is that the Suzuki polycondensation used in their preparation tolerates functional groups that would be incompatible with a polyacetal synthesis in which the acetal-containing backbone is formed in the last step. Specifically, at least one occurrence of $Ar^1$, $Ar^2$, and $Ar^3$ (when present) is substituted with at least one functional group selected from hydroxyl, acetal, ketal, ester, and lactone.

The acetals can be monovalent acetals having the structure

wherein $R^5$ and $R^6$ are independently selected from the group consisting of unsubstituted or substituted $C_{1-18}$ linear or branched alkyl, unsubstituted or substituted $C_{3-18}$ cycloalkyl, unsubstituted or substituted $C_{6-18}$ aryl, and unsubstituted or substituted $C_{3-18}$ heteroaryl; optionally $R^5$ or $R^6$ is covalently connected to the polymer backbone (e.g., via bonding to $R^1$ or $R^2$, or to one of $Ar^1$, $Ar^2$, and $Ar^3$ to which the oxygen end of the acetal is not already bound). In these embodiments, the acetal is part of a ring structure. The ring structure can include or not include $Ar^1$—O—C—O—$Ar^2$.

In some embodiments, $R^5$ and $R^6$ are covalently connected to each others to form a ring structure. Specific examples of monovalent acetals having the structure —O—C(H)($R^5$)—$OR^6$ include

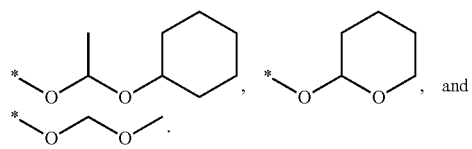

The acetals can also be divalent cyclic acetals attached via oxygen atoms to $Ar^1$, $Ar^2$, or $Ar^3$ as shown in the structure

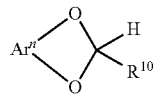

wherein $Ar''$ is $Ar^1$, $Ar^2$, or $Ar^3$ (when present), or a combination of $Ar^1$ and $Ar^2$ (for example, when one acetal oxygen is bonded directly to $Ar^1$ and the other directly to $Ar^2$) or a combination of $Ar^2$ and $Ar^3$; $R^{10}$ is selected from the group consisting of unsubstituted or substituted $C_{1-18}$ linear or branched alkyl, unsubstituted or substituted $C_{3-18}$ cycloalkyl, unsubstituted or substituted $C_{6-18}$ aryl, and unsubstituted or substituted $C_{3-18}$ heteroaryl. In some embodiments, the cyclic acetal is part of a ring structure that includes $Ar^1$—O—C($R^1$)($R^2$)—O—$Ar^2$.

In other embodiments, the cyclic acetal is not part of such a ring structure.

The ketals can be monovalent ketals having the structure

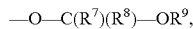

wherein $R^7$, $R^8$, and $R^9$ are independently selected from the group consisting of unsubstituted or substituted $C_{1-18}$ linear or branched alkyl, unsubstituted or substituted $C_{3-18}$ cycloalkyl, unsubstituted or substituted $C_{6-18}$ aryl, and unsubstituted or substituted $C_{3-18}$ heteroaryl. Optionally $R^7$, $R^8$, or $R^9$ is covalently connected to the polymer backbone such that the acetal is part of a ring structure.

The ketals can also be cyclic ketals attached via oxygen atoms to $Ar^1$ or $Ar^2$ as shown in the structure

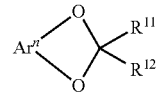

wherein $Ar''$ is $Ar^1$ or $Ar^2$, or a combination of $Ar^1$ and $Ar^2$ (for example, when one ketal oxygen is bonded directly to $Ar^1$ and the other directly to $Ar^2$); $R^{11}$ and $R^{12}$ are independently selected from the group consisting of unsubstituted or substituted $C_{1-18}$ linear or branched alkyl, unsubstituted or substituted $C_{3-18}$ cycloalkyl, unsubstituted or substituted $C_{6-18}$ aryl, and unsubstituted or substituted $C_{3-18}$ heteroaryl. In some embodiments, the cyclic ketal is part of a ring structure that includes $Ar^1$—O—C($R^1$)($R^2$)—O—$Ar^2$.

In other embodiments, the cyclic ketal is not part of such a ring structure.

The esters can have the structure

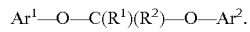

wherein a is 0 or 1 and b is 0 or 1, provided that when a is 1 then b is 1; $R^{13}$ is selected from the group consisting of unsubstituted or substituted $C_{1-20}$ linear or branched alkyl (e.g., methyl, ethyl, n-propyl, i-propyl, n-butyl, i-butyl, t-butyl, diphenylmethyl, 2-phenylpropan-2-yl, 1,1-diphenylethan-1-yl, triphenylmethyl), unsubstituted or substituted $C_{3-20}$ cycloalkyl (e.g., cyclopentyl, cyclohexyl, methylcyclohexan-1-yl, ethylcyclohexan-1-yl, 1-norbornyl, 1-adamantlyl, 2-methylbicyclo[2.2.1]heptan-2-yl, 1-adamantlyl, 2-methyladamantan-2-yl), unsubstituted or substituted $C_{6-20}$ aryl (e.g., phenyl, 1-naphthyl, and 2-naphthyl), and unsubstituted or substituted $C_{3-20}$ heteroaryl (e.g., 2-imidazolyl, 4-imidazolyl, 2-pyridyl, 3-pyridyl, and 4-pyridyl); and wherein $L^1$ is selected from the group consisting of unsubstituted or substituted $C_{1-20}$ linear or branched alkylene (e.g., methane-1,1-diyl (—CH$_2$—), ethane-1,2-diyl (—CH$_2$CH$_2$—), ethane-1,1-diyl (—CH(CH$_3$)—), propane-2,2-diyl(—C(CH$_3$)$_2$—)), unsubstituted or substituted $C_{3-20}$ cycloalkylene (e.g., 1,1-cyclopentanediyl, 1,2-cyclopentanediyl, 1,1-cyclohexanediyl, 1,4-cyclohexanediyl), unsubstituted or substituted $C_{6-20}$ arylene (e.g., 1,3-phenylene, 1,4-phenylene, 1,4-naphthylene, 1,5-naphthylene, 2,6-naphthylene), and unsubstituted or substituted $C_{3-20}$ heteroarylene (e.g., imidazo-2,4-ylene, 2,4-pyridylene, 2,5-pyridylene). In some embodiments, $R^{13}$ and $L^1$ are covalently connected to each others to form a lactone. In some embodiments, $R^{13}$ is bonded to the adjacent ester oxygen atom via a tertiary carbon atom, for example,

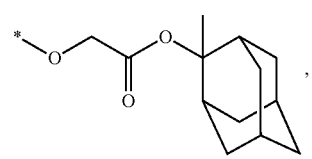

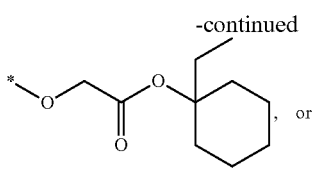
, or

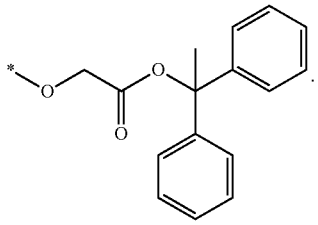

Alternatively, the esters can have the structure

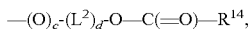
—(O)$_c$-(L$^2$)$_d$-O—C(=O)—R$^{14}$, wherein c is 0 or 1 and d is 0 or 1, provided that when c is 1 then d is 1; R$^{14}$ is selected from the group consisting of unsubstituted or substituted C$_{1-20}$ linear or branched alkyl (e.g., methyl, ethyl, n-propyl, i-propyl, n-butyl, i-butyl, t-butyl, diphenylmethyl, 2-phenylpropan-2-yl, 1,1-diphenylethan-1-yl, and triphenylmethyl), unsubstituted or substituted C$_{3-20}$ cycloalkyl (e.g., cyclopentyl, cyclohexyl, 1-norbornyl, 1-adamantlyl, 2-methylbicyclo[2.2.1]heptan-2-yl, 2-methyladamantan-2-yl), unsubstituted or substituted C$_{6-20}$ aryl (e.g., phenyl, 1-naphthyl, 2-naphthyl), and unsubstituted or substituted C$_{3-20}$ heteroaryl (e.g., 2-imidazolyl, 4-imidazolyl, 2-pyridyl, 3-pyridyl, 4-pyridyl); and wherein L$^2$ is selected from the group consisting of unsubstituted or substituted C$_{1-20}$ linear or branched alkylene (e.g., methane-1,1-diyl (—CH$_2$—), ethane-1,2-diyl (—CH$_2$CH$_2$—), ethane-1,1-diyl (—CH(CH$_3$)—), propane-2,2-diyl (—C(CH$_3$)$_2$—), 2-methylpropane-1,2-diyl(—CH$_2$C(CH$_3$)$_2$—), diphenylmethylene (—C(C$_6$H$_5$)$_2$—), 1-phenylmethane-1,1-diyl (—CH(C$_6$H$_5$)$_2$)—), 2-phenylpropane-1,2-diyl (—CH$_2$C(CH$_3$)(C$_6$H$_5$)—), 1,1-diphenylethane-1,2-diyl(—CH$_2$C(C$_6$H$_5$)$_2$)—), unsubstituted or substituted C$_{3-20}$ cycloalkylene (e.g., 1,1-cyclopentanediyl, 1,2-cyclopentanediyl, 1,1-cyclohexanediyl, 1,4-cyclohexanediyl, ethylcyclohexane-1,4-diyl, 4-methyladamantane-1,4-diyl), unsubstituted or substituted C$_{6-20}$ arylene (e.g., 1,3-phenylene, 1,4-phenylene, 1,4-naphthylene, 1,5-naphthylene, 2,6-naphthylene), and unsubstituted or substituted C$_{3-20}$ heteroarylene (e.g., imidazo-2,4-ylene, 2,4-pyridylene, 2,5-pyridylene). In some embodiments, R$^{14}$ and L$^2$ are covalently connected to each others to form a lactone. A specific example of an ester having the structure —(O)$_c$-(L$^2$)$_d$-O—C(=O)—R$^{14}$ is

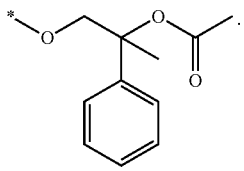 [SMILES: *OCC(C)(OC(C)=O)c1ccccc1]
.

The lactones can have the structure

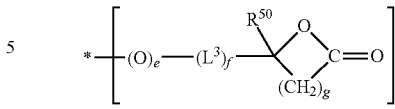

wherein e is 0 or 1; f is 0 or 1; g is 1, 2, 3, or 4 (specifically 2); R$^{50}$ is hydrogen, unsubstituted or substituted C$_{1-18}$ linear or branched alkyl, unsubstituted or substituted C$_{3-18}$ cycloalkyl, unsubstituted or substituted C$_{6-18}$ aryl, or unsubstituted or substituted C$_{3-18}$ heteroaryl; and L$^3$ is selected from the group consisting of unsubstituted or substituted C$_{1-20}$ linear or branched alkylene (e.g., unsubstituted or substituted C$_{3-20}$ cycloalkylene (e.g., 1,1-cyclopentanediyl, 1,2-cyclopentanediyl, 1,1-cyclohexanediyl, 1,4-cyclohexanediyl), unsubstituted or substituted C$_{6-20}$ arylene (e.g., 1,3-phenylene, 1,4-phenylene, 1,4-naphthylene, 1,5-naphthylene, 2,6-naphthylene), and unsubstituted or substituted C$_{3-20}$ heteroarylene (e.g., imidazo-2,4-ylene, 2,4-pyridylene, 2,5-pyridylene).

In some embodiments, in at least 40 mole percent of the plurality of repeat units, at least one of Ar$^1$, Ar$^2$ and Ar$^3$ is substituted with at least one hydroxyl. Within this limit, the mole percent of repeat units in which at least one of Ar$^1$, Ar$^2$ and Ar$^3$ is substituted with at least one hydroxyl can be at least 70 mole percent, at least 90 mole percent, at least 95 mole percent, at least 98 mole percent, or at least 99 mole percent.

In some embodiments, in at least one of the repeat units of the polymer, at least one of R$^1$, R$^2$, Ar$^1$, Ar$^2$ and Ar$^3$ (when present) is substituted with hydroxyl. In some embodiments, at least one of R$^1$, R$^2$, Ar$^1$, Ar$^2$, and Ar$^3$ (when present) is substituted with hydroxyl in at least 40 mole percent of the plurality of repeat units. In some embodiments, in 40 to 99 mole percent of the plurality of repeat units at least one of Ar$^1$, Ar$^2$, and Ar$^3$ (when present) is substituted with hydroxyl, and in 1 to 60 mole percent of the plurality of repeat units at least one of Ar$^1$, Ar$^2$ and Ar$^3$ is substituted with the acetal or ketal. A preferred acetal is —O—C(H)(R$^5$)—OR$^6$, wherein R$^5$ is methyl and R$^6$ is cyclohexyl. In some embodiments, each occurrence of Ar$^1$, Ar$^2$, and Ar$^3$ is independently 1,3-phenylene or 1,4-phenylene.

When used in applications in which the polymer is exposed to acid to promote fragmentation, it may be desirable for the polymer to exclude acid-robust linkages between the Ar$^1$ and Ar$^2$ rings. Thus, in some embodiments, Ar$^1$ and Ar$^2$ are not covalently linked with one another via an acid-robust linkage to form a ring structure that includes

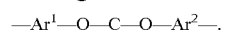
—Ar$^1$—O—C—O—Ar$^2$—.

Specific examples of Ar$^1$, Ar$^2$, and Ar$^3$ include unsubstituted or substituted 1,2-phenylene, unsubstituted or substituted 1,3-phenylene, unsubstituted or substituted 1,4-phenylene, unsubstituted or substituted 4,4'-biphenylene, unsubstituted or substituted 4,4"-p-terphenylene, unsubstituted or substituted 3,3"-p-terphenylene, unsubstituted or substituted 4,4"-m-terphenylene, unsubstituted or substituted 4,4"-p-terphenylene, unsubstituted or substituted 4,4"-o-terphenylene, unsubstituted or substituted 2,2"-o-terphenylene, unsubstituted or substituted 1,4-naphthylene, unsubstituted or substituted 2,7-naphthylene, unsubstituted or substituted 2,6-naphthylene, unsubstituted or substituted 1,5-naphthylene, unsubstituted or substituted 2,3-naphthylene, unsubstituted or substituted 1,7-naphthylene, unsubstituted or substituted 1,8-naphthylene, unsubstituted or substituted imidazo-2,4-ylene, 2,4-pyridylene, 2,5-pyridylene, unsubstituted or substituted 1,8-anthracenylene, unsubstituted or substituted 9,10-anthracenylene, unsubstituted or substituted 2,7-phenanthrenylene, unsubstituted or substituted 9,10-phenanthrenylene, unsubstituted or substituted 3,6-phenanthrenylene, unsubstituted or substituted 2,7-pyrenylene, unsubstituted or substituted 1,6-pyrenylene, unsubstituted or substituted 1,8-pyrenylene, unsubstituted or substituted 2,5-furanylene, unsubstituted or substituted 3,4-furanylene, unsubstituted or substituted 2,3-furanylene, unsubstituted or substituted 2,5-thiofuranylene, unsubstituted or substituted 3,4-thiofuranylene, unsubstituted or substituted 2,3-thiofuranylene, unsubstituted or substituted 2,5-oxazolylene, unsubstituted or substituted 2,7-fluorenylene, unsubstituted or substituted 2,5-benzofuranylene, unsubstituted or substituted 2,7-benzofuranylene, unsubstituted or substituted 5,7-benzofuranylene, unsubstituted or substituted 5,7-[1,3-benzoxazole], unsubstituted or substituted dithieno[3,2-b:2',3'-d]thiophene, and unsubstituted or substituted 2,7-xanthenylene. In some embodiments, each occurrence of $Ar^1$, $Ar^2$, and $Ar^3$ (when present) is independently 1,3-phenylene or 1,4-phenylene.

$Ar^1$ and $Ar^2$ are covalently linked with one another via the —O—C—O— linkage of the acetal. In some embodiments, to form a ring structure that includes —$Ar^1$—O—C—O—$Ar^2$—. In some embodiments, $Ar^1$ and $Ar^2$ are not further covalently linked with one another to form a ring structure that includes —$Ar^1$—O—C—O—$Ar^2$—. In other words, $Ar^1$ and $Ar^2$ are covalently linked only via the —O—C—O— linkage of the acetal.

In the polymer repeat units, $R^1$ and $R^2$ are each independently hydrogen, unsubstituted or substituted $C_{1-18}$ linear or branched alkyl (e.g., methyl, ethyl, 1-propyl, 2-propyl, 1-butyl, 2-butyl, 1methyl-2-propyl, diphenylmethyl, 2-phenylpropan-2-yl, 1,1-diphenylethan-1-yl, and triphenylmethyl), unsubstituted or substituted $C_{3-20}$ cycloalkyl (e.g., cyclopentyl, cyclohexyl, 1-norbornyl, 1-adamantlyl, 2-methylbicyclo[2.2.1]heptan-2-yl, 2-methyladamantan-2-yl); unsubstituted or substituted $C_{6-18}$ aryl (e.g., phenyl, 1-naphthyl, 2-naphthyl, anthracenyl), or unsubstituted or substituted $C_{3-18}$ heteroaryl (e.g., 2-imidazolyl, 4-imidazolyl, 2-pyridyl, 3-pyridyl, 4-pyridyl); and $R^1$ and $R^2$ are optionally covalently linked to each other to form a ring that includes

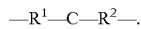

In some embodiments, at least one of $R^1$ and $R^2$ is hydrogen or methyl. In some embodiments, $R^1$ is hydrogen, and $R^2$ is selected from phenyl, ortho-methoxyphenyl, meta-methoxyphenyl, and para-methoxyphenyl. In some embodiments, $R^1$ is hydrogen and $R^2$ is unsubstituted or substituted phenyl. When $R^2$ is substituted phenyl, it can be substituted with a hydroxyl group, an acetal group, an ester group (including a lactone), or other such group that would be incompatible with polyacetal formation via acetal-generating polycondensation or would cause undesired polymer crosslinking. As described in a co-filed application, the present inventors have determined that such groups are tolerated in the Suzuki polycondensation reaction in which polyacetals are synthesized from the bis(aryl)acetal. Two specific examples of polymer repeat units in which $R^1$ and $R^2$ are covalently linked to each other to form a ring that includes

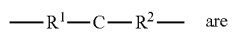 are

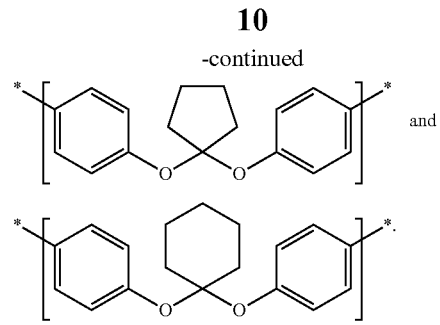

In some embodiments, the substructure

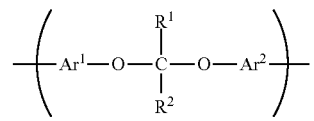

within any of the repeat units

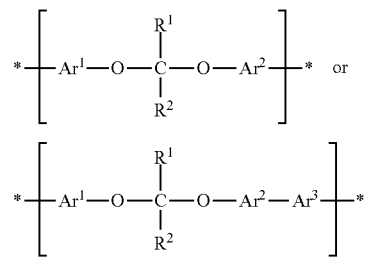

is selected from the group consisting of

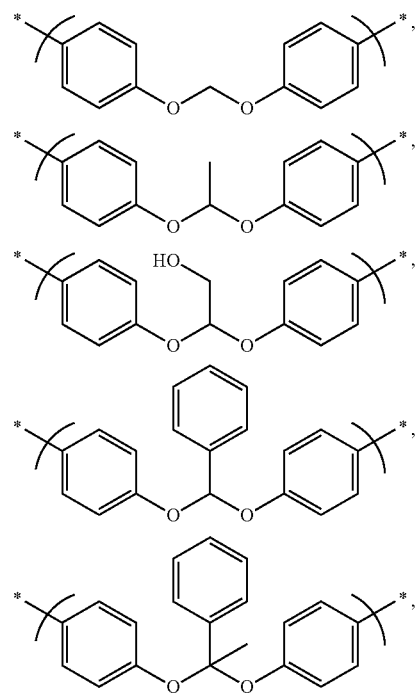

11
-continued
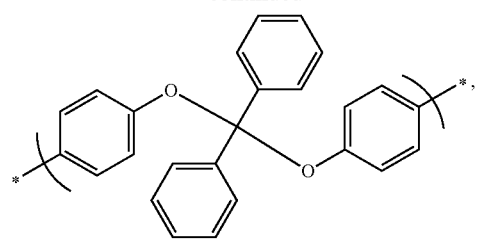
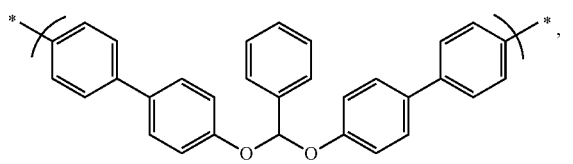
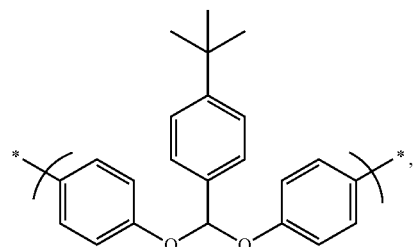
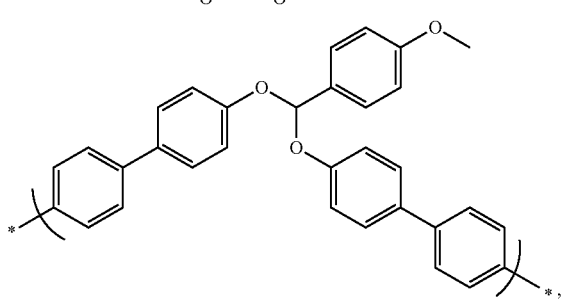
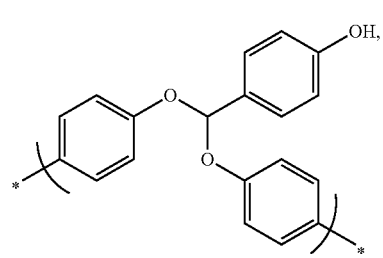
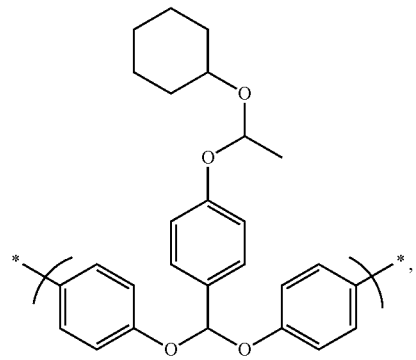
12
-continued
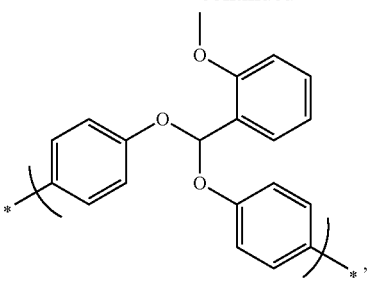
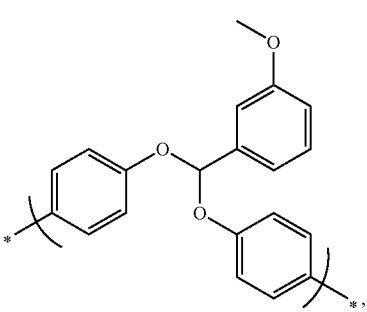
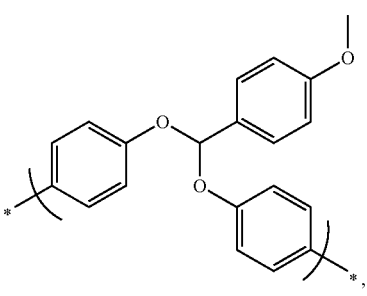
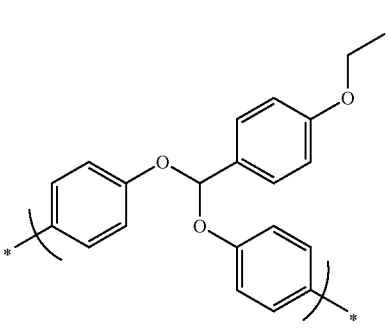
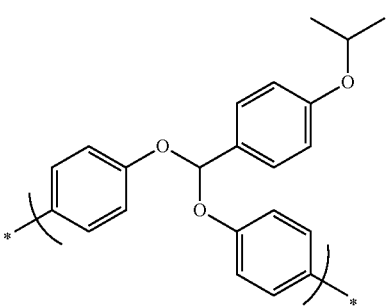

13
-continued
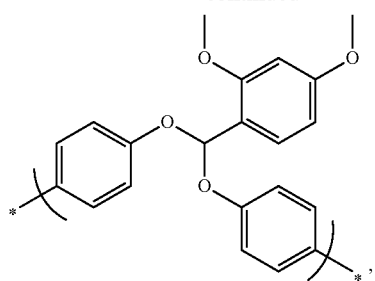
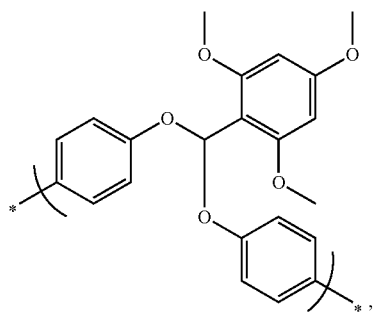
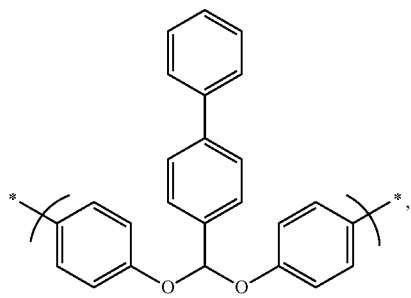
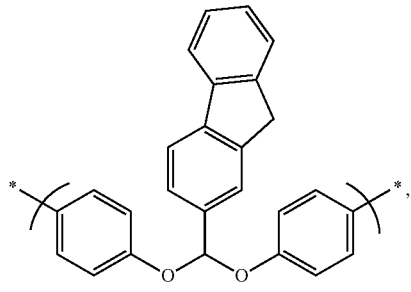
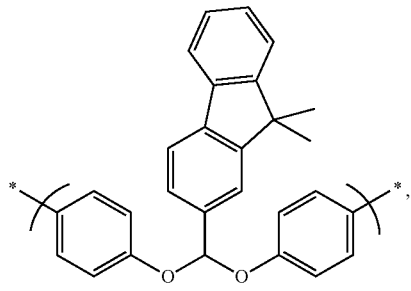
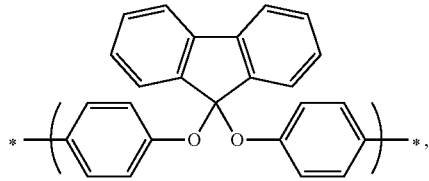
14
-continued
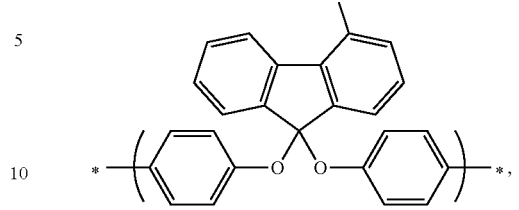
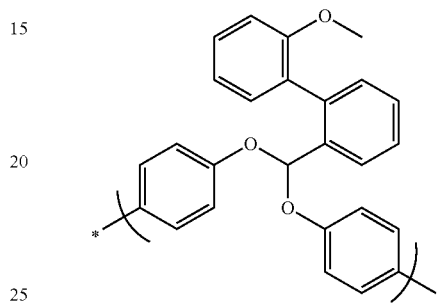
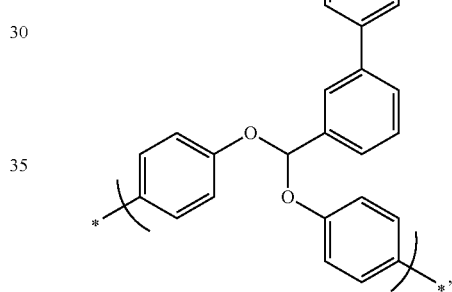
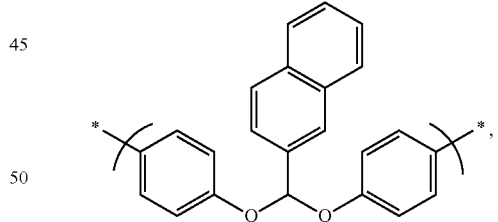
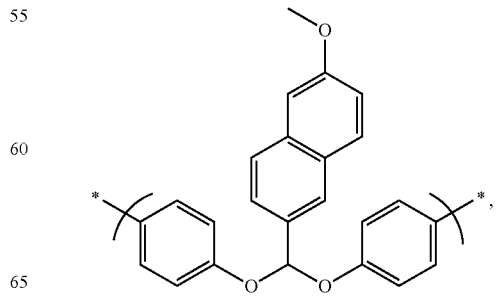

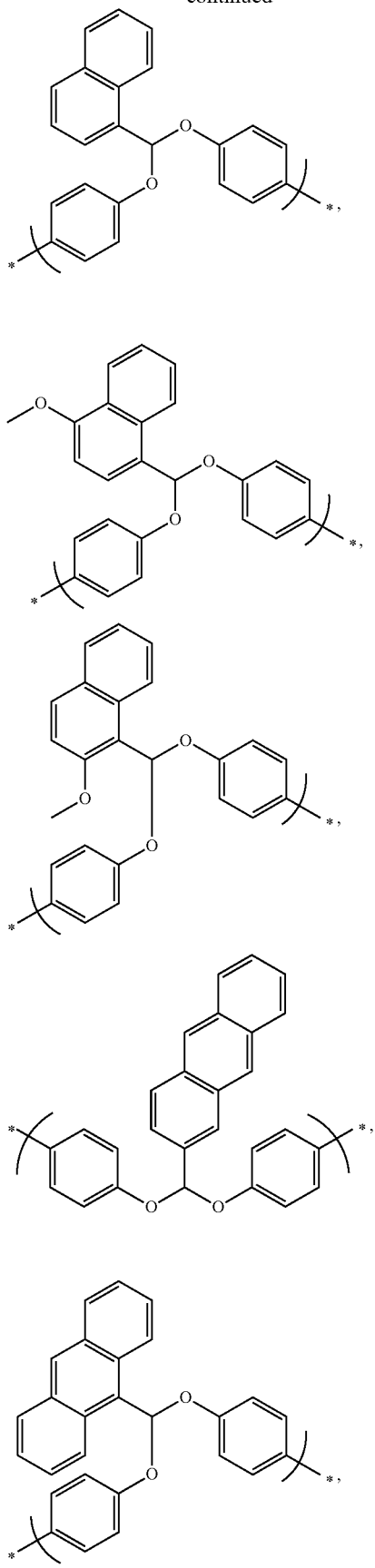

-continued
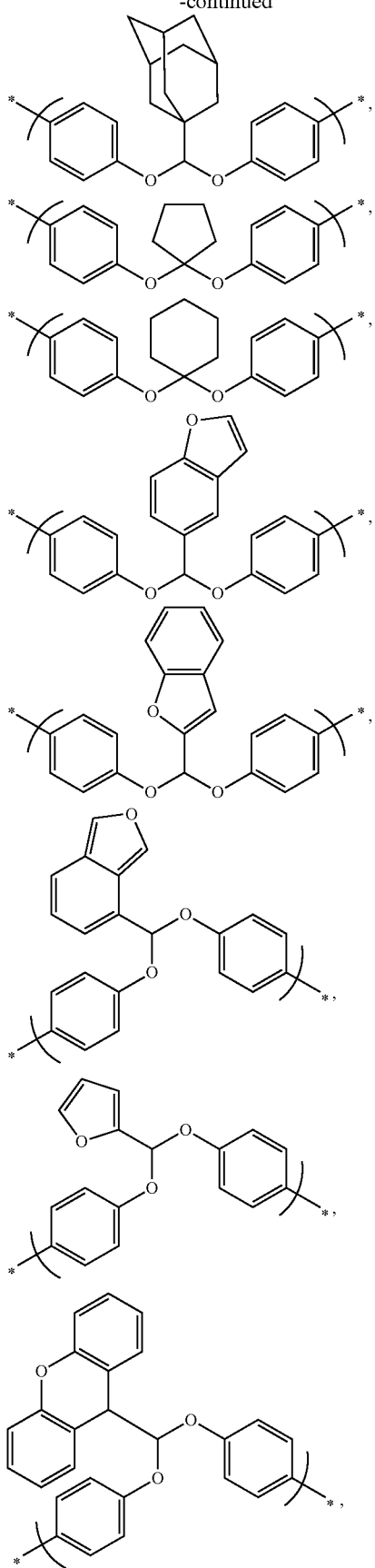
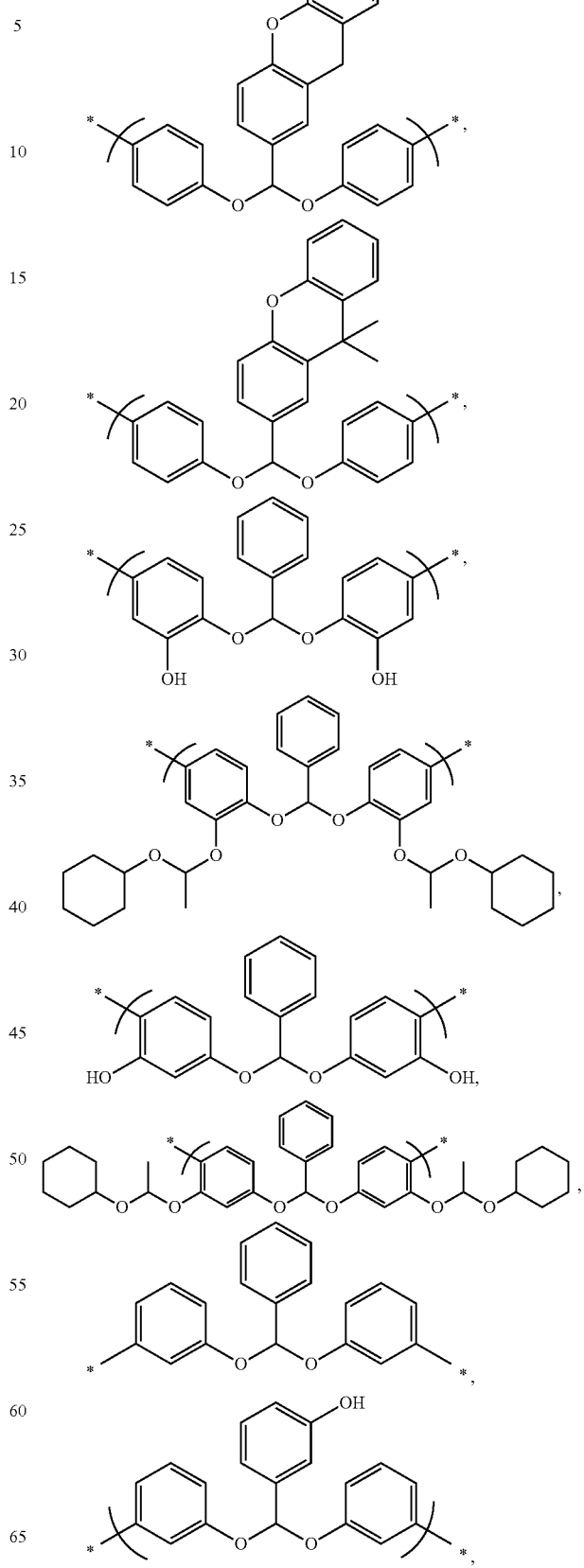

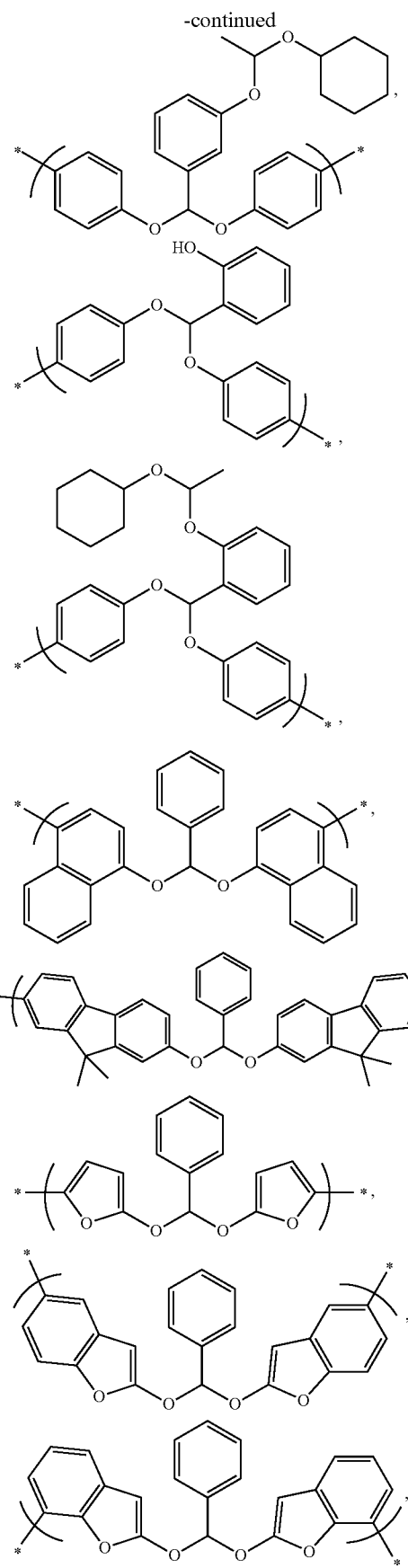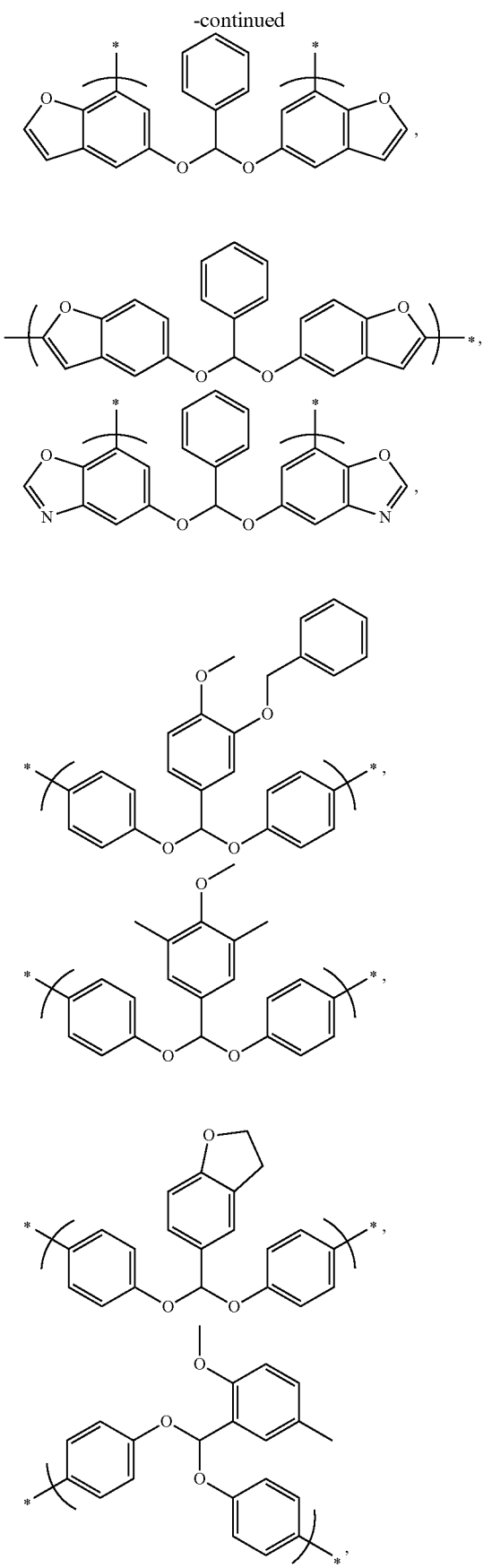

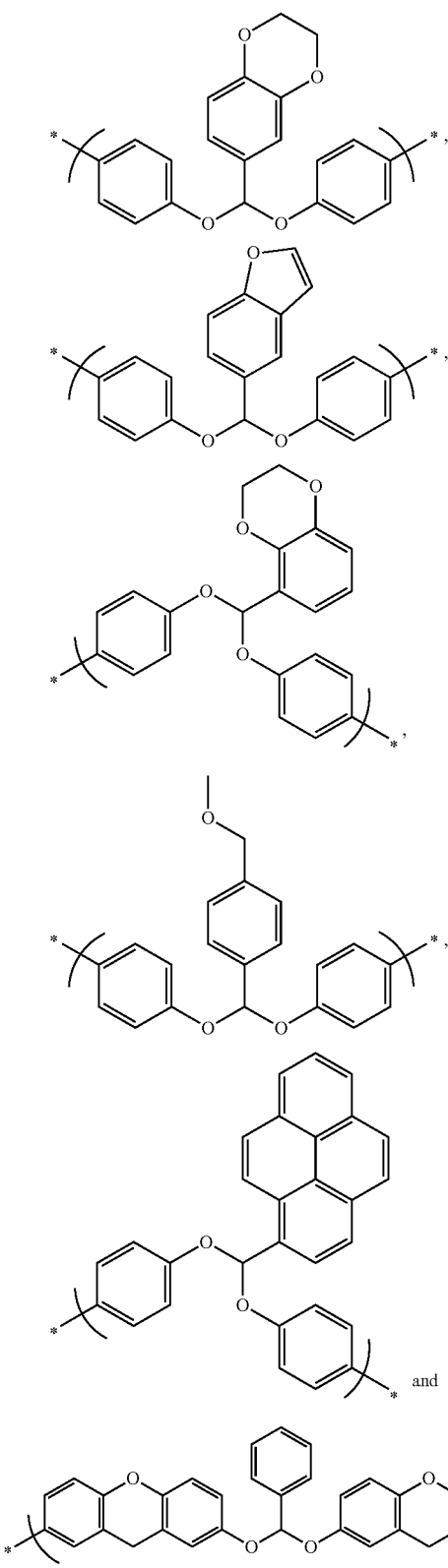
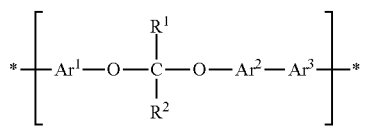
within any of the repeat units
is selected from the group consisting of
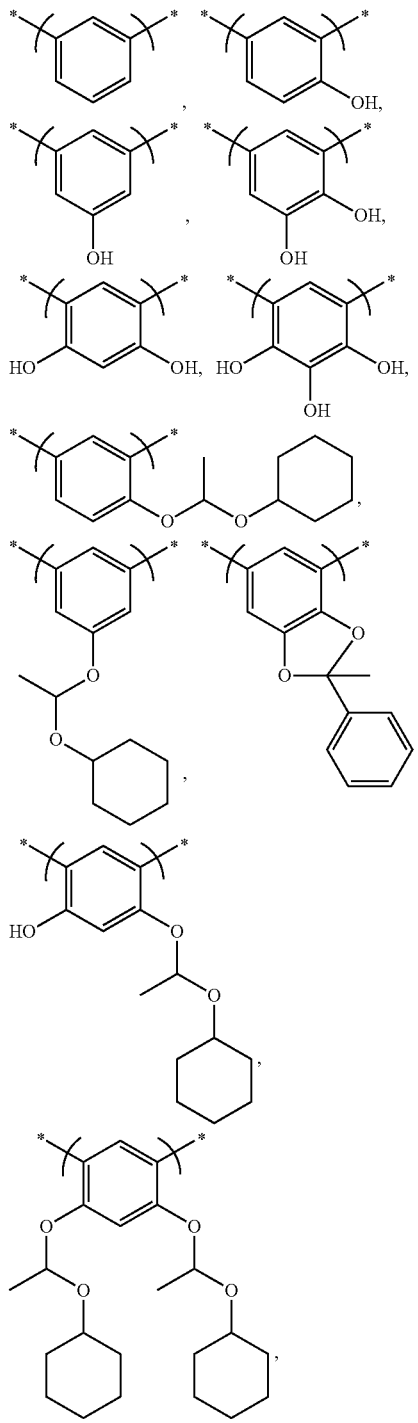
In some embodiments, the substructure
*―(Ar³)―*

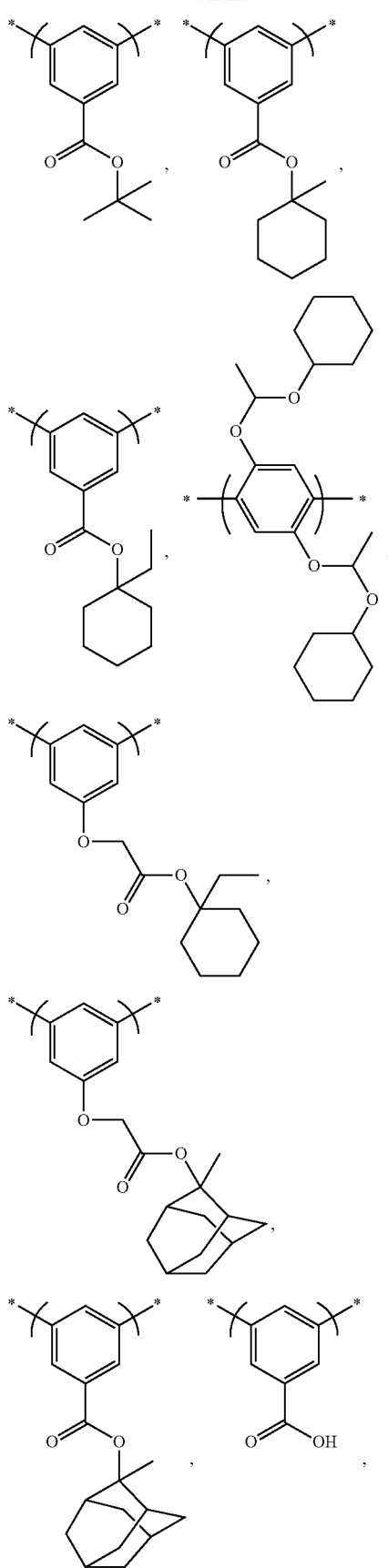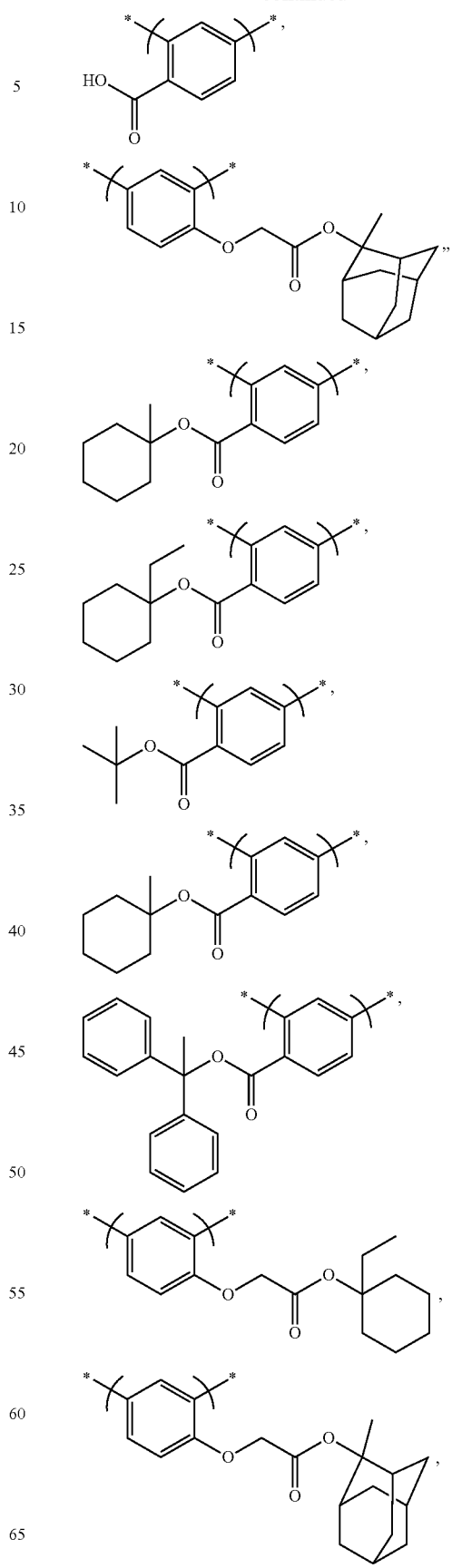

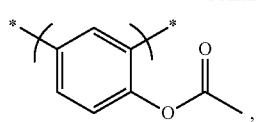
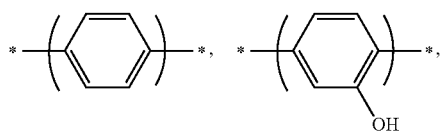
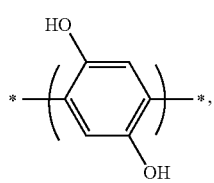
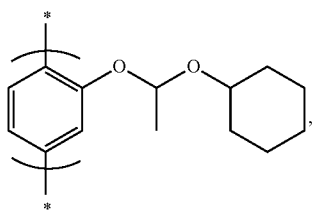
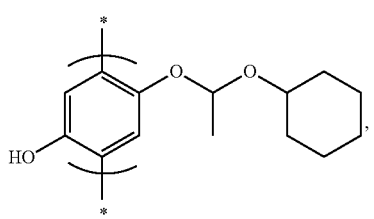
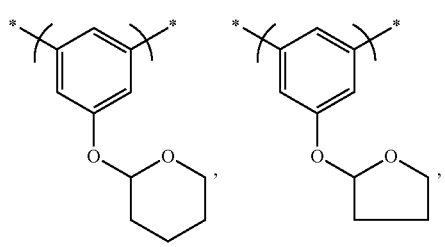
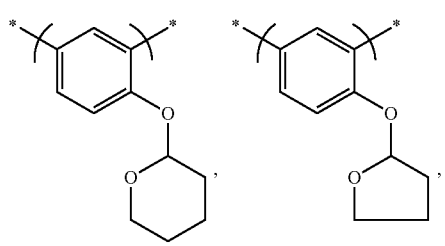
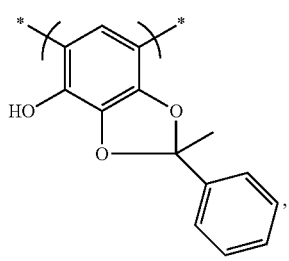
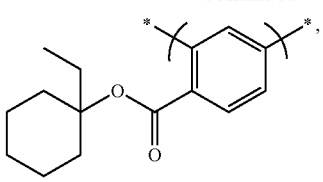
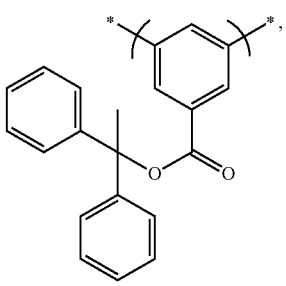
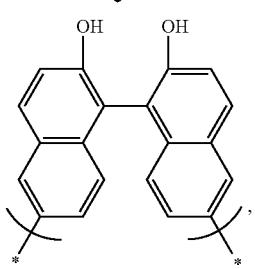
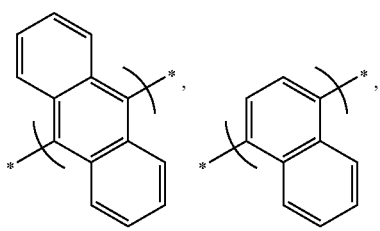
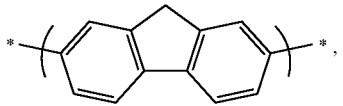
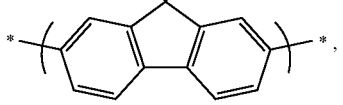
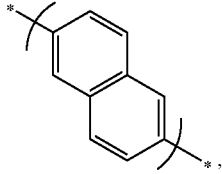
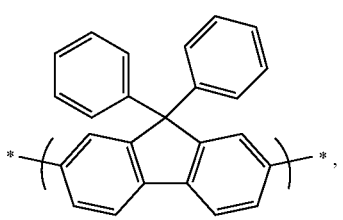

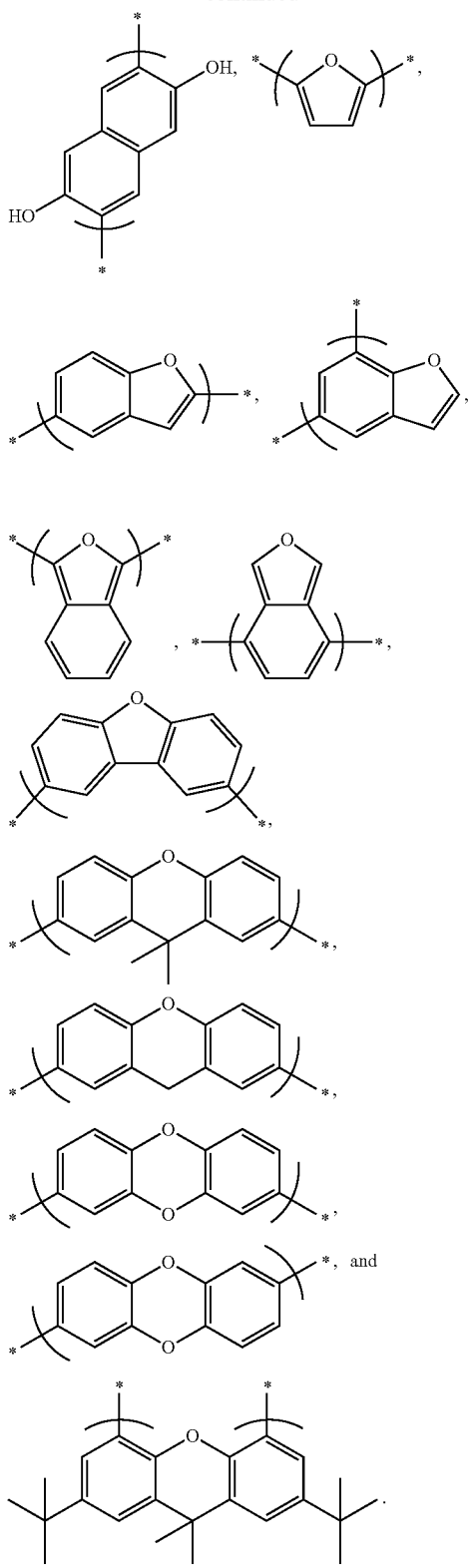

In some embodiments, the polymer is end-capped with terminal groups —Ar$^4$, wherein each Ar$^4$ is independently an unsubstituted or substituted C$_{6-18}$ arylene, or unsubstituted or substituted C$_{3-18}$ heteroarylene. Specific examples of Ar$^4$ include

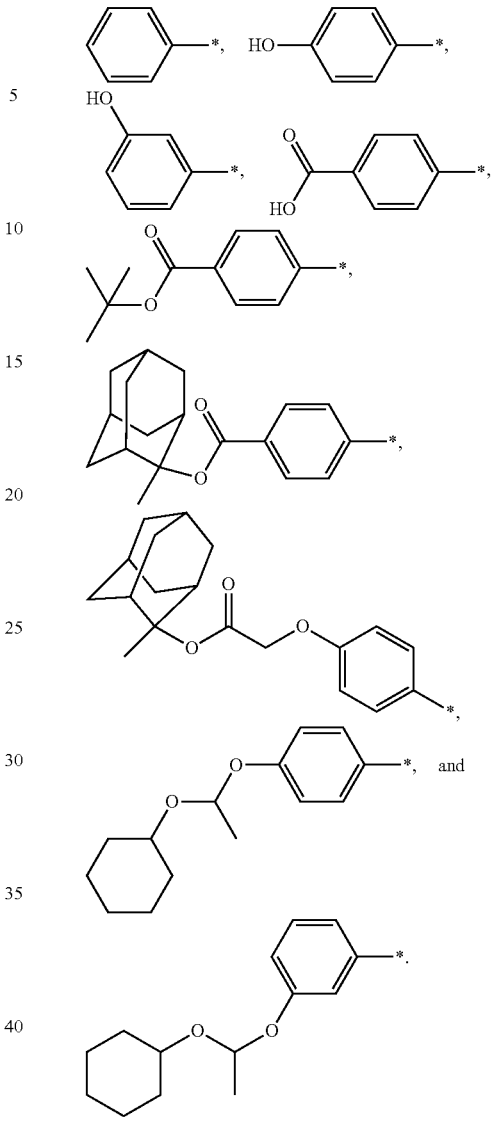

In some embodiments, at least one endcapping reagent of the form Ar$^4$—X or Ar$^4$—B$^x$, wherein X and B$^x$ are defined above, is added after completion of the polymerization reaction as a method to (1) reduce the halogen and/or boron content of the polymer and/or (2) to adjust polymer properties that include solubility and substrate adhesion. In some embodiments, a suitable amount of endcapping reagent is 0.01 to 5 equivalents with respect to the initial monomer concentration, specifically 0.1 to 0.3 equivalents with respect to the initial monomer concentration.

In some embodiments, at least one endcapping reagent of the form Ar$^4$—X or Ar$^4$—B$^x$, wherein X and B$^x$ are defined above, is added at the beginning or during the course of the polymerization as a method to (1) limit molecular weight, (2) reduce the halogen and/or boron content of the final polymer and/or (3) to adjust specific polymer properties that include solubility and substrate adhesion. Suitable amounts of the end capping reagent dependent on the targeted molecular weight and/or relative reactivity of the end capping reagent in comparison with monomer reactivity and range from 0.0001 to 1 equivalent with respect to initial monomer concentration.

In some embodiments, the polymer comprises a plurality of repeat units having the structure

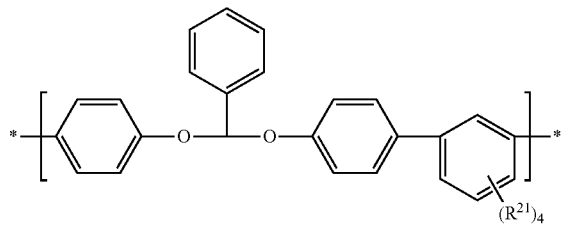

wherein one occurrence of $R^{21}$ is hydroxyl and the other three occurrence of $R^{21}$ are hydrogen; or two occurrences of $R^{21}$ are hydroxyl and the other two occurrences of $R^{21}$ are hydrogen; or three occurrences of $R^{21}$ are hydroxyl and the other occurrence of $R^{21}$ is hydrogen; or all four occurrences of $R^{21}$ are hydroxyl; or any of the foregoing occurrences of $R^{21}$ that are hydroxyl can instead be an acetal or an ester;

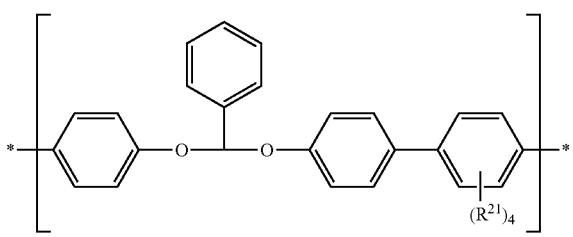

wherein one occurrence of $R^{21}$ is hydroxyl and the other three occurrence of $R^{21}$ are hydrogen; or two occurrences of $R^{21}$ are hydroxyl and the other two occurrences of $R^{21}$ are hydrogen; or three occurrences of $R^{21}$ are hydroxyl and the other occurrence of $R^{21}$ is hydrogen; or all four occurrences of $R^{21}$ are hydroxyl; or any of the foregoing occurrences of $R^{21}$ that are hydroxyl can instead be an acetal or an ester; in some embodiments, the polymer comprises a plurality of repeat units selected from

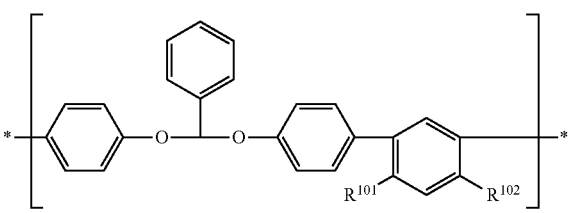

wherein $R^{101}$ is hydrogen or hydroxyl, and $R^{102}$ is hydroxyl when $R^{101}$ is hydrogen, or $R^{102}$ is hydrogen when $R^{101}$ is hydroxyl;

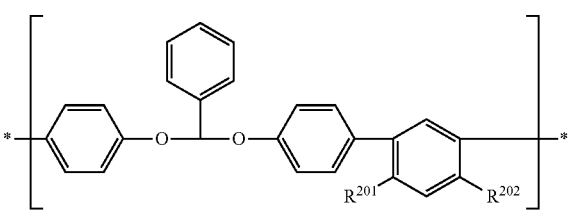

wherein $R^{201}$ is hydrogen or —OCHVE, and $R^{202}$ is —OCHVE when $R^{201}$ is hydrogen, or hydrogen when $R^{201}$ is —OCHVE, wherein —OCHVE is

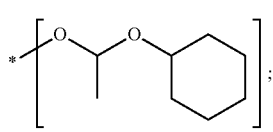

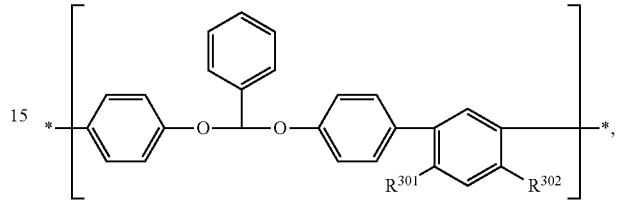

wherein $R^{301}$ is —O—C(=O)—CH$_3$ (acetate) or —OCHVE, and $R^{302}$ is —OCHVE when $R^{301}$ is —OC(=O)—CH$_3$ (acetate), or —OC(=O)—CH$_3$ (acetate) when $R^{301}$ is —OCHVE;

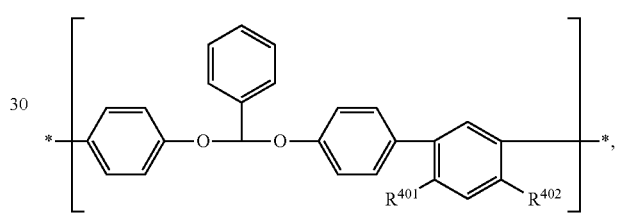

wherein $R^{401}$ and $R^{402}$ are each independently hydroxyl or —OCHVE;

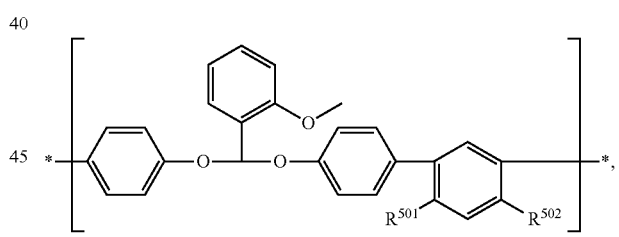

wherein $R^{501}$ is hydrogen or hydroxyl, and $R^{502}$ is hydroxyl when $R^{501}$ is hydrogen, or $R^{502}$ is hydrogen when $R^{501}$ is hydroxyl;

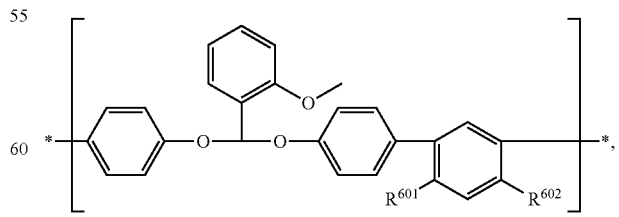

wherein $R^{601}$ is hydrogen or —OCHVE, and $R^{602}$ is —OCHVE when $R^{601}$ is hydrogen, or hydrogen when $R^{601}$ is —OCHVE;

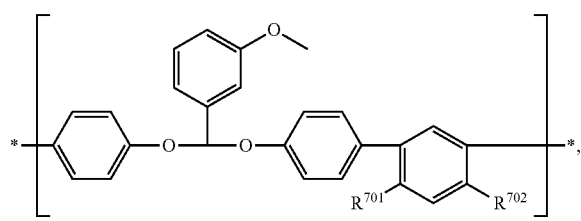

wherein $R^{701}$ is hydrogen or hydroxyl, and $R^{702}$ is hydroxyl when $R^{701}$ is hydrogen, or $R^{702}$ is hydrogen when $R^{701}$ is hydroxyl;

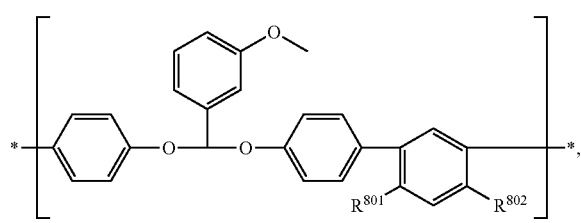

wherein $R^{801}$ is hydrogen or —OCHVE, and $R^{802}$ is —OCHVE when $R^{801}$ is hydrogen, or hydrogen when $R^{801}$ is —OCHVE;

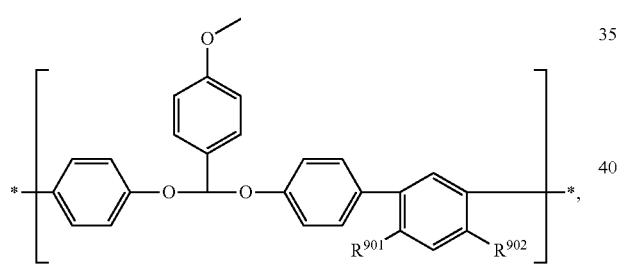

wherein $R^{901}$ is hydrogen or hydroxyl, and $R^{902}$ is hydroxyl when $R^{901}$ is hydrogen, or $R^{902}$ is hydrogen when $R^{901}$ is hydroxyl;

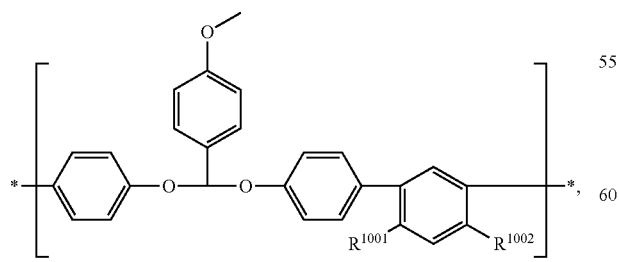

wherein $R^{1001}$ is hydrogen or —OCHVE, and $R^{1002}$ is —OCHVE when $R^{1001}$ is hydrogen, or hydrogen when $R^{1001}$ is —OCHVE;

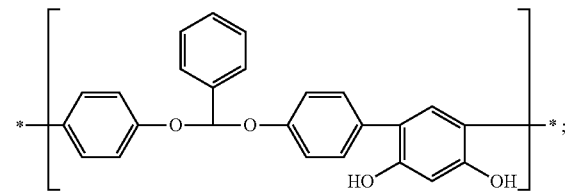

wherein $R^{1101}$ is hydrogen or O—CH$_2$—C(=O)—O-Ad, and $R^{1102}$ is —O—CH$_2$—C(=O)—O-Ad when $R^{1101}$ is hydrogen, or hydrogen when $R^{1101}$ is —O—CH$_2$—C(=O)—O-Ad, wherein —CH$_2$—C(=O)—O-Ad is

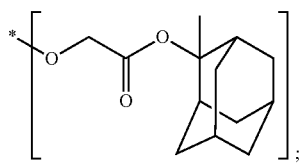

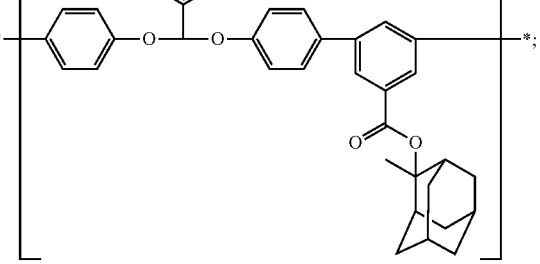

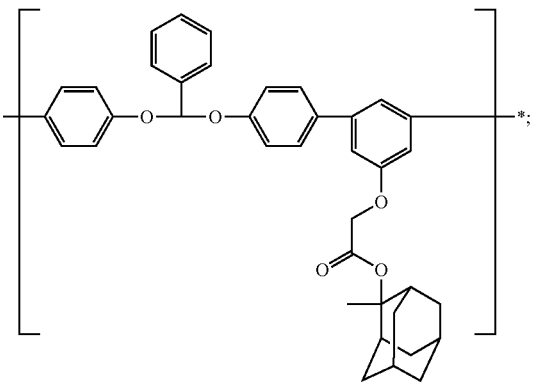

-continued

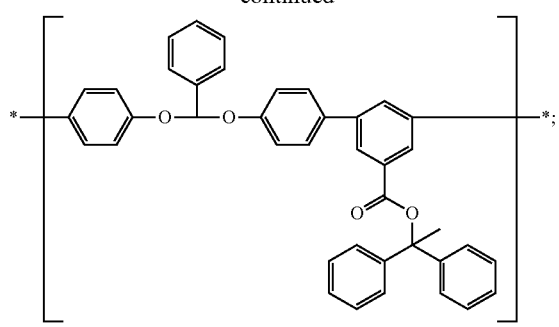

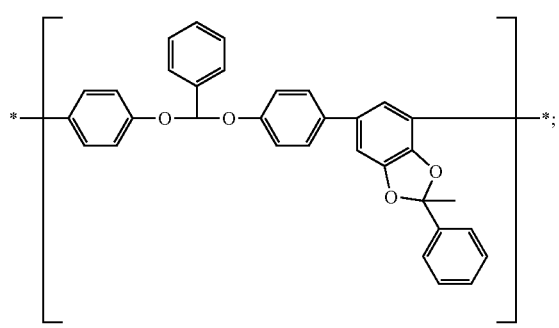

and combinations thereof.

Specific examples of polymers include a polymer comprising repeat units having the structure

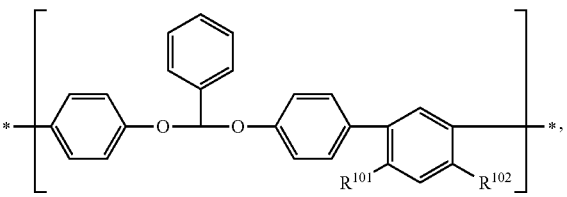

wherein $R^{101}$ is hydrogen or hydroxyl, and $R^{102}$ is hydroxyl when $R^{101}$ is hydrogen, or $R^{102}$ is hydrogen when $R^{101}$ is hydroxyl; a polymer comprising repeat units having the structure

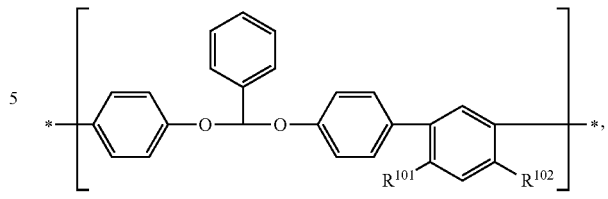

wherein $R^{101}$ is hydrogen or hydroxyl, and $R^{102}$ is hydroxyl when $R^{101}$ is hydrogen, or $R^{102}$ is hydrogen when $R^{101}$ is hydroxyl (preferably in an amount of 60 to 99 mole percent of total repeat units), and repeat units having the structure

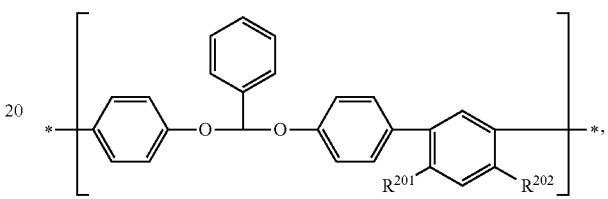

wherein $R^{201}$ is hydrogen or —OCHVE, and $R^{202}$ is —OCHVE when $R^{201}$ is hydrogen, or hydrogen when $R^{201}$ is —OCHVE, wherein —OCHVE is

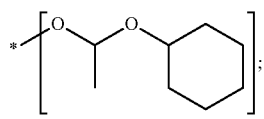

(preferably in an amount of 1 to 40 mole percent of total repeat units); a polymer comprising repeat units having the structure

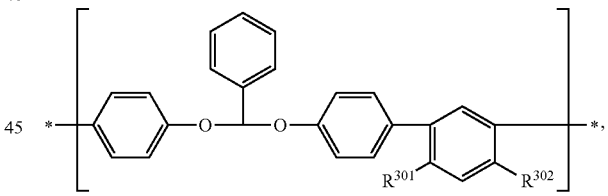

wherein $R^{301}$ is —O—C(=O)—CH$_3$ (acetate) or —OCHVE, and $R^{302}$ is —OCHVE when $R^{301}$ is —OC(=O)—CH$_3$ (acetate), or —OC(=O)—CH$_3$ (acetate) when $R^{301}$ is —OCHVE; a polymer comprising repeat units having the structure

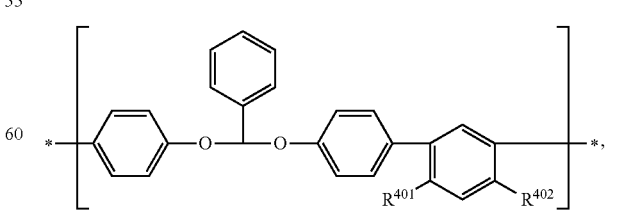

wherein $R^{401}$ and $R^{402}$ are each independently hydroxyl or —OCHVE (preferably such that about 1 to about 70 mole percent of the total moles of $R^{401}$ and $R^{402}$ are —OCHVE, and 60 to 99 mole percent of the total moles of $R^{401}$ and $R^{402}$ are hydroxyl); a polymer comprising repeat units having the structure

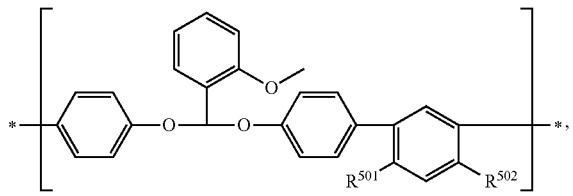

wherein $R^{501}$ is hydrogen or hydroxyl, and $R^{502}$ is hydroxyl when $R^{501}$ is hydrogen, or $R^{502}$ is hydrogen when $R^{501}$ is hydroxyl (preferably in an amount of 60 to 99 mole percent of total repeat units), and repeat units having the structure

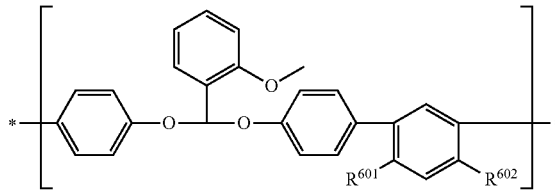

wherein $R^{601}$ is hydrogen or —OCHVE, and $R^{602}$ is —OCHVE when $R^{601}$ is hydrogen, or hydrogen when $R^{601}$ is —OCHVE (preferably in an amount of 1 to 40 mole percent of total repeat units); a polymer comprising repeat units having the structure

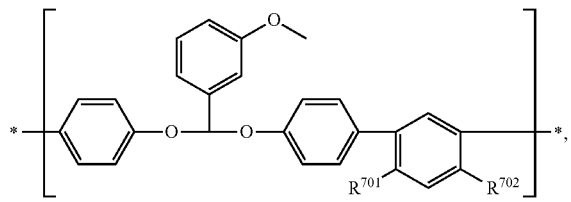

wherein $R^{701}$ is hydrogen or hydroxyl, and $R^{702}$ is hydroxyl when $R^{701}$ is hydrogen, or $R^{702}$ is hydrogen when $R^{701}$ is hydroxyl (preferably in an amount of 60 to 99 mole percent of total repeat units), and repeat units having the structure

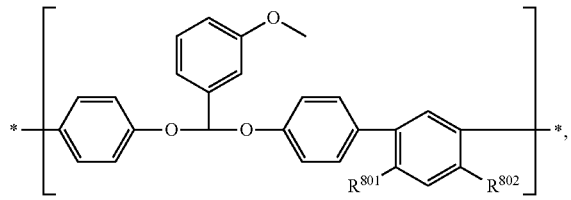

wherein $R^{801}$ is hydrogen or —OCHVE, and $R^{802}$ is —OCHVE when $R^{801}$ is hydrogen, or hydrogen when $R^{801}$ is —OCHVE (preferably in an amount of 1 to 40 mole percent of total repeat units); a polymer comprising repeat units having the structure

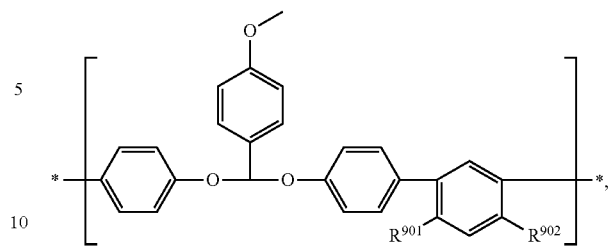

wherein $R^{901}$ is hydrogen or hydroxyl, and $R^{902}$ is hydroxyl when $R^{901}$ is hydrogen, or $R^{902}$ is hydrogen when $R^{901}$ is hydroxyl (preferably in an amount of 60 to 99 mole percent of total repeat units), and repeat units having the structure

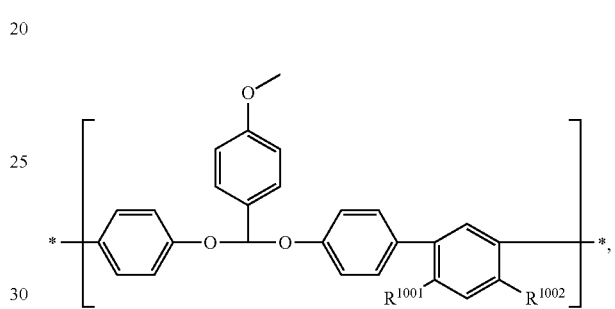

wherein $R^{1001}$ is hydrogen or —OCHVE, and $R^{1002}$ is —OCHVE when $R^{1001}$ is hydrogen, or hydrogen when $R^{1001}$ is —OCHVE (preferably in an amount of 1 to 40 mole percent of total repeat units); a polymer comprising repeat units having the structure

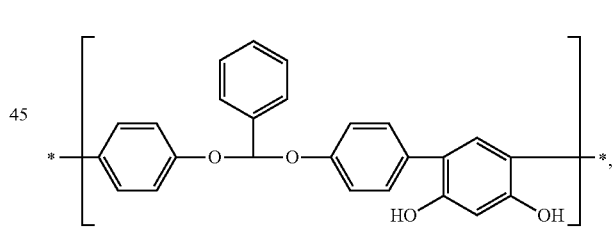

and repeat units having the structure

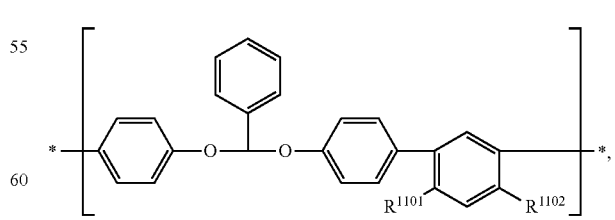

wherein $R^{1101}$ is hydrogen or O—CH$_2$—C(=O)—O-Ad, and $R^{1102}$ is —O—CH$_2$—C(=O)—O-Ad when $R^{1101}$ is hydrogen, or hydrogen when $R^{1101}$ is —O—CH$_2$—C(=O)—O-Ad, wherein —CH$_2$—C(=O)—O-Ad is

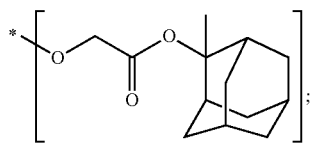

a polymer comprising repeat units having the structure

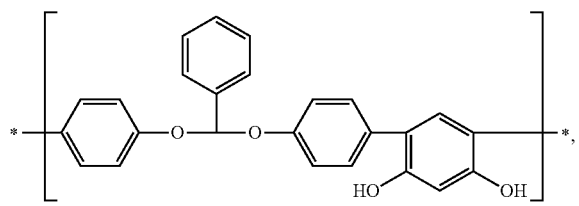

and repeat units having the structure

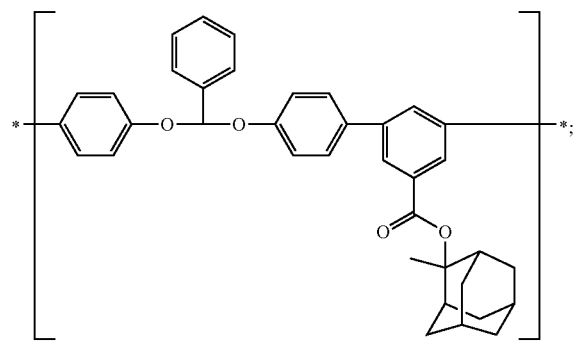

a polymer comprising repeat units having the structure

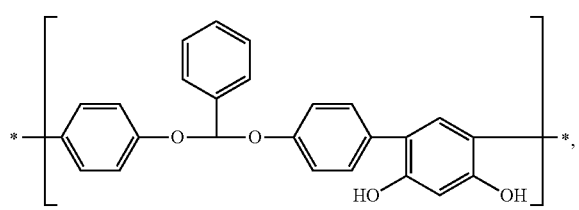

and repeat units having the structure

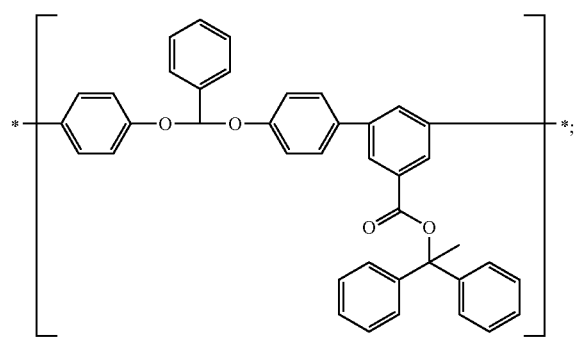

and a polymer comprising repeat units having the structure

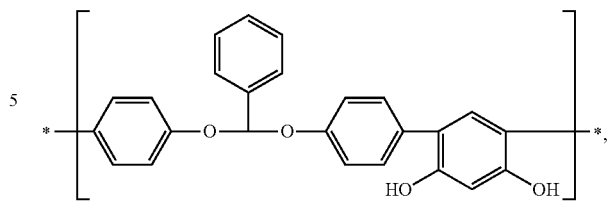

and repeat units having the structure

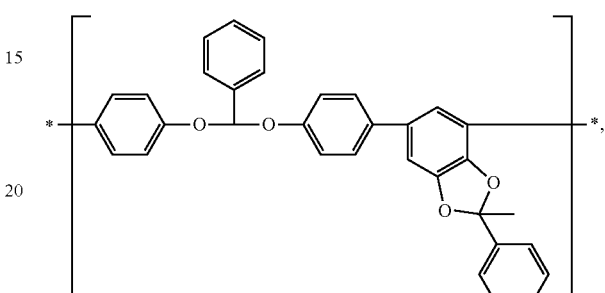

and repeat units having the structure

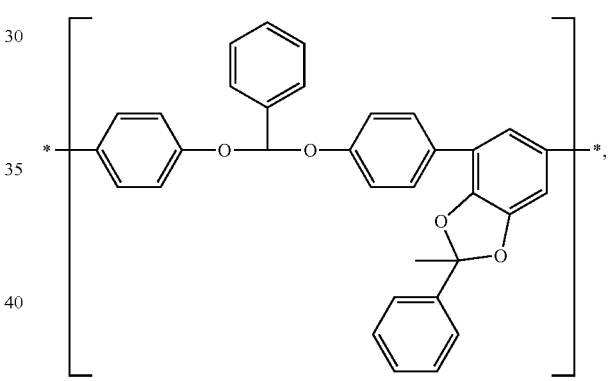

In a very specific embodiment, the polymer comprises a plurality of repeat units having the structure

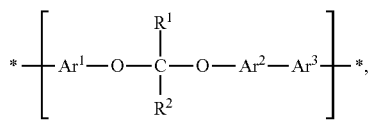

wherein each occurrence of $Ar^1$ and $Ar^2$ is 1,4-phenylene; each occurrence of $Ar^3$ is unsubstituted or substituted 1,3-phenylene, wherein, in at least 40 mole percent of the plurality of repeat units, $Ar^3$ is substituted with at least one hydroxyl; each occurrence of $R^1$ is hydrogen; and each occurrence of $R^2$ is phenyl.

The polymer can be used in various articles and applications, including biological applications (e.g., pH-dependent delivery of active agents including pharmaceuticals), prodrugs and amplified drug release, microencapsulation and extended release applications (e.g., encapsulation of active agents for pharmaceutical or agricultural applications); diagnostic applications; signal amplification; photoresists for lithography, including lithography using ultraviolet (UV) wavelengths, extreme ultraviolet wavelengths (EUV), and electron beams, photoresist topcoats and underlayers; electronic devices including patternable light emitting devices (OLED/PLED), photovoltaic devices, organic thin-film transistors (TFTs), and molecular logic gates; photographic applications such as detection or imaging of radioactive compounds or UV radiation; and pH indicators.

The invention is further illustrated by the following examples.

GENERAL PROCEDURES

All solvents and reagents were obtained in commercially available qualities purum, puriss. or p.a. Dry solvents were obtained from in-house purification/dispensing system (hexane, toluene, tetrahydrofuran and diethyl ether) or purchased from Sigma-Aldrich, Fisher Scientific, or Acros. All experiments involving water sensitive compounds were conducted in oven dried glassware under nitrogen atmosphere or in a glovebox. Reactions were monitored by analytical thin-layer chromatography (TLC) on precoated aluminum plates (VWR 60 F254), visualized by UV light and/or potassium permanganate staining. Flash chromatography was performed on an Isco COMBIFLASH™ system with GRACERESOLV™ cartridges.

Proton nuclear magnetic resonance ($^1$H-NMR) spectra (500 megahertz (MHz) or 400 MHz) were obtained on a Varian VNMRS-500 or VNMRS-400 spectrometer at 30° C. unless otherwise noted. The chemical shifts were referenced to tetramethylsilane (TMS) (δ=0.00) in CDCl$_3$, Benzene-d$_5$ (7.15) in Benzene-d$_6$ or tetrahydrofuran-d$_7$ (THF-d$_7$; δ 3.58 (used) and 1.73) in THF-d$_8$. If necessary, peak assignment was carried out with the help of COSY, HSQC or NOESY experiments. $^{13}$C-NMR spectra (125 MHz or 100 MHz) were obtained on a Varian VNMRS-500 or VNRMS-400 spectrometer, chemical shifts were solvent or standard signals (0.0—TMS in CDCl$_3$, 128.02 Benzene-d$_6$, 67.57 (53.37)—THF-d$_8$). If NMR was used for quantification purposes, single scan experiments or relaxation delays of ≥30 seconds were used.

Except as otherwise noted, high resolution mass spectrometry was carried out as follows. For electrospray ionization mass spectrometry (EST/MS) and liquid chromatography coupled with electrospray ionization tandem mass spectrometry (EST/LC/MS/MS) studies, three microliter aliquots of the samples as 1 milligram/milliliter solutions in methanol were injected on an Agilent 1200SL binary gradient liquid chromatograph coupled to an Agilent 6520 QToF, quadrupole-time of flight MS system via a dual spray electrospray (ESI) interface operating in the PI mode. The following analysis conditions were used: Column: None—flow injection; Column temperature: 40° C.; Mobile phase: 0.3 M ammonium acetate in methanol; Flow: 0.25 milliliters/minute; UV detection: Diode Array 210 to 600 nanometers; ESI conditions: Gas Temp—350° C., Gas Flow—8 milliliters/minute, Capillary—3.5 kV, Nebulizer—45 pounds per square inch, Fragmentor—145 V; AutoMSMS conditions: Mode—±TOFMS and ±TOFMSMS; Centroid Resolution 12000(+) 2 Gigahertz Extended Dynamic Range, Scan—100 to 1700 atomic mass units (±MS), Rate—4 scans/second, Scan—50 to 1700 atomic mass units (±MS/MS), Rate—4 scans/second, Collision Energy: 5V+5V/100 atomic mass units, Collision Gas: Nitrogen, Isolation Width ~4 atomic mass units, Reference Ions: 121.050873: 922.009798 (+); 112.985587, 1033.988109. For high resolution gas chromatography/mass spectrometry (GC/MS) studies, one microliter of sample as 3 milligrams/milliliter solution in methylene chloride were injected onto a Agilent 7890A gas chromatograph coupled to a Agilent 7200 QToF, quadrupole-time of flight MS system in negative chemical ionization (with ammonia as reactant gas) (NCI—NH$_3$) modes. The following analysis conditions were used: Column: 30 meter×0.25 millimeter (0.25 micrometer film) HP-SMS, Temperatures: Column—120° C. (2 minutes) to 320° C. @ 10° C./minute (hold 10 minutes); Injector—300° C.; Interface—300° C.; Source—165° C. (CI); Flow: Linear velocity—1.2 milliliter/minute constant flow; Split—130:1; Detector: Mode—+ TOFMS, CENT; Resolution—10000; 2 Ghz Extended Dynamic Range; Electron Energy—150 eV (CI); Scan—165 to 900 atomic mass units (—CI); Rate—5 scans/second; CI gas: ammonia flow 40.

Infrared spectra were acquired with a Perkin Elmer Spectrum One FT-IR and Universal ATR Sampling Accessory at a nominal resolution of 4 centimeter$^{-1}$ and 16 scans (approximate acquisition time of 90 seconds). The Universal ATR Sampling Accessory was equipped with a single bounce diamond/ZnSe crystal.

Melting points ($T_m$) and glass transition temperatures ($T_g$) were determined by differential scanning calorimetry (DSC) using TA Instruments Q2000 DSC, using T4 calibration (Indium, Sapphire). Approximately 5 milligrams of each sample was weighed into a TZero Aluminum DSC pan with lid. A heat:cool:heat temperature profile at a ramp rate of 10° C./minute was used, under nitrogen purge. Samples were heated from room temperature to 150° C., cooled to −90° C., and heated again to 150° C. Data analysis was performed using TA Universal Analysis software.

Weight average molecular weight ($M_n$) and number average molecular weight ($M_w$) and polydispersity ($D=M_w/M_n$) of polymers were determined by gel permeation chromatography. Two milligrams of the polymer sample was dissolved in 1.0 milliliter of uninhibited THF, followed by 0.22 micrometer membrane filtration and injection of 50 microliters of the resulting sample into an Agilent 1100 Series GPC system coupled to a refractive index detector. The following analysis conditions were used: column: 300×7.5 mm Agilent PLgel 5 μm MIXED-C; column temperature 35° C.; mobile phase: THF; flow 1 milliliter/minute; detector temperature: 35° C.

Thermal decomposition temperatures ($T_d$) were measured by thermogravimetric analysis (TGA) on a TA Instruments Q5000IR with Infrared accessory and autosampler. Approximately 5 milligrams of each sample was weighed into a TA high-temperature platinum pan. Samples were loaded at room temperature (using autosampler) and ramped to 600° C. at 10° C./minute under a constant dried air purge. Data analysis was performed using TA Universal Analysis software.

Preparative Example 1

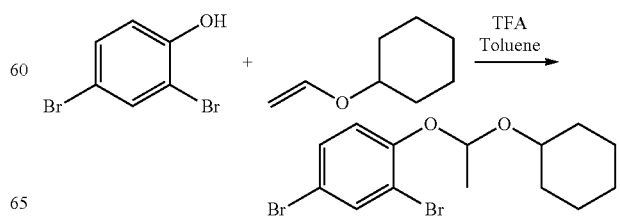

[1-(Cyclohexyloxy)ethoxy]-2,5 dibromophenol

Under nitrogen, to a solution of 2,4-dibromophenol (10.0 gram, 39.6 millimoles, 1.2 equivalents) and cyclohexyl vinyl ether (4.69 milliliters, 33.0 millimoles, 1.0 equivalent) in toluene (50 milliliters), was added 0.25 milliliter (3.30 millimoles, 0.10 equivalent) trifluoroacetic acid. The reaction was stirred at room temperature overnight (18-24 hours). The reaction was worked up by adding triethylamine (1.38 milliliters, 9.92 millimoles, 0.3 equivalents), followed by stirring for 5 minutes, and concentrating. The resulting oil was taken up in 50 milliliters hexanes and filtered through a plug of basic alumina. The plug was washed with 1.4 liters of a 1:1 solution of hexane and diethyl ether. The solvent was removed on the rotary evaporator and the resulting oil further dried under high vacuum for at least 24 hours. The product was obtained as a racemate in the form a colorless oil in a yield of 75% (9.35 grams, 24.7 millimoles). $^1$H NMR (500 MHz, CDCl$_3$) δ 7.67 (d, J=2.4 Hz, 1H), 7.33 (dd, J=8.8, 2.4 Hz, 1H), 7.05 (d, J=8.8 Hz, 1H), 5.47 (q, J=5.3 Hz, 1H), 3.68 (tt, J=9.3, 3.9 Hz, 1H), 1.97-1.63 (m, 4H), 1.55-1.48 (m, 1H), 1.51 (d, J=5.3 Hz, 3H), 1.43-1.33 (m, 1H), 1.33-1.12 (m, 4H). $^{13}$C NMR (126 MHz, CDCl$_3$) δ 152.63, 135.50, 131.04, 119.73, 115.19, 114.34, 99.76, 74.94, 33.41, 32.28, 25.52, 24.19, 24.02, 20.72. FTIR (thin film): 595, 641, 670, 689, 719, 782, 796, 817, 867, 891, 906, 959, 979, 1022, 1038, 1069, 1141, 1232, 1242, 1261, 1280, 1344, 1376, 1450, 1469, 1578, 2856, 2932, 2991 cm$^{-1}$; UV/Vis: 225 (shoulder), 238, 286 nm; HRMS (GC/MS/NCI—NH3): 374.95735 calc. for C$_{14}$H$_{17}$Br$_2$O$_2$ [M-H]$^-$, 374.9601, found 374.9591.

Preparative Example 2

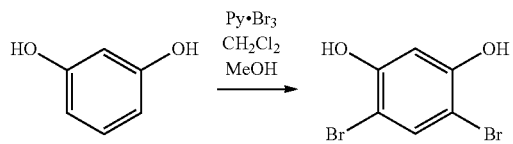 [SMILES: Oc1cccc(O)c1 ; Oc1cc(O)c(Br)cc1Br]

4,6-Dibromo-1,3-benzenediol

This synthesis was adapted from Shoji Kajigaeshi, Takaaki Kakinami, Tsuyoshi Okamoto, Hiroko Nakamura, Masahiro Fujikawa, *Bulletin of the Chemical Society of Japan*, 1987, volume 60, pages 4187-4189. To a solution of resorcinol (5.00 grams, 45.4 millimoles, 1.0 equivalent), dissolved in 100 milliliters dichloromethane and 40 milliliters methanol, pyridinium tribromide (29.0 grams, 90.8 millimoles, 2.0 equivalent) was added in small portions over the course of 60-70 minutes. The reaction was stirred at room temperature overnight. The solvent was removed on the rotary evaporator, and the residue taken up in chloroform (1×50 milliliters) and reconcentrated. Addition of ethyl acetate resulted in precipitation of side product. The ethyl acetate phase was separated by decanting, and the precipitate was further washed several times (4×150 milliliters 1:1 ether/ethyl acetate, 1×150 milliliters ethyl acetate, solvent separated by decanting). The combined decanted solvents were concentrated, followed by purification via automated flash chromatography (methanol in chloroform, 0-15%). The product was obtained in the form of an off-white solid (10.9 grams, 40.7 millimoles, 90%). m.p.: 66.4° C.; $^1$H-NMR (400 MHz, CDCl$_3$) δ 7.53 (s, 1H), 6.74 (s, 1H), 5.46 (s, 2H); $^{13}$C NMR (101 MHz, THF-d8) δ 155.60, 136.10, 105.13, 100.74, 67.57; FTIR: 569, 594, 659, 742, 837, 868, 993, 1053, 1138, 1193, 1282, 1326, 1440, 1462, 1494, 1577, 1598, 1711, 2918, 3089, 3379, 3451, 3504 cm$^{-1}$; UV/Vis: 223, 236, 296 nm; ESI/MS/MS of m/z=267: 267 [M$_{79Br/81Br}$-H]$^-$, 188 [M$_{81Br}$-HBr)]$^-$, 186 [M$_{79Br}$-HBr)]$^-$, 160 [M$_{81Br}$-HBr—CO)]$^-$, 158 [M$_{79Br}$-HBr—CO)]$^-$, 81 [$^{81}$Br]$^-$, 79 [$^{79}$Br]$^-$; HRMS (ESI$^-$): 374.95735 calc. for C$_6$H$_3$Br$_2$O$_2$$^-$ [M-H]$^-$: 264.8505, found 264.8510.

Preparative Example 3

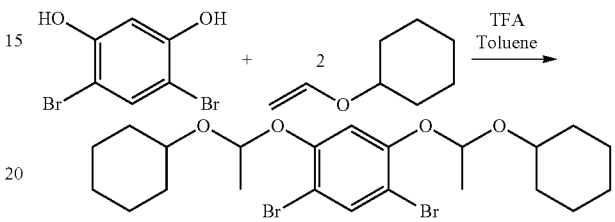

[1,3-Bis(cyclohexyloxy)ethoxy]-2,5-dibromoresorcinol

Under nitrogen, 2,4-dibromo-resorcinol (10.5 grams, 39.1 millimoles, 1.0 equivalent) and cyclohexyl vinyl ether (11.3 milliliters, 80.1 millimoles, 2.05 equivalents) were dissolved in toluene (100 milliliters), and trifluoroacetic acid (0.30 milliliters, 3.91 millimoles, 0.10 equivalent) was added. The mixture was stirred at room temperature overnight (18-24 hours). The reaction was quenched by addition of triethylamine (1.63 milliliters, 11.7 millimoles, 0.3 equivalents) and concentrated. The resulting oil was taken up in hexanes (50 milliliters) and filtered through a plug of basic alumina, using additional hexane (~1 liter) to completely elute the product. The solvent was removed on the rotary evaporator and the resulting product was further dried under high vacuum for at least 24 hours. The target compound was obtained as a racemic mixture of diastereomers in the form of a slightly yellow oil (16.1 grams, 30.9 millimoles, 79%). $^1$H-NMR (400 MHz, CDCl$_3$) δ 7.67 (s, 0.47H (diast. a)), 7.67 (s, 0.53H (diast. b)), 7.12 (s, 1H (diast. a, b)), 5.46 (q, J=5.3 Hz, 2H, (diast. a, b)), 3.75-3.65 (m, 2H (diast. a, b)), 1.95-1.63 (m, 8H (diast. a, b)), 1.55-1.48 (m, 2H), 1.51 (d, J=5.3 Hz, 2.82H (diast. a)), 1.51 (d, J=5.3 Hz, 3.13H (diast. b)), 1.45-1.12 (m, 10H); $^{13}$C NMR (101 MHz, THF-d8) δ 155.09 (diast. b), 155.05 (diast. a), 137.22 (diast. a?), 137.20 (diast. b?), 110.60 (diast. b), 110.40 (diast. a), 107.64 (diast. b), 107.54 (diast. a), 101.35 (diast a?), 101.31 (diast. b?), 76.00 (diast. b), 75.91 (diast. a), 35.19 (diast. b?), 35.17 (diast. a?), 33.99 (diast. b?), 33.97 (diast. a?), 27.38 (diast. a, b), 21.72 (diast b.), 21.65 (diast. a).

Preparative Example 4

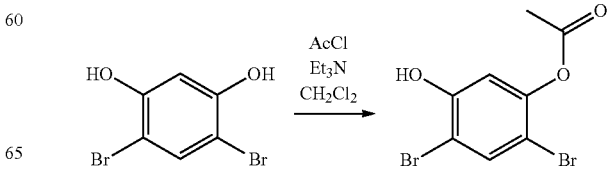

2,4-Dibromo-5-hydroxyphenyl acetate

Under nitrogen, 4,6-dibromo-1,3-benzenediol (10.58 gram, 39.5 millimoles, 1.0 equivalent) and triethylamine (11.0 milliliter, 7.99 grams, 79.0 millimoles, 2.0 equivalents) dissolved in dichloromethane (80 milliliters) were cooled to 0° C. Acetyl chloride (3.09 milliliters, 43.4 millimoles, 1.1 equivalents) were added over the course of 17 minutes. The reaction was allowed to warm to room temperature and was stirred overnight. The reaction was worked up by removal of the volatiles by rotary evaporation. The solid residue was taken up in 100 milliliters ethyl acetate. The mixture was allowed to stir for 5 minutes, and the precipitate was removed by filtration. The product was purified by gradient flash column chromatography (ethyl acetate in hexane, 0 to 40%). The product was obtained in the form of a colorless solid (6.73 grams, 21.7 millimoles, 55%). m.p.: 121.3° C.; $^1$H-NMR (400 MHz, CDCl$_3$) δ 7.69 (s, 1H), 6.85 (s, 1H), 5.59 (s, 1H), 2.34 (s, 3H); $^{13}$C NMR (101 MHz, THF) δ 168.12, 155.60, 149.52, 136.49, 112.77, 108.40, 106.30, 20.59; FTIR 570, 647, 690, 707, 768, 842, 872, 920, 1025, 1060, 1168, 1206, 1240, 1367, 1394, 1489, 1580, 1599, 1718, 2936, 2993, 3082, 3296 cm$^{-1}$; UV/Vis: 221, 229 (overlapping), 292 nm; ESI/MS/MS of m/z=309: 309 [M$_{79Br/81Br}$-H]$^-$, 267 [M$_{79Br/81Br}$−(CH$_2$C═O, H)]$^-$, 81 [$^{81}$Br]$^-$, 79 [$^{79}$Br]$^-$; HRMS (ESI$^-$): calc. for C$_8$H$_5$Br$_2$O$_3^-$ [M-H]$^-$ 306.8605, found 306.8622.

Preparative Example 5

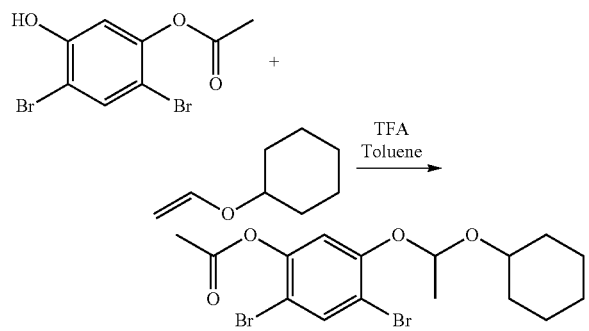

2,4-Dibromo-5-(1-(cyclohexyloxy)ethoxy)phenyl acetate

Under nitrogen, 2,4-dibromo-5-hydroxyphenyl acetate (4.00 grams, 12.9 millimoles, 1.0 equivalent) and cyclohexyl vinyl ether (2.74 milliliters, 19.3 millimoles, 1.5 equivalents) was dissolved in toluene (50 milliliters). Trifluoroacetic acid (0.10 milliliters, 1.29 millimoles, 0.10 equivalent) was added, and the mixture stirred at room temperature overnight (18-24 hours). The reaction was quenched by adding triethylamine (0.53 milliliters, 3.87 millimoles, 0.3 equivalent), and the volatiles were removed on the rotary evaporator. The resulting oil was taken up in diethyl ether (30 milliliters) and filtered through a plug of basic alumina. The product was rinsed through with additional ether (500 milliliters). The solvent was removed on the rotary evaporator and the resulting oil was pumped on for over 24 hours. The product was obtained as a racemate in the form of a slightly yellow oil (3.77 grams, 8.64 millimoles, 67%). $^1$H NMR (400 MHz, CDCl$_3$) δ 7.76 (s, 1H), 7.00 (s, 1H), 5.48 (q, J=5.4 Hz, 1H), 3.69 (tt, J=9.1, 3.9 Hz, 1H), 2.34 (s, 3H), 1.94-1.63 (m, 4H), 1.55-1.48 (m, 1H), 1.52 (d, J=5.3 Hz, 3H), 1.44-1.02 (m, 5H); $^{13}$C NMR (101 MHz, THF-d8) δ 168.19, 154.65, 149.40, 136.68, 114.35, 111.79, 108.79, 100.94, 75.66, 34.45, 33.33, 26.69, 24.97, 24.85, 20.94, 20.55; FTIR (film) 647, 703, 725, 840, 891, 979, 1018, 1059, 1170, 1190, 1248, 1279, 1368, 1393, 1466, 1584, 1779, 2856, 2932 cm$^{-1}$; UV/Vis 223, 232 (overlapping), 290 nm; ESI/MS/MS of m/z=459: 459 [M$_{79Br/81Br}$+Na]$^+$, 341, 281, 207, 151, 109 83 [C$_6$H$_{11}$]$^+$; HRMS (ESI$^+$): calc. for C$_{16}$H$_{20}$Br$_2$NaO$_4^+$[M+Na]$^+$ 456.9621, found 456.9628.

Preparative Example 6

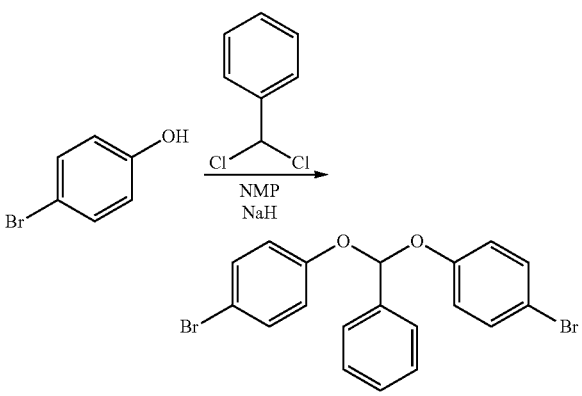

4,4'-((Phenylmethylene)bis(oxy))bis(bromobenzene)

Inside a nitrogen purged glove box, to a solution of 4-bromophenol (12.0 grams, 69.4 millimoles, 2.5 equivalents) dissolved in anhydrous 1-methyl-2-pyrrolidinone (100 milliliters), was added 95% sodium hydride (1.82 grams, 72.1 millimoles, 2.6 equivalents) in small portions over a 30 minute period. The reaction was stirred for an additional 90 minutes at room temperature. α,α-dichlorotoluene (4.13 milliliters, 27.7 millimoles, 1.0 equivalent) was added and the reaction was heated to 70° C. overnight. The reaction was quenched addition to water (200 milliliters). The aqueous phase was extracted with a 1:1 mixture of diethyl ether and ethyl acetate (3×120 mL). The combined organic phases were then washed with de-ionized water (5×100 milliliters), brine (1×100 milliliters) and dried over magnesium sulfate. After filtration and concentration on the rotary evaporator, the residue was taken up in diethyl ether (60 milliliters) and filtered through a plug of basic alumina. The product was fully eluted with additional diethyl ether (700 milliliters) and concentrated on the rotary evaporator. Further drying under high vacuum for several days yielded the product quantitatively in form of a yellow oil that crystallizes over time to give an off-white solid (12.0 grams, 27.7 millimoles, 100%). m.p.: 50.8; $^1$H-NMR (400 MHz, CDCl$_3$) δ 7.59-7.51 (m, 2H), 7.44-7.37 (m, 3H), 7.37-7.29 (m, 4H), 6.93-6.82 (m, 4H), 6.59 (s, 1H); $^{13}$C-NMR (101 MHz, CDCl$_3$) δ 155.07, 136.58, 132.59, 129.65, 128.86, 126.78, 119.60, 115.42, 100.77; FTIR: 605, 658, 674, 694, 741, 792, 816, 848, 886, 928, 984, 1031, 1060, 1100, 1115, 1167, 1178, 1210, 1242, 1280, 1304, 1363, 1449, 1483, 1584, 1689, 3033, 3065 cm$^{-1}$; UV/Vis 223 (shoulder), 237, 278 nm; GC/MS/EI$^+$: 432, 434, 436 [M$^+$] (2×Br isotope pattern); 261, 263 [Br—C$_6$H$_4$—O—CHPh]$^+$ (1×Br isotope pattern); 182 [$C_6H_4$—O—CHPh]+; HRMS (ESI): calc. for $C_{19}H_{13}Br_2O_2^-$ [M+Na]+ 430.9288, found 430.9287.

Preparative Example 7

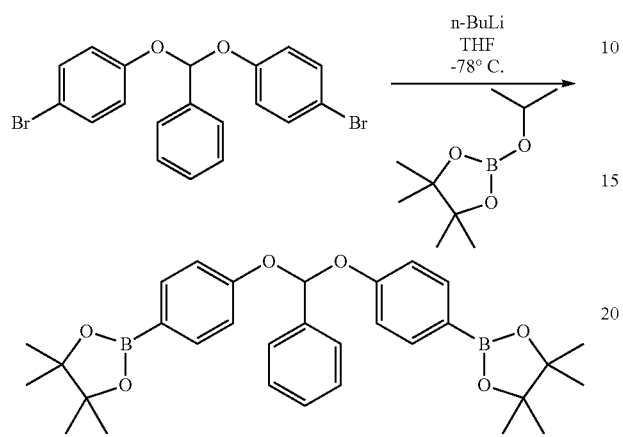

2,2'-(((Phenylmethylene)bis(oxy))bis(4,1-phenylene))-bis(4,4,5,5-tetramethyl-1,3,2-dioxaborolane)

4,4'-((Phenylmethylene)bis(oxy))bis(bromobenzene) (12.0 grams, 27.6 millimoles, 1.0 equivalent) in anhydrous THF (120 milliliters) under nitrogen was cooled to −78° C. using an acetone/dry ice bath. n-Butyllithium (1.6 M in hexanes, 42 milliliters, 65.5 millimoles, 2.4 equivalents) was added over a 60 minute period. The reaction was stirred at −78° C. for 90 minutes. 2-Isopropoxy-4,4,5,5-tetramethyl-1,3,2-dioxaborolane (17 milliliters, 83.1 millimoles, 3.00 equivalents) was added to the reaction drop-wise over a course of 30 minutes. The reaction was allowed to warm to room temperature overnight. The reaction was carefully quenched by drop-wise addition of water (2 milliliters), followed by stirring for 10 minutes. Dichloromethane (200 milliliters) was added and the reaction mixture was dried over magnesium sulfate. The solids were filtered off and the organic phase was concentrated. The residue was dissolved in dichloromethane (100 milliliters) and filtered through a plug of silica covered with a layer of CELITE™ diatomaceous earth. The produced was fully eluted with additional dichloromethane (400 milliliters) and the combined organic phases concentrated. The silica plug filtration process was repeated for two additional times. After the final concentration, the residue was re-crystallized from a minimum amount of boiling acetonitrile that was gradually cooled to 5° C. overnight. The colorless crystals were isolated by filtration, washed with a small aliquot of cold acetonitrile and dried in under vacuum at 65° C. overnight. The final product was obtained in a yield of 70% (10.2 grams, 19.3 millimoles). $^1$H-NMR (400 MHz, $CDCl_3$) δ 7.72-7.66 (m, 4H), 7.63-7.58 (m, 2H), 7.43-7.35 (m, 3H), 7.00-6.92 (m, 4H), 6.76 (s, 1H), 1.31 (s, 24H); $^{13}$C NMR (101 MHz, cdcl$_3$) δ 158.67, 137.10, 136.46, 129.27, 128.62, 126.69, 116.53, 99.72, 83.63, 24.86, 24.85 (one overlapping peak); FTIR: 578, 632, 651, 697, 733, 756, 832, 855, 884, 919, 964, 996, 1065, 1084, 1096, 1141, 1173, 1210, 1247, 1272, 1322, 1359, 1400, 1458, 1573, 1604, 2927, 2977 cm$^{-1}$; UV/Vis: 242 nm; ESI: 549, 550, 551, 552, 553 [M+Na]+ (isotope pattern consistent with 2×B and 31×C), 308, 309 (bp), 310 [pinB—$C_6H_4$—O—CHPh]+ (isotope pattern consistent with B and 19×C); HRMS (ESI+): calc. for $C_{31}H_{38}B_2NaO_6^+$ [M+Na]+ 551.2752, found 551.2762.

Preparative Example 8

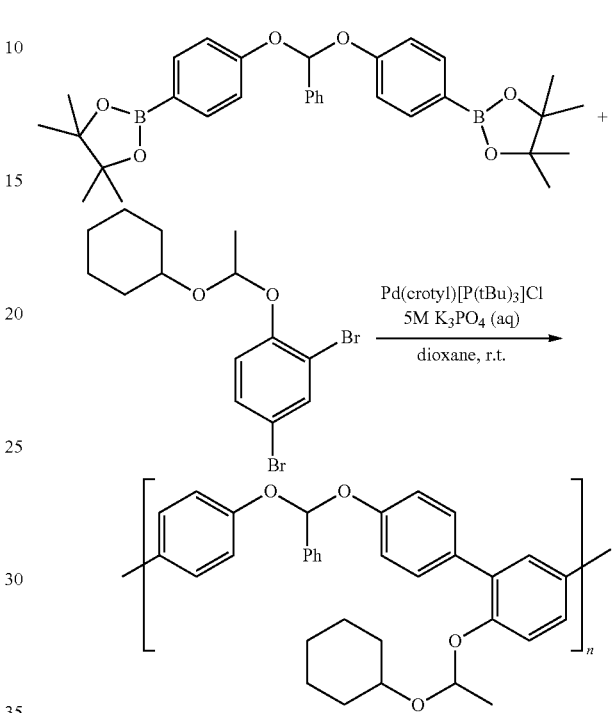

pBEBA-2,4-DBP-CHVE (100%)

Under nitrogen, in 500 milliliter round bottom flask, diboronic acid ester (7.0 grams, 13.25 millimoles, 1.00 equivalent) and [1-(cyclohexyloxy)ethoxy]-2,5 dibromophenol (4.81 grams, 12.72 millimoles, 0.96 equivalent) were combined and dissolved in oxygen free 1,4-dioxane (60 milliliters). (Different molecular weights can be synthesized by adjusting the boronic ester to dihalide ratio, using the Carothers equation as a guide.) Under nitrogen, in a separate vial Pd(crotyl)(tBu$_3$P)Cl (5.2 milligrams, 13.3 micromoles, 0.001 equivalent) was dissolved in 1 milliliter of oxygen-free 1,4-dioxane. In another separate vial, under nitrogen, potassium phosphate (8.80 grams, 41.5 millimoles, 3.13 equivalents) were dissolved in 12.8 milliliters degassed water. The potassium phosphate solution was added to the monomer solution and vigorously stirred. After the mixture turned into a homogenous emulsion the catalyst solution was added and the reaction stirred at room temperature overnight. Phenylboronic acid (242 milligrams, 1.99 millimoles, 0.15 equivalent) was added and the mixture was stirred for eight hours. Bromobenzene (417 milliliters, 624 milligrams, 3.98 millimoles, 0.30 equivalent) was added and the reaction was further stirred overnight. The reaction was worked up by separating and discarding the aqueous phase. The organic phase was concentrated on the rotary evaporator, taken up in ethyl acetate (~100 milliliters, some insoluble material was separated by decantation). A saturated aqueous solution of sodium diethyldithiodicarbamate (~10 milliliters) was added, the flask equipped with a reflux condenser and the mixture was vigorously stirred under reflux for 60 minutes. The organic phase was then separated and filtered through a plug of silica covered with basic alumina. The polymer was fully eluted with additional ethyl acetate (as determined by TLC spotting), concentrated to approximately 50 milliliters and precipitated three times from methanol. The polymer was separated by filtration, washed with additional methanol and dried for several days under high vacuum at 60° C. The product polymer was obtained in the form of a fine colorless powder (3.3 grams, 51% polymerization yield). DSC: $T_g$ at 104.1° C.; TGA: $T_d$ (5% weight loss) at 208.0° C.; GPC (against PMMA standard): $M_n$=4.73 kilodaltons (kDa), $M_w$=8.60 kDa, D=1.82; $^1$H NMR (400 MHz, THF-$d_8$) δ 7.71-7.61 (6.7%), 7.54-7.45 (14.1%), 7.44-7.32 (12.6%), 7.21-7.15 (3.2%), 7.10-6.97 (12.2%), 6.95-6.82 (3.5%), 5.67-5.07 (2.5%), 3.50-3.38 (2.7%), 2.47-2.45 (1.4%), 1.70-1.52 (12.4%), 1.45-1.02 (28.6%); $^{13}$C NMR (101 MHz, THF-$d_8$) δ 156.73, 156.63, 154.45, 139.11, 137.35, 135.96, 135.41, 134.05, 133.32, 131.73, 129.99, 129.84, 129.37, 128.56, 127.89, 127.86, 127.01, 118.82, 118.54, 117.53, 117.23, 101.18, 100.27, 84.38, 75.08, 34.40, 33.25, 26.77, 25.02, 24.87, 21.72.

Preparative Example 9

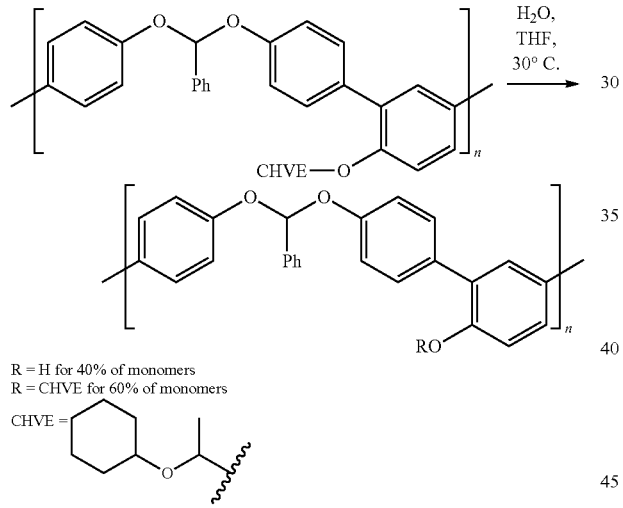

pBEBA-2,4-DBP-CHVE (60%)

Under nitrogen, 2.0 g of polymer pBEBA-2,4-DBR-CHVE (100%, $M_n$=3.94 kDa, $M_w$=6.17 kDa, D=1.56 kDa) was dissolved THF (15 milliliters) and deuterobenzene (5 milliliters). A 0.54 M aqueous trifluoroacetic acid solution was prepared by adding trifluoroacetic acid (398 microliters, 267 milligrams, 2.34 millimoles) to water (2.81 milliliters) and THF (6.42 milliliters). 64.0 microliters of TFA/water/THF mixture was added to the reaction via syringe. The reaction was kept at 30° C. Single-scan NMR samples were taken throughout the reaction and the progress of the deprotection was assessed by monitoring the integration ratio of the acetal proton (≈δ 5.3) and the phenol proton (≈δ 8.2). Once the acetal to phenol integration ratio was 60:40, the reaction was quenched by addition of triethylamine (30 microliters). The solvent was removed by rotary evaporation. The resulting residue was taken up in a small amount of ethyl acetate and precipitated from methanol (150 mL). The precipitate was collected by filtration, washed with a small aliquot of methanol and dried for several days at 50° C. under high vacuum. The final product was obtained in form of a colorless powder in a yield of 1.36 grams (75%). DSC: $T_g$ at 109.9° C.; TGA: $T_d$ (5% weight loss) at 197.4° C.; GPC (against PMMA standard): $M_n$=3.82 kDa, $M_w$=6.02 kDa, D=1.57; $^1$H-NMR (400 MHz, THF-$d_8$) δ 8.25-8.09 (1.4%), 7.69-7.62 (8.5%), 7.57-7.25 (32.4%), 7.22-7.15 (2.3%), 7.12-6.98 (14.9%), 6.95-6.81 (6.0%), 5.41-5.28 (1.8%), 3.51-3.40 (1.8%), 1.70-1.01 (30.9%) [Integration ratio 68.20/5.36 42:58]; $^{13}$C-NMR (101 MHz, THF-$d_8$)) δ 156.75, 156.64, 156.46, 156.43, 154.81, 154.45, 139.18, 139.11, 137.34, 136.43, 135.94, 135.42, 134.05, 134.03, 133.39, 133.37, 133.33, 133.32, 131.73, 131.43, 129.97, 129.84, 129.71, 129.37, 128.56, 128.32, 127.89, 127.86, 127.13, 127.00, 118.81, 118.53, 118.48, 118.45, 117.57, 117.54, 117.49, 117.39, 117.23, 101.23, 101.22, 101.18, 101.10, 100.27, 84.37, 75.08, 67.57, 34.40, 33.25, 26.77, 25.01, 24.87, 21.72.

Preparative Example 10

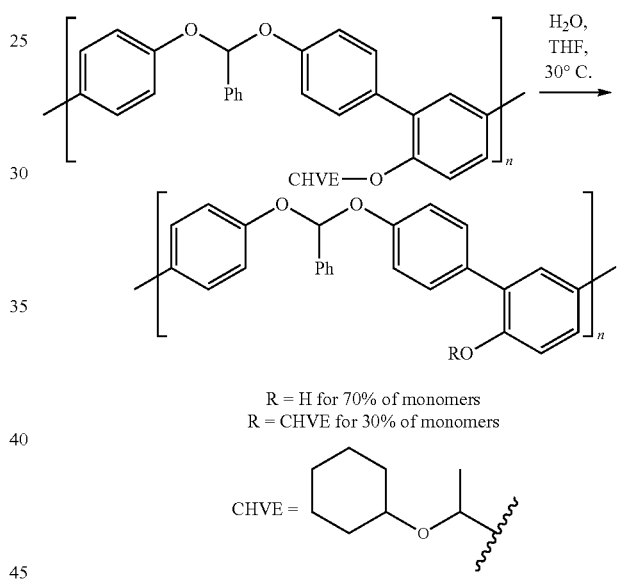

pBEBA-2,4-DBP-CHVE (30%)

Following the procedure of the previous example, but running the reaction to 70% conversion as determined by the NMR integration ratio of acetal and phenol protons, 30% CHVE-protected polymer was obtained. If 30% deprotection was not achieved after several days of stirring, water was added in 0.05 equivalent steps to drive further deprotection.

In a first representative batch starting from 1.00 gram polymer pBEBA-2,4-DBR-CHVE (100%, $M_n$=3.94 kDa, $M_w$=6.17 kDa, D=1.56): Yield: 602 mg (73%) of a colorless powder. DSC: $T_g$ at 117.5° C.; TGA: $T_d$ (5% weight loss) at 198.2° C.; GPC (against PMMA standard): $M_n$=3.86 kDa, $M_w$=6.03 kDa, D=1.63; $^1$H-NMR (400 MHz, THF-$d_8$) δ 8.22-8.12 (2.2%), 7.73-7.59 (8.9%), 7.57-7.14 (37.6%), 7.12-6.76 (23.7%), 5.43-5.29 (1.1%), 3.51-3.39 (1.2%), 1.70-1.03 (25.4%), [Integration ratio 6 8.20/5.36 67:33].

In a second representative batch starting from 3.30 g polymer pBEBA-2,4-DBR-CHVE (100%, $M_n$=3.94 kDa, Mw=6.17 kDa, D=1.56): Yield: 2.21 g (82%) of a colorless powder. DSC: $T_g$ at 135.6° C.; TGA: 5% weight loss at 233.3° C.; GPC (against PMMA standard): $M_n$=4.53 kDa, $M_w$=8.35 kDa, D=1.84; $^1$H-NMR (400 MHz, THF-$d_8$) δ 8.23-8.15 (2.6%), 7.72-7.58 (9.0%), 7.57-7.12 (39.6%), 7.12-6.77 (24.6%), 5.46-5.21 (1.1%), 3.49-3.37 (1.3%), 1.70-0.79 (22.04%), [Integration ratio δ 8.20/5.36 70:30]; $^{13}$C NMR (101 MHz, THF-d8) δ 156.46, 156.43, 154.81, 154.44, 139.20, 137.34, 136.42, 135.92, 135.42, 134.05, 133.39, 133.32, 131.73, 131.43, 129.96, 129.84, 129.71, 129.62, 129.39, 129.36, 128.88, 128.55, 128.32, 127.89, 127.52, 127.12, 127.00, 118.80, 118.53, 118.48, 118.44, 117.57, 117.54, 117.49, 117.39, 117.22, 111.20, 101.27, 101.21, 101.15, 100.27, 84.38, 75.08, 67.57, 34.40, 33.25, 26.76, 25.01, 24.87, 21.72.

Preparative Example 11

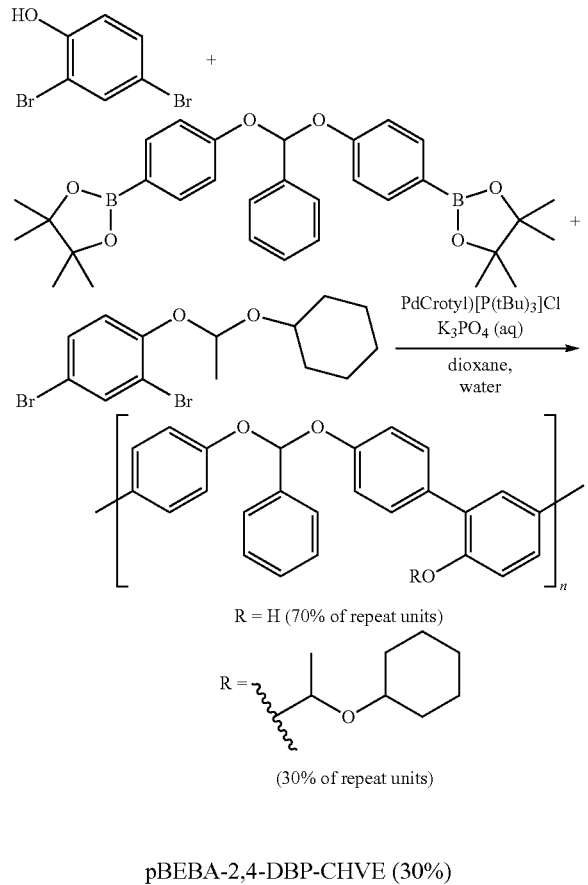

pBEBA-2,4-DBP-CHVE (30%)

This example illustrates synthesis of partially protected poly(arylacetal) polymer using mixed polymerization with a phenol-tolerant Suzuki coupling catalyst. Under nitrogen, 2,2'-(((phenylmethylene)bis(oxy))bis(4,1-phenylene))-bis (4,4,5,5-tetramethyl-1,3,2-dioxaborolane) (8.000 grams, 15.14 millimoles, 1.000 equivalent) and 2,4-dibromo-1-(1-(cyclohexyloxy)ethoxy)benzene (1.632 grams, 4.316 millimoles, 0.285 equivalent) were combined in a round bottom flask. Under nitrogen, in a separate vial, potassium phosphate (10.06 grams, 47.4 millimoles, 3.13 equivalents) were dissolved in deoxygenated water (13 milliliters). Under nitrogen, in a separate vial, Pd(crotyl)(P-tBu$_3$)Cl (6.0 milligrams, 15 micromoles, 0.001 equivalent) was dissolved degassed 1,4-dioxane (200 microliters). 1,4-dioxane (50 milliliters) was added to the main reaction vessel followed by the potassium phosphate solution. The mixture was vigorously stirred, until an emulsion was formed. The catalyst solution was then added via cannula. The reaction was stirred for 5 hours, then 2,4-dibromophenol (2.537 grams, 10.07 millimoles, 0.665 equivalent) was added. The reaction was stirred vigorously overnight. After 20-22 hours, phenyl boronic acid end cap (0.277 gram, 2.27 millimoles, 0.15 equivalent) was added. The reaction was stirred vigorously overnight. After 20-24 hours, bromobenzene end cap (477 microliters, 4.54 millimoles, 0.30 equivalent) was added. The reaction was stirred vigorously overnight. The reaction was worked up by adding 50 milliliters diluted brine and 100 milliliters ethyl acetate followed by shaking in an extraction funnel. The aqueous layer was removed and the remaining organic phase was further washed with brine (1×50 milliliters). The organic phase was transferred into a round bottom flask equipped with reflux condenser, a saturated aqueous solution of sodium diethyldithiodicarbamate (~10 milliliters) was added, and the mixture was vigorously stirred under reflux for 60 minutes. The organics phase was separated, dried over magnesium sulfate and filtered through a three-layered plug of CELITE™ diatomaceous earth (~0.25 inch on top), FLORISIL™ activated magnesium silicate (0.15 inch in middle), and silica gel (0.15 inch on bottom). The crude product was fully eluted with 200 milliliters ethyl acetate and the combined organic phases were washed with deionized water (5×50 milliliters) and concentrated on the rotary evaporator. The residue was taken up in ethyl acetate (~50 milliliters) with toluene (5-10 milliliters). The polymer was precipitated by drop-wise addition to stirred methanol (700 milliliters). Once the addition was complete, the suspension was stirred for 30 minutes and then allowed to settle. The precipitate was collected by filtering through a pre-washed disposable filter cartridge and air dried. The residue was again taken up in ethyl acetate (~50 milliliters) with toluene (5-10 milliliters), and the precipitation procedure repeated twice. After the final precipitation, the filter cake was dried under high vacuum oven at ~65° C. overnight. The product was obtained in the form of a colorless powder (5.55 grams, 91% polymerization yield). DSC: $T_g$ at 136.1° C.; TGA: $T_d$ (5% weight loss) at 270.9° C.; GPC (against PS standard): $M_n$=6.44 kDa, $M_w$=13.4 kDa, D=2.08; $^1$H NMR (500 MHz, THF-$d_8$) δ 8.28-8.16 (2.8%), 7.75-7.62 (9.4%), 7.60-7.16 (40.0%), 7.13-6.80 (24.7%), 5.43-5.31 (1.1%), 3.53-3.37 (1.2%), 1.71-1.06 (23.0%); [Integration ratio δ 8.20/5.36 71:29]; $^{13}$C NMR (101 MHz, THF-d8) δ 156.74, 156.44, 156.40, 154.83, 154.42, 139.16, 137.33, 136.41, 135.90, 135.40, 134.07, 134.04, 133.99, 133.36, 133.34, 133.32, 131.72, 131.42, 129.95, 129.82, 129.68, 129.61, 129.38, 129.36, 129.33, 128.54, 128.31, 127.88, 127.51, 127.10, 126.99, 118.79, 118.52, 118.49, 118.47, 118.44, 117.55, 117.52, 117.48, 117.38, 117.21, 109.32, 101.30, 101.25, 101.20, 101.15, 101.03, 100.26, 84.37, 75.08, 67.57, 34.38, 33.23, 26.75, 24.85, 21.71.

Preparative Example 12

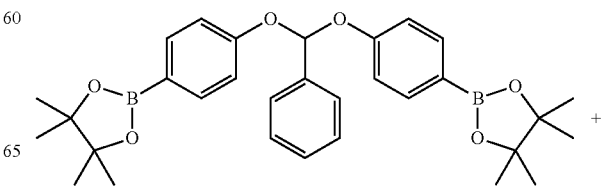

-continued

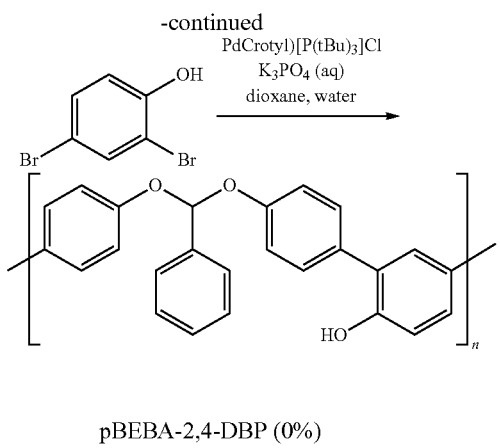

pBEBA-2,4-DBP (0%)

Under nitrogen, 2,2'-(((phenylmethylene)bis(oxy))bis(4,1-phenylene))-bis(4,4,5,5-tetramethyl-1,3,2-dioxaborolane) (6.000 grams, 11.36 millimoles, 1.000 equivalent) and 2,4-dibromophenol (2.718 grams, 10.79 millimoles, 0.950 equivalent) were combined in a round bottom flask. Under nitrogen, in a separate vial, potassium phosphate (7.54 grams, 35.5 millimoles, 3.13 equivalents) were dissolved in deoxygenated water (10 milliliters). Under nitrogen, in a separate vial, Pd(crotyl)(P-tBu$_3$)Cl (4.5 milligrams, 11.4 micromoles, 0.001 equivalent) was dissolved degassed 1,4-dioxane (200 microliters). 1,4-Dioxane (45 milliliters) was added to the main reaction vessel followed by the potassium phosphate solution. The mixture was vigorously stirred, until a homogeneous emulsion formed. The catalyst solution was then added via cannula. The reaction was stirred vigorously overnight. After 20-22 hours, phenyl boronic acid end cap (208 milligrams, 1.70 millimoles, 0.15 equivalent) was added. The reaction was stirred for 7-8 hours, then bromobenzene end cap (358 microliters, 3.41 millimoles, 0.30 equivalent) was added. The reaction was stirred vigorously overnight. The reaction was worked up by adding 50 mL diluted brine and 100 ml ethyl acetate followed by shaking in an extraction funnel. The aqueous layer was removed and the remaining organic phase was further washed with brine (1×50 milliliters). The organic phase was transferred into a round bottom flask equipped with reflux condenser, a saturated aqueous solution of sodium diethyldithiodicarbamate (~10 milliliters) was added, and the mixture was vigorously stirred under reflux for 60 minutes. Brine (30 milliliters) was added, the organics phase was isolated, dried over magnesium sulfate and filtered through a three layered plug of CELITE™ diatomaceous earth (~0.25 inch on top), FLORISIL™ activated magnesium silicate (0.15 inch in middle), and silica gel (0.15 inch on bottom). The crude product was fully eluted with ethyl acetate (200 milliliters) and the combined organic phases were concentrated on the rotary evaporator. The residue was taken up in ethyl acetate (~50 milliliters) with toluene (5-10 milliliters). The polymer was precipitated by dropwise addition to stirred methanol (700 milliliters). Once the addition was complete, the suspension was stirred for 30 minutes and then allowed to settle. The precipitate was collected by filtering through a pre-washed disposable filter cartridge and air dried. The residue was again taken up in ethyl acetate (~50 milliliters) with toluene (5-10 milliliters), and the precipitation procedure repeated twice. After the final precipitation, the filter cake was dried under high vacuum oven at ~65° C. overnight. The product was obtained in the form of a colorless powder (3.68 g, 88% polymerization yield). DSC: T$_g$ at 147.7° C.; TGA: T$_d$ (5% weight loss) at 291.0° C.; GPC (against PS standard): M$_n$=5.98 kDa, M$_w$=13.5 kDa, D=2.26; $^1$H NMR (400 MHz, THF-d$_8$) δ 8.23-8.16 (4.8%), 7.73-7.17 (61.7%), 7.09-6.98 (22.7%), 6.93-6.75 (11.3%); $^{13}$C NMR (101 MHz, THF-d$_8$) δ 156.46, 154.81, 139.19, 136.41, 134.06, 134.04, 133.41, 133.38, 131.43, 130.32, 129.95, 129.70, 129.62, 129.39, 129.37, 129.34, 128.88, 128.32, 127.88, 127.52, 127.13, 118.48, 118.44, 118.27, 117.57, 117.54, 117.40, 101.27, 101.15, 101.08, 101.03, 67.57.

Polymer Fragmentation and Deprotection

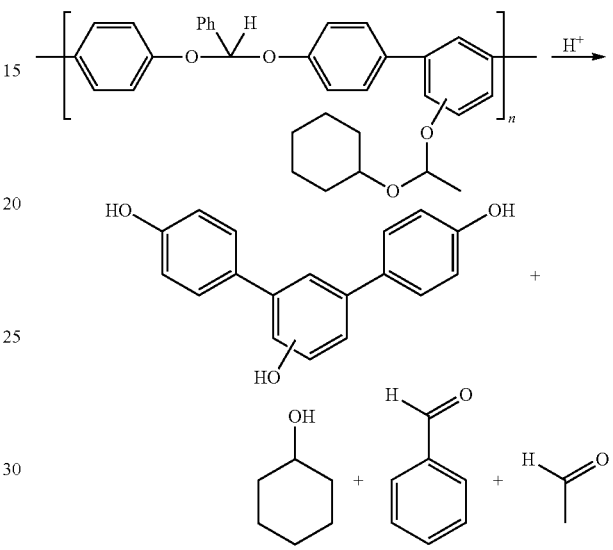

For the polymer degradation experiment, a 4.5 kDa sample of pBEBA-2,4-DBP-CHVE (20 milligrams), the synthesis of which is described in Preparative Example 8, was dissolved in 827 microliters of deutero-THF. The NMR spectrometer was equilibrated at 30° C. and a single pulse NMR spectrum was taken to adjust the receiver gain. The reaction was started by addition of 27 microliters of a 0.11 M of triflic acid solution in water. Repeated single pulse NMR spectra were taken every 30 seconds for the first 2.5 min, followed by increasing time intervals over the course of at least eight hours. Arrayed integration was carried out with MestReNova (Version 8.0.2-11021, 2012 Mestrelab research SLC) after phase adjustment and baseline correction.

FIG. 1 shows polymer backbone and side chain degradation of the polymer pBEBA-2,4-DBP-CHVE from Preparative Example 8 after treatment with dilute aqueous triflic acid. Upon deprotection of one equivalent of ethyl vinyl ether, one equivalent of acetaldehyde is formed that can be monitored by integration of a diagnostic aldehyde proton via $^1$H-NMR (upper curve). Backbone degradation results in formation of one equivalent of benzaldehyde per degraded acetal unit and can be monitored by integration of the diagnostic benzaldehyde proton via $^1$H-NMR (lower curve). Backbone and side-chain degradation are two independent processes that occur at different rates. Acid sensitivity of backbone acetals and side chain acetals can be independently adjusted by selecting appropriate substitutions patterns on the respective acetals.

Figure 2:
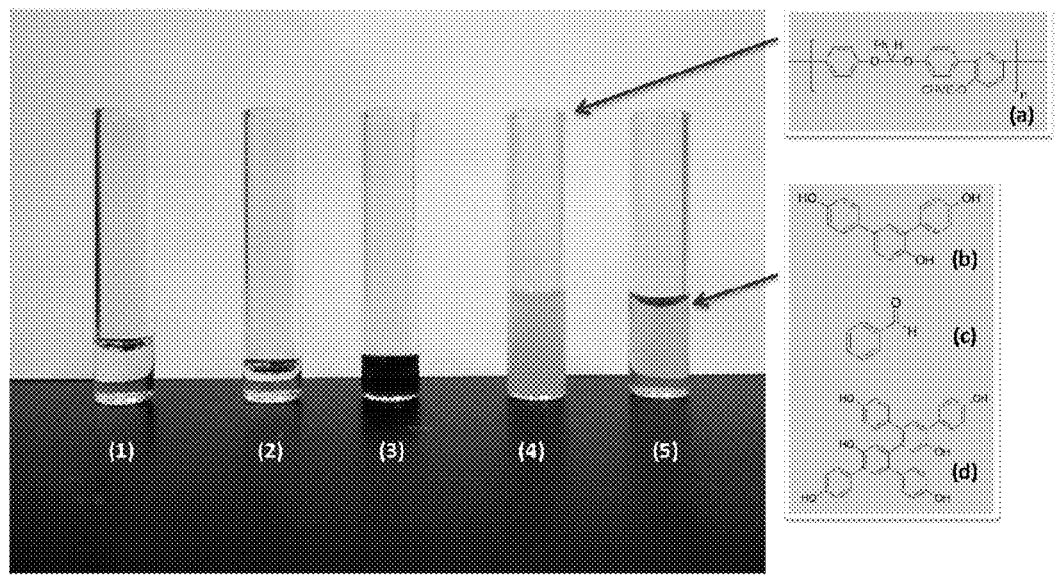
FIG. 2 shows that acid treatment of the polymer significantly affects its solubility properties.

FIG. 2 shows that acid treatment significantly affects the solubility properties of the polymer systems disclosed herein, using pBEBA-2,4-DBP-CHVE (Preparative Example 8) as an example substrate.

In vial (1), 5 milligrams of untreated pBEBA-2,4-DBP-CHVE (4.8 kDa) was dissolved in 200 microliters of propylene glycol monomethyl ether acetate (PGMEA). After a few minutes, a clear solution of pBEBA-2,4-DBP-CHVE in PGMEA was formed, demonstrating solubility in a solvent that is commonly used in photoresist applications.

In vial (2), 2.5 milligrams of untreated pBEBA-2,4-DBP-CHVE (4.8 kDa) was dissolved in 100 microliters of tetrahydrofuran (THF).

In vial (3), 2.5 milligrams of pBEBA-2,4-DBP-CHVE (4.8 kDa) was dissolved in 100 microliters of THF. The vial was further treated with approximately 50 microliters of concentrated trifluoroacetic acid, upon which the content of the vial turned red.

In vial (4), 50 microliters of the untreated stock solution from vial (2) was added to 300 microliters of 0.26 N TMAH in water, upon which a thick precipitate of the insoluble polymer formed. This shows that untreated pBEBA-2,4-DBP-CHVE is insoluble in aqueous tetramethylammonium hydroxide (hereafter TMAH) solution (THF is miscible with 0.26 N aqueous TMAH).

In vial (5), addition of 50 microliters acid-treated polymer solution from vial (3) to 0.26 N aqueous TMAH resulted in a clear, orange-tinged solution, demonstrating that acid-treated (and fragmented) pBEBA-2,4-DBP-CHVE is soluble in aqueous TMAH.

The precipitate of vial (4) was isolated by filtration and analyzed by NMR, showing that the precipitate was intact pBEBA-2,4-DBP-CHVE polymer (a). The content of vial (5) was analyzed via liquid chromatograph-mass spectrometry (LC-MS), showing that the three main compounds by integration were [1,1':3',1''-terphenyl]-4,4',4''-triol (a), benzaldehyde (b) (no mass visible but identity confirmed by NMR), and several isomers of 4'',5'-bis(4-hydroxyphenyl)-[1,1':2', 1'':2'',1'''-quaterphenyl]-4,4',4''',5''-tetraol (c), which are oxidation products of [1,1':3',1''-terphenyl]-4,4',4''-triol. The integral of the LC trace at 250 nm of compounds (a), (b) and (c) together was determined to be >96% of the total integral of the LC trace.

The invention claimed is:

1. A polymer comprising a plurality of repeat units having the structure

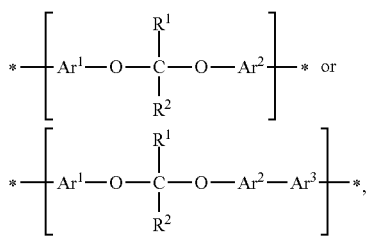

wherein
each occurrence of $R^1$ is independently hydrogen, unsubstituted or substituted $C_{1-18}$ linear or branched alkyl, unsubstituted or substituted $C_{3-18}$ cycloalkyl, unsubstituted or substituted $C_{6-18}$ aryl, or unsubstituted or substituted $C_{3-18}$ heteroaryl; each occurrence of $R^2$ is independently unsubstituted or substituted $C_{1-18}$ linear or branched alkyl, unsubstituted or substituted $C_{3-18}$ cycloalkyl, unsubstituted or substituted $C_{6-18}$ aryl, or unsubstituted or substituted $C_{3-18}$ heteroaryl, provided that at least one of $R^1$ and $R^2$ is not hydrogen; and $R^1$ and $R^2$ are optionally covalently linked to each other to form a ring that includes —$R^1$—C—$R^2$;

each occurrence of $Ar^1$, $Ar^2$, and $Ar^3$ is independently unsubstituted or substituted $C_{6-18}$ arylene, or unsubstituted or substituted $C_{3-18}$ heteroarylene; provided that at least one occurrence of $Ar^1$, $Ar^2$, and $Ar^3$ is substituted with at least one functional group selected from hydroxyl, acetal, ketal, ester, and lactone.

2. The polymer of claim 1, wherein, in at least one repeat unit, at least one of $Ar^1$, $Ar^2$ and $Ar^3$ is substituted with at least one hydroxyl.

3. The polymer of claim 1, wherein each occurrence of $Ar^1$, $Ar^2$, and $Ar^3$ is independently 1,3-phenylene or 1,4-phenylene.

4. The polymer of claim 1, wherein $Ar^1$ and $Ar^2$ are not further covalently linked with one another to form a ring structure that includes —$Ar^1$—O—C—O—$Ar^2$—.

5. The polymer claim 1, wherein
each occurrence of $R^1$ is hydrogen; and
each occurrence of $R^2$ is unsubstituted or substituted phenyl.

6. The polymer of claim 1, wherein the substructure

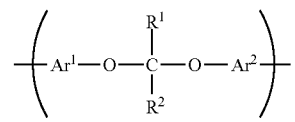

within any of the repeat units

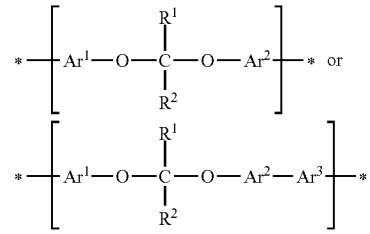

is selected from the group consisting of

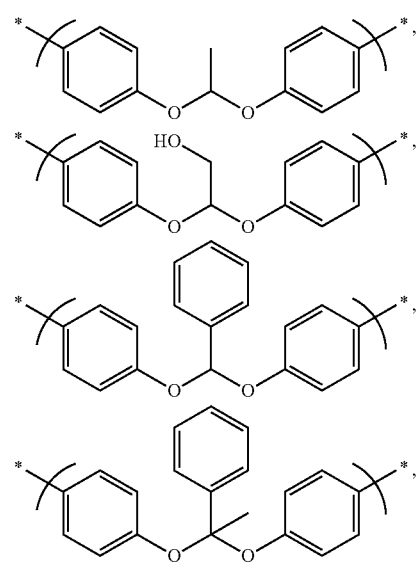

55
-continued
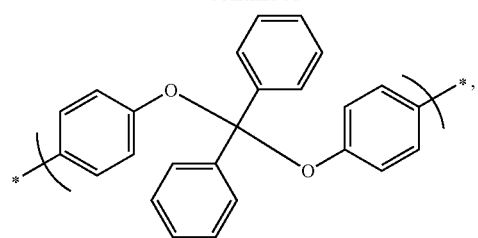
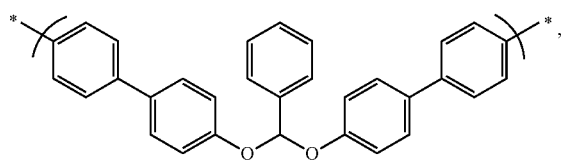
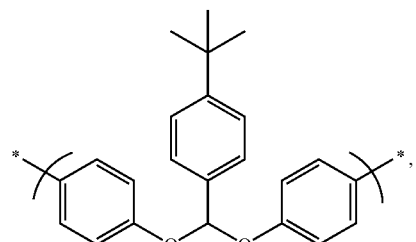
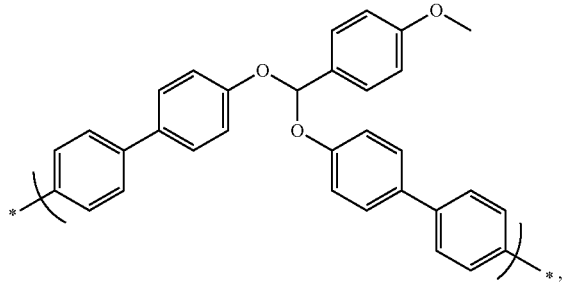
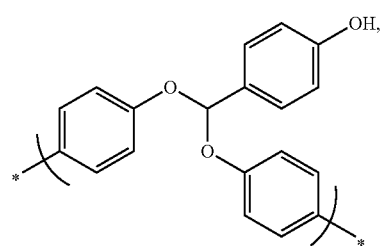
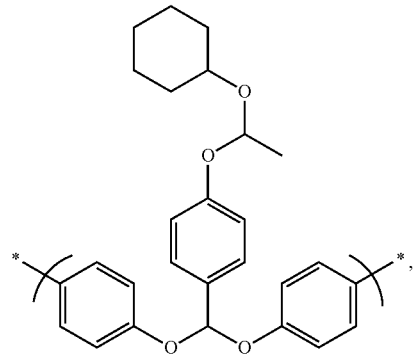
56
-continued
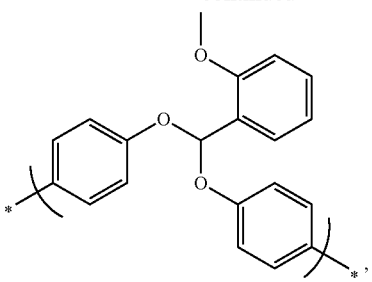
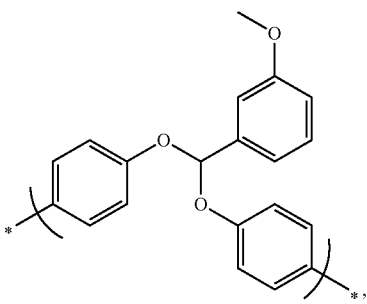
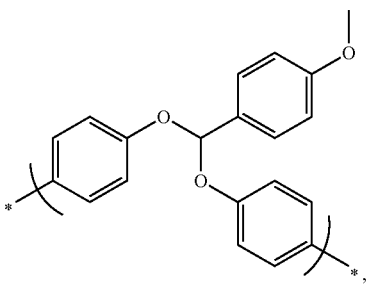
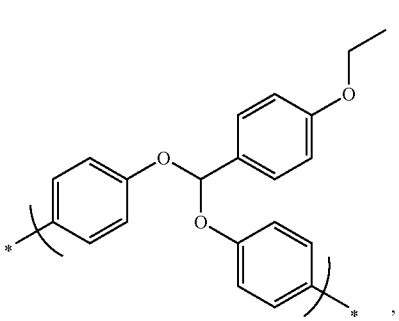
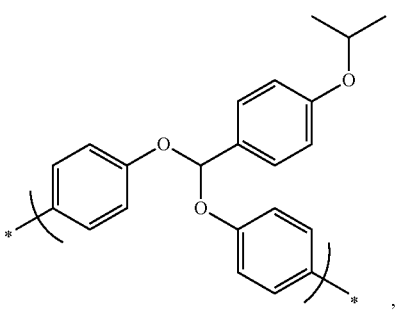

57
-continued
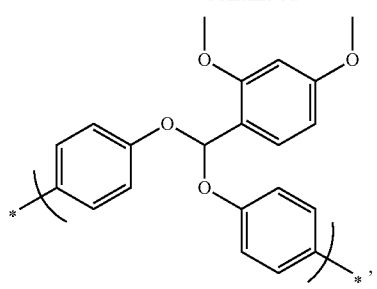
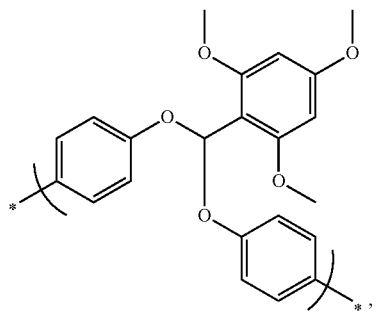
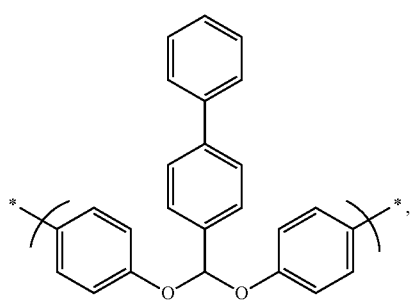
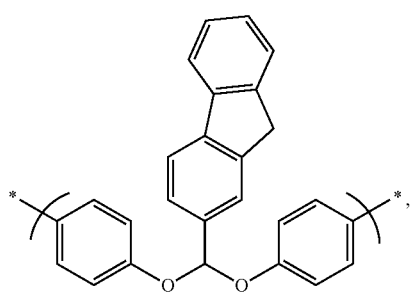
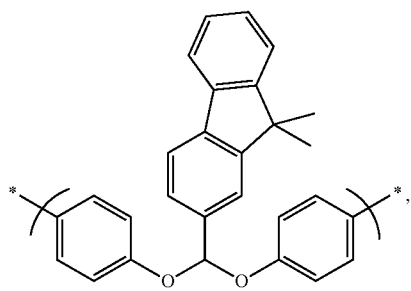
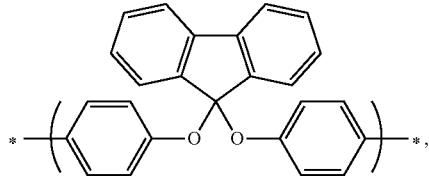
58
-continued
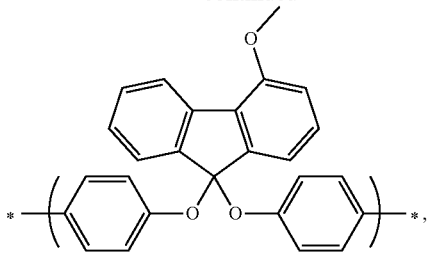
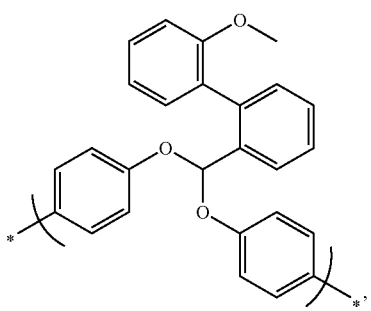
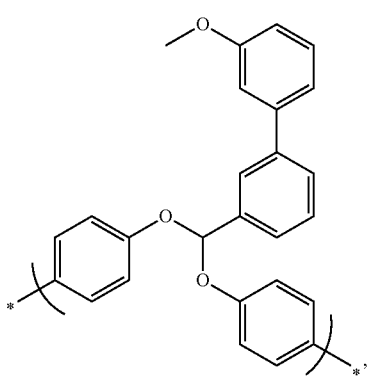
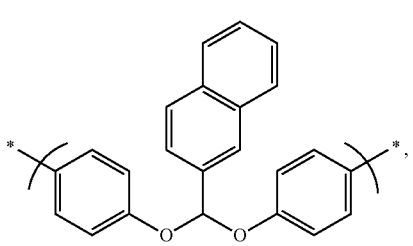
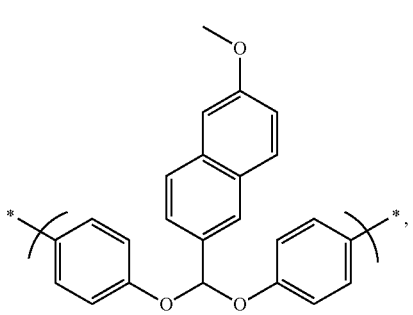

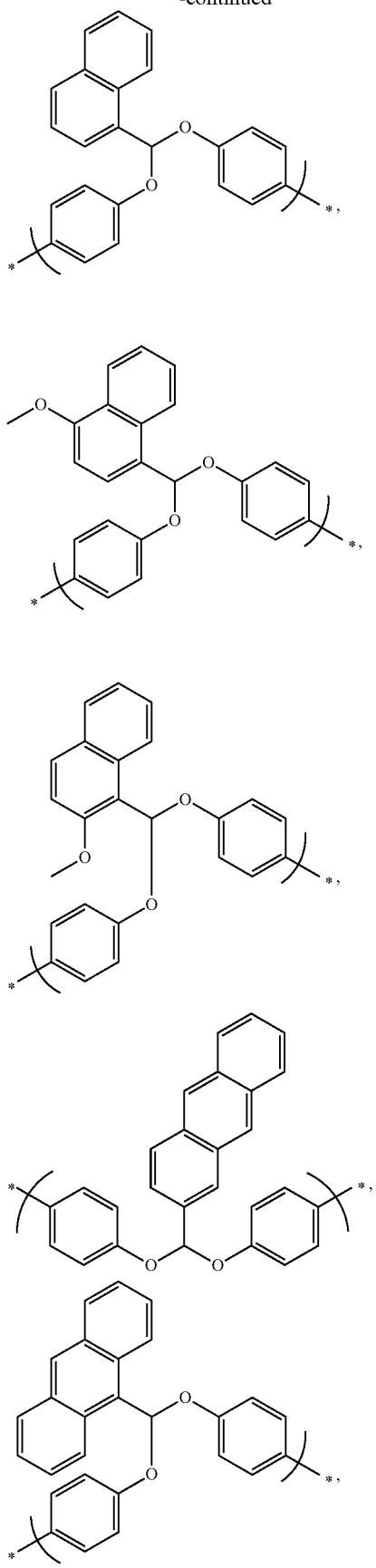
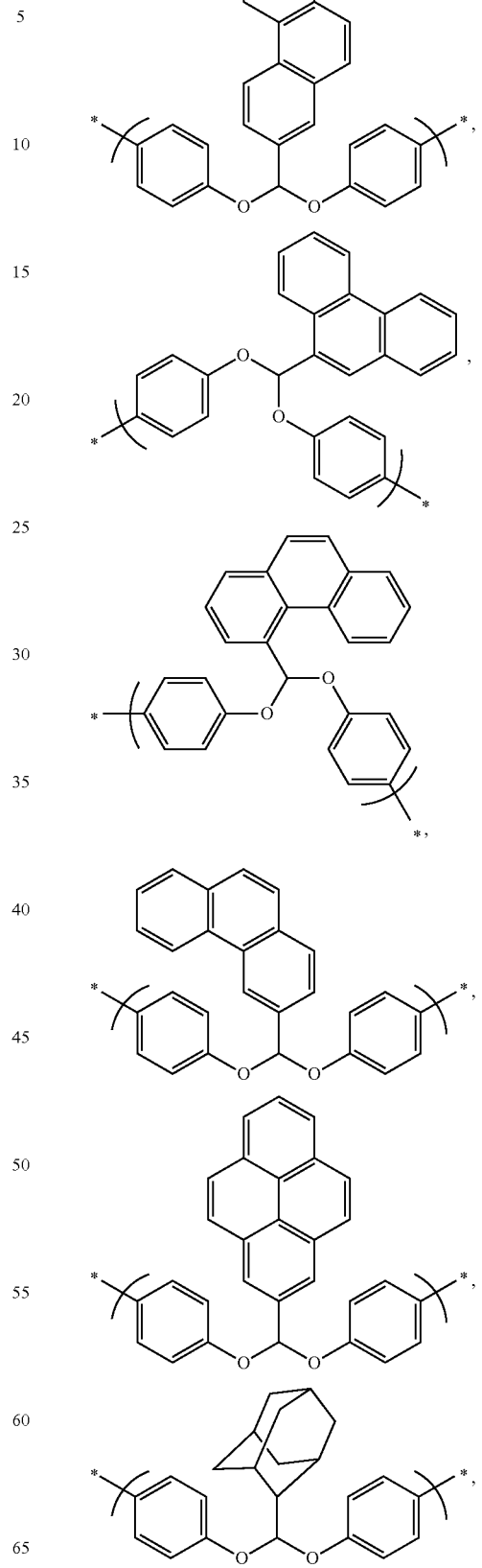

61
-continued
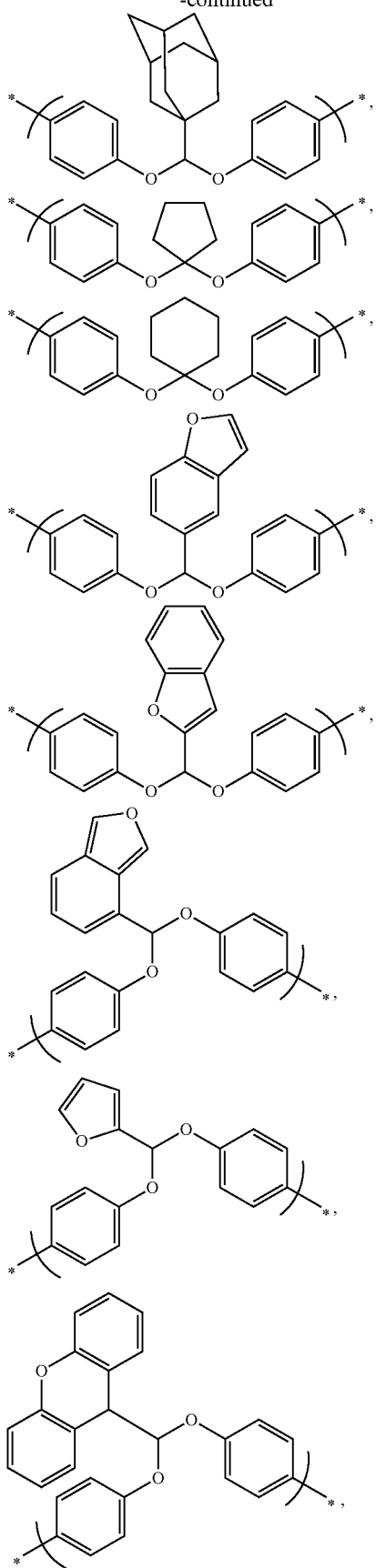
62
-continued
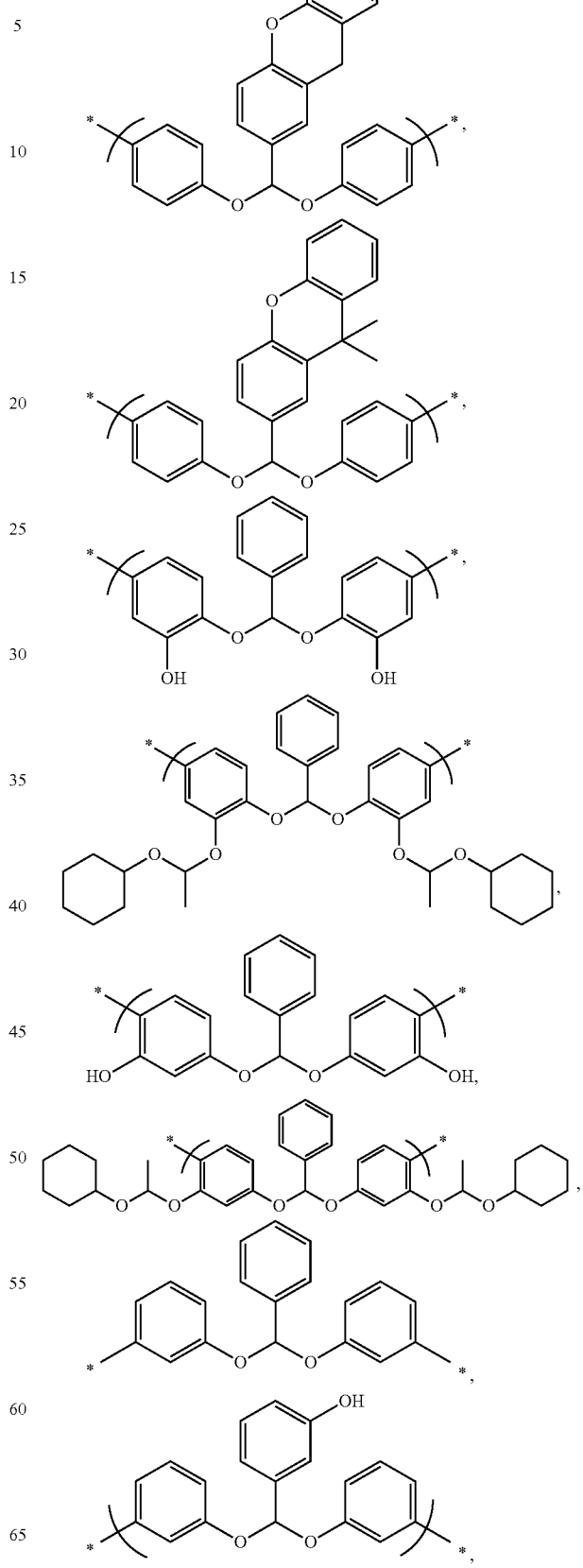

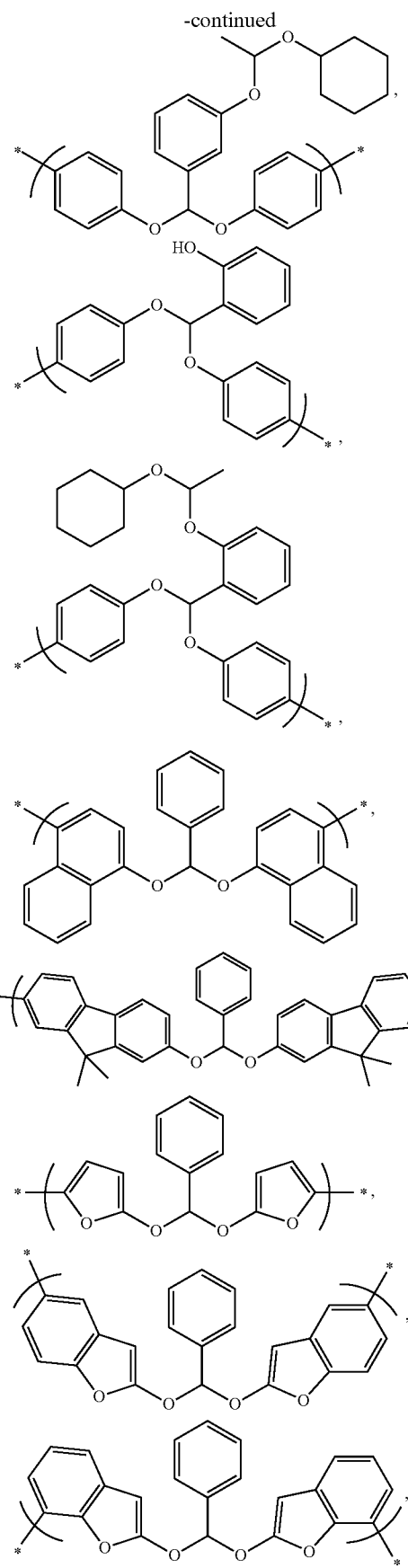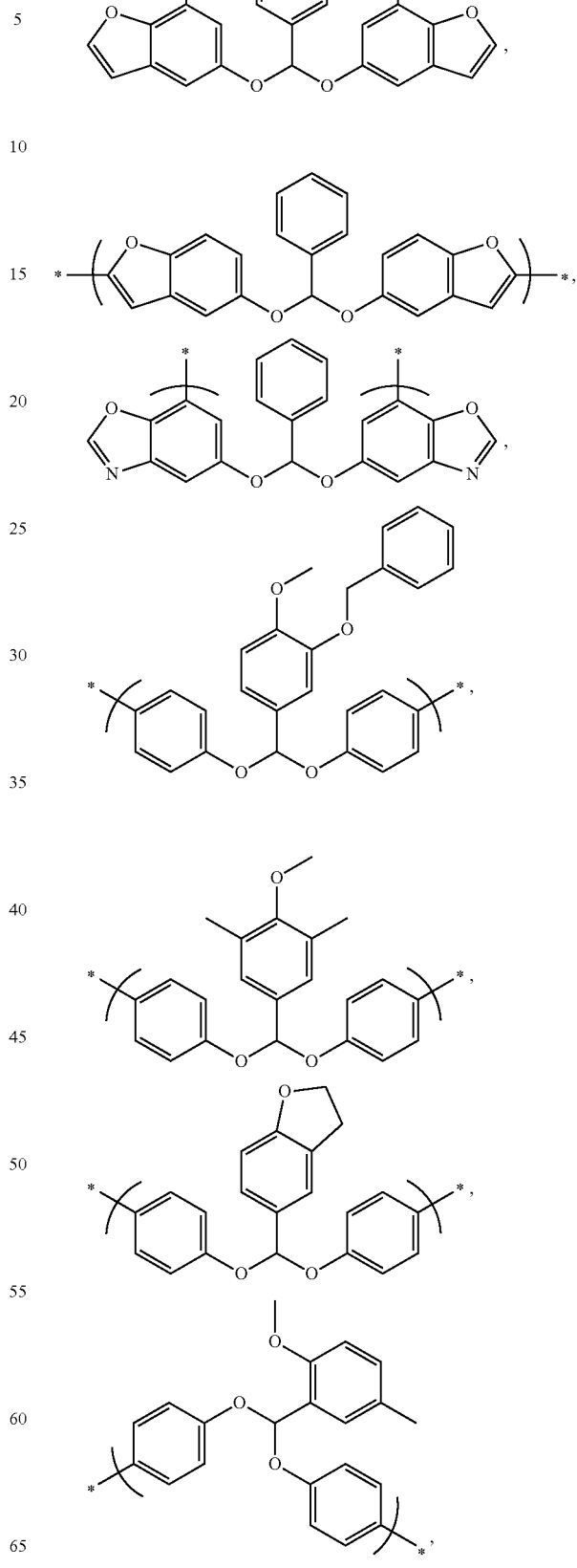

-continued
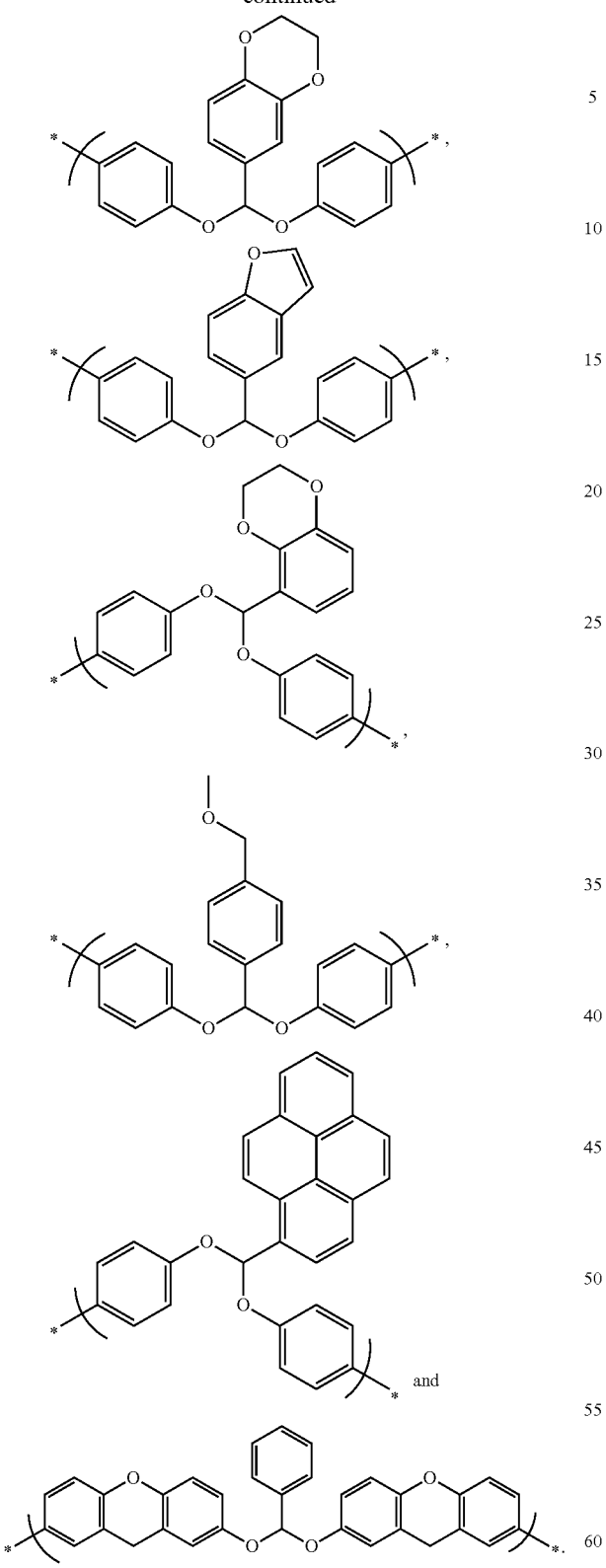
7. The polymer of claim 1, wherein the substructure
$$*\!\!-\!\!(\!\!\operatorname{Ar}^3\!\!)\!\!-\!\!*$$
within any of the repeat units
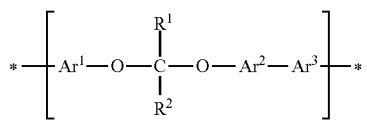
is selected from the group consisting of
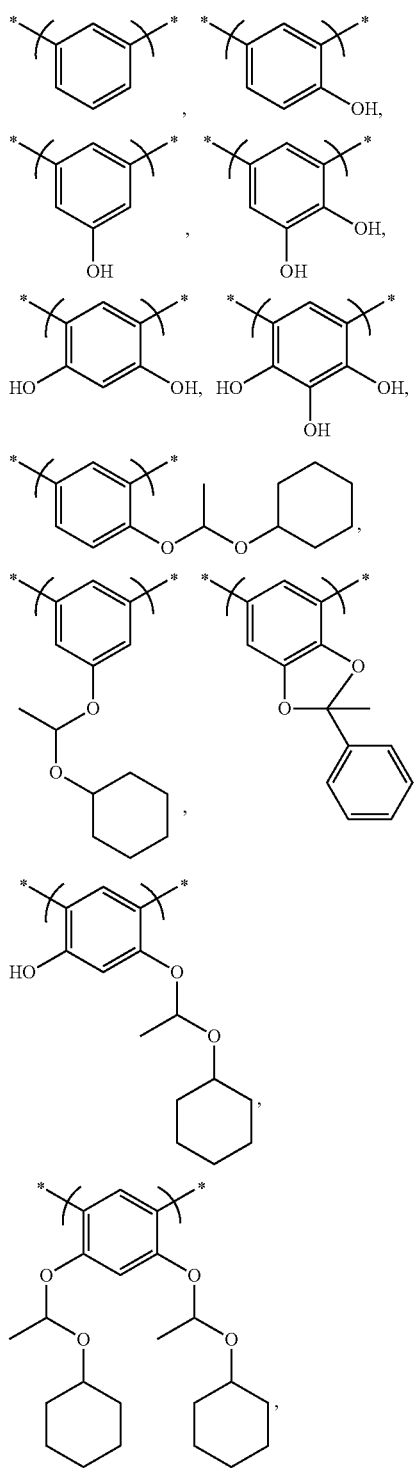

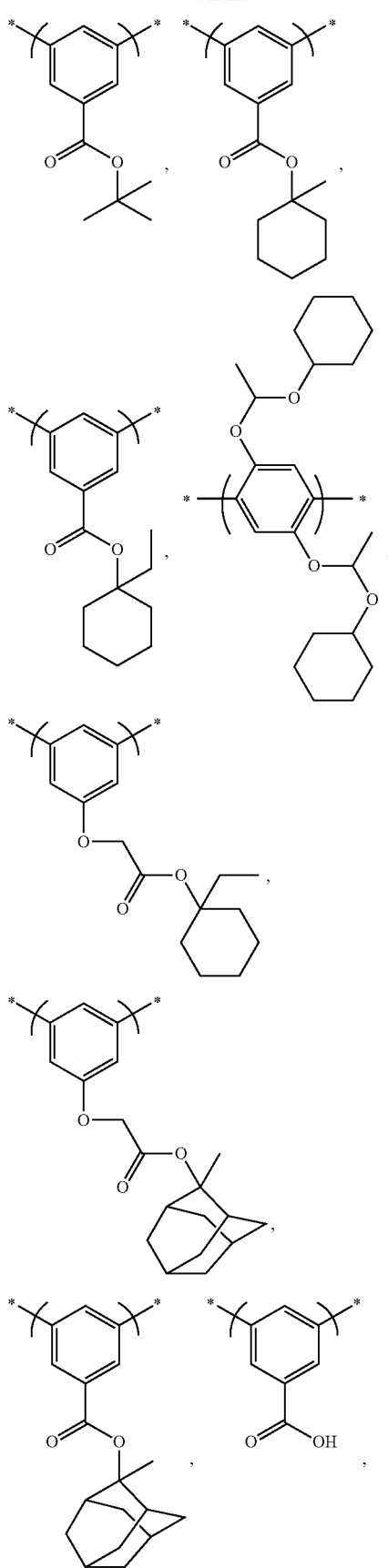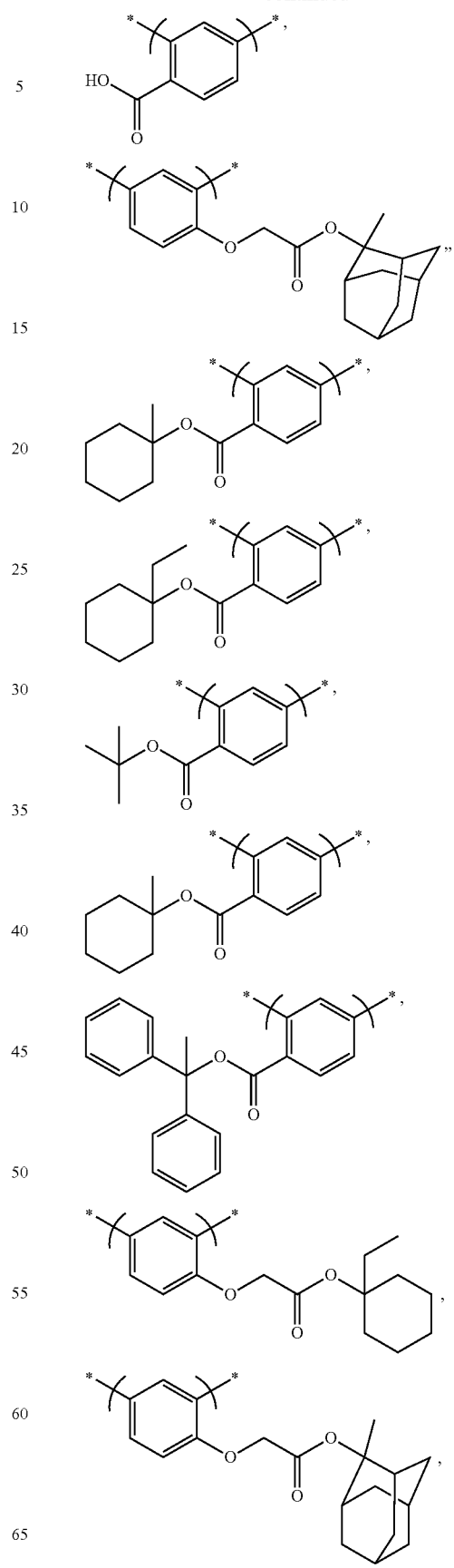

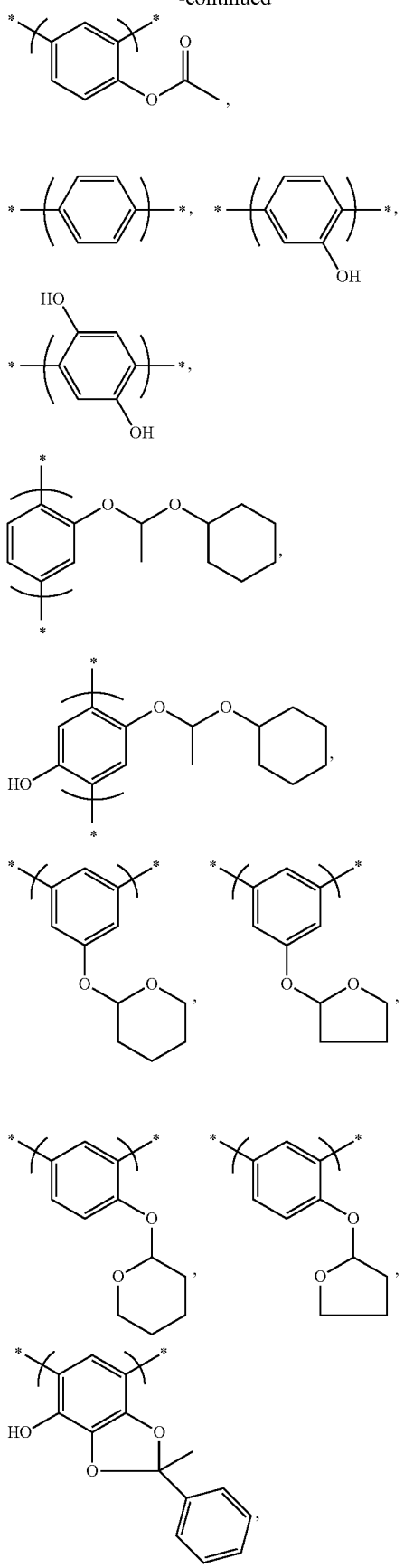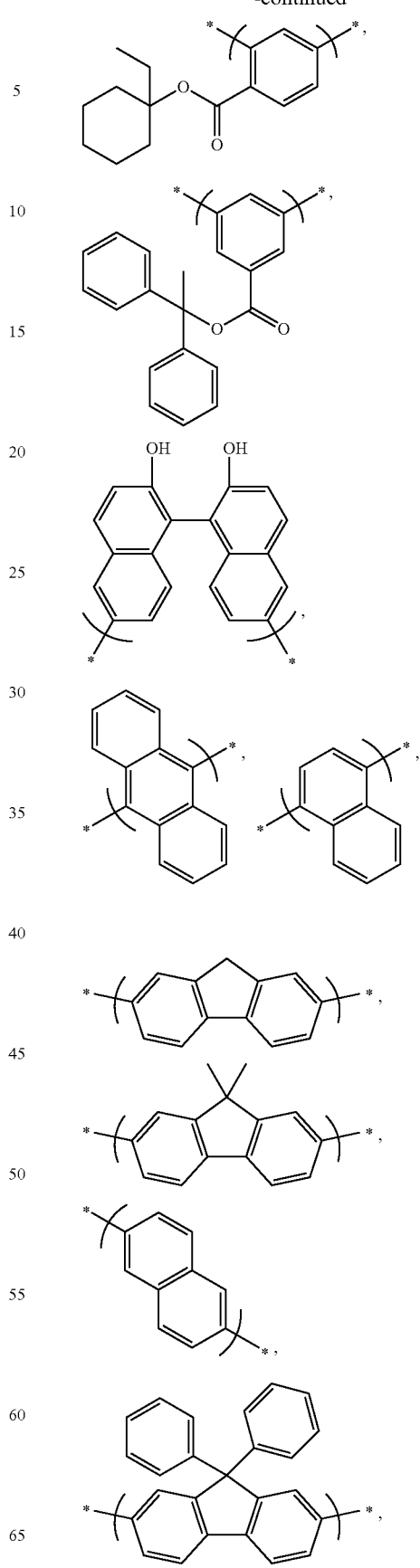

-continued

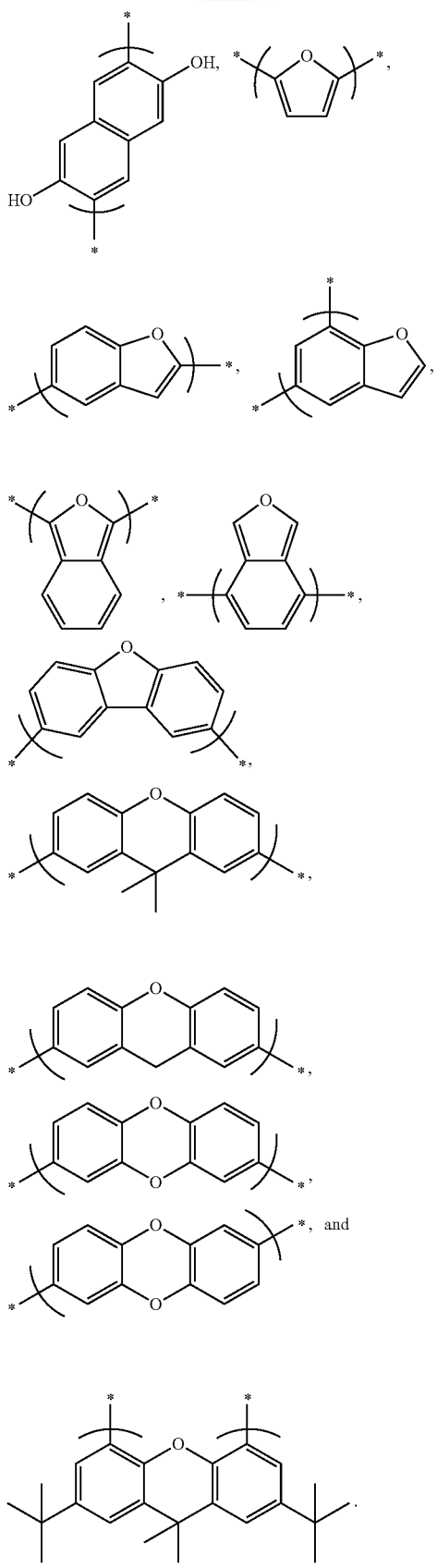

8. The polymer of claim 1, comprising a plurality of repeat units selected from

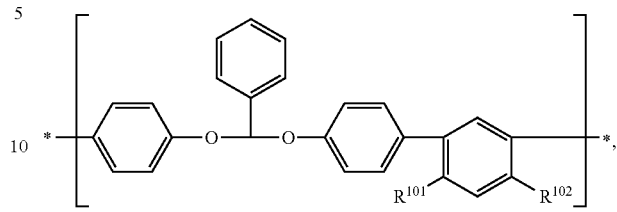

wherein $R^{101}$ is hydrogen or hydroxyl, and $R^{102}$ is hydroxyl when $R^{101}$ is hydrogen, or $R^{102}$ is hydrogen when $R^{101}$ is hydroxyl;

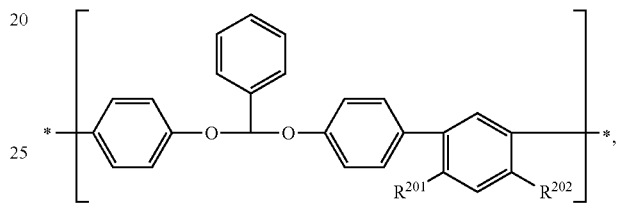

wherein $R^{201}$ is hydrogen or —OCHVE, and $R^{202}$ is —OCHVE when $R^{201}$ is hydrogen, or hydrogen when $R^{201}$ is —OCHVE, wherein —OCHVE is

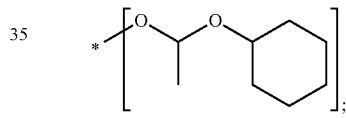

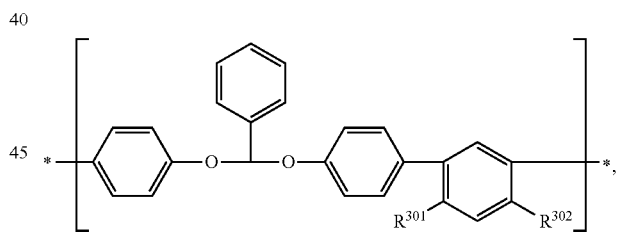

wherein $R^{301}$ is —O—C(=O)—CH$_3$ or —OCHVE, and $R^{302}$ is —OCHVE when $R^{301}$ is —OC(=O)—CH$_3$, or —OC(=O)—CH$_3$ when $R^{301}$ is —OCHVE;

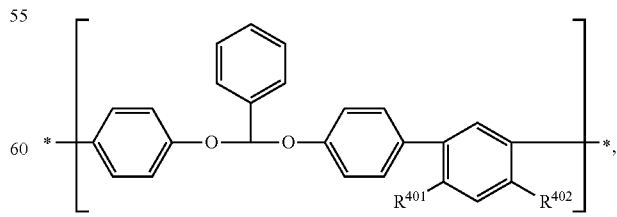

wherein $R^{401}$ is hydroxyl or —OCHVE, and $R^{402}$ is —OCHVE when $R^{201}$ is hydroxyl, or hydroxyl when $R^{401}$ is —OCHVE;

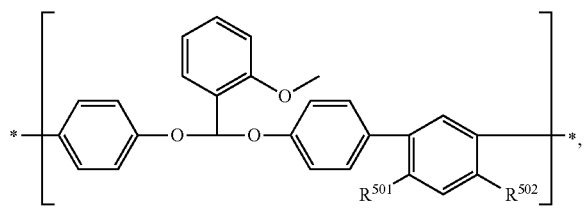

wherein $R^{501}$ is hydrogen or hydroxyl, and $R^{502}$ is hydroxyl when $R^{501}$ is hydrogen, or $R^{502}$ is hydrogen when $R^{501}$ is hydroxyl;

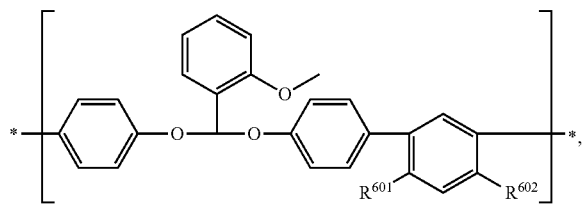

wherein $R^{601}$ is hydrogen or —OCHVE, and $R^{602}$ is —OCHVE when $R^{601}$ is hydrogen, or hydrogen when $R^{601}$ is —OCHVE;

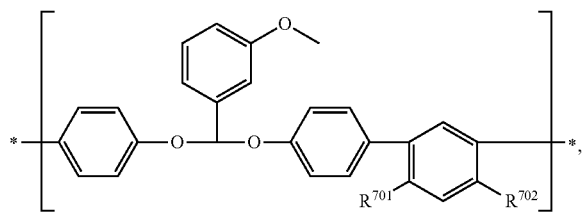

wherein $R^{701}$ is hydrogen or hydroxyl, and $R^{702}$ is hydroxyl when $R^{701}$ is hydrogen, or $R^{702}$ is hydrogen when $R^{701}$ is hydroxyl;

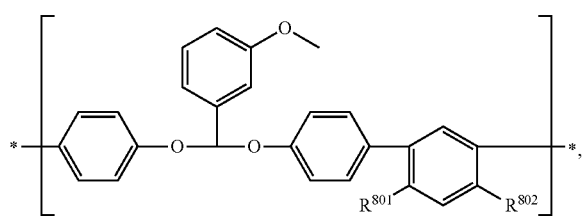

wherein $R^{801}$ is hydrogen or —OCHVE, and $R^{802}$ is —OCHVE when $R^{801}$ is hydrogen, or hydrogen when $R^{801}$ is —OCHVE;

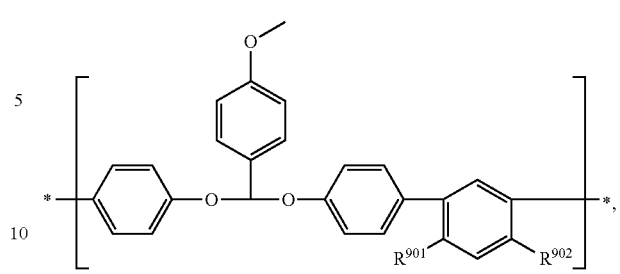

wherein $R^{901}$ is hydrogen or hydroxyl, and $R^{902}$ is hydroxyl when $R^{901}$ is hydrogen, or $R^{902}$ is hydrogen when $R^{901}$ is hydroxyl;

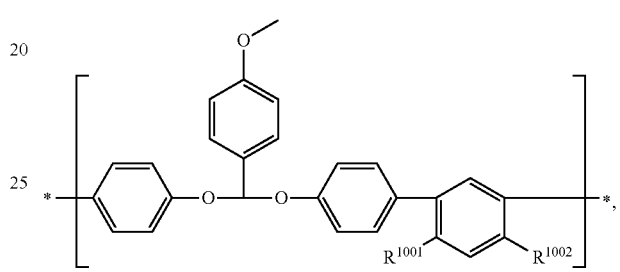

wherein $R^{1001}$ is hydrogen or —OCHVE, and $R^{1002}$ is —OCHVE when $R^{1001}$ is hydrogen, or hydrogen when $R^{1001}$ is —OCHVE;

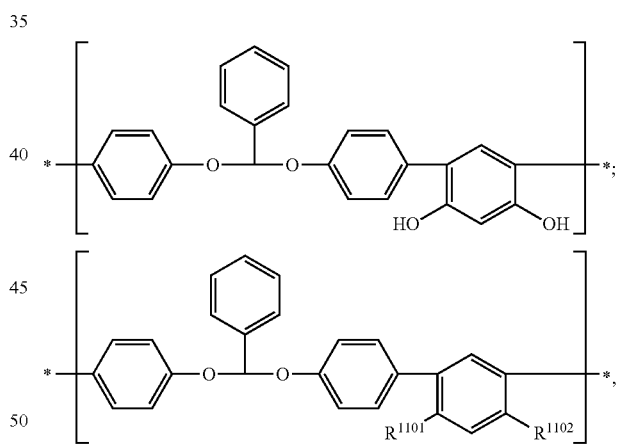

wherein $R^{1101}$ is hydrogen or —O—CH$_2$—C(=O)—O-Ad, and $R^{1102}$ is —O—CH$_2$—C(=O)—O-Ad when $R^{1101}$ is hydrogen, or hydrogen when $R^{1101}$ is —O—CH$_2$—C(=O)—O-Ad, wherein —O—CH$_2$—C(=O)—O-Ad is

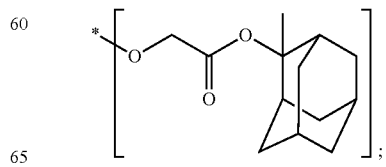

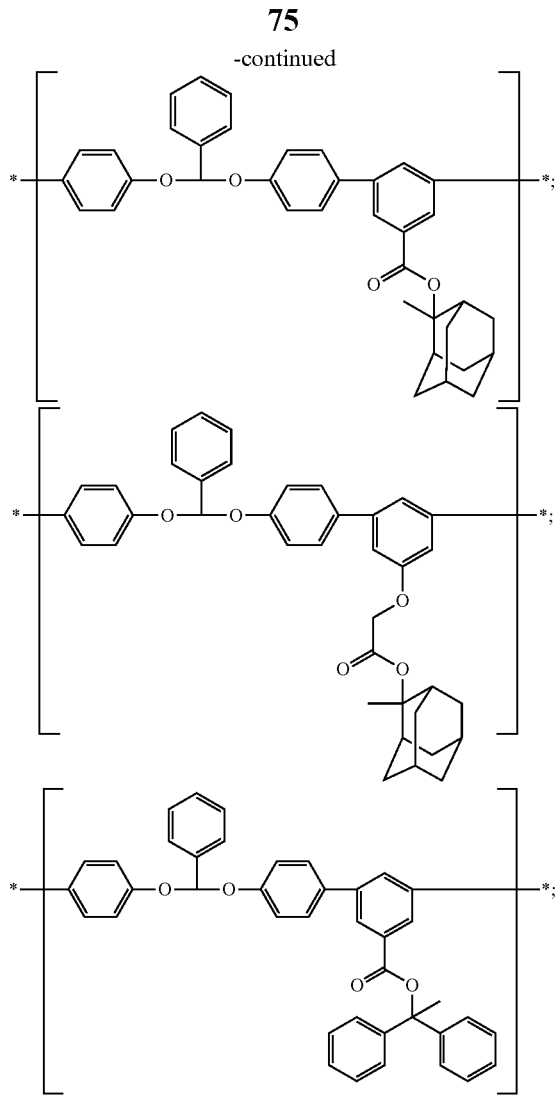

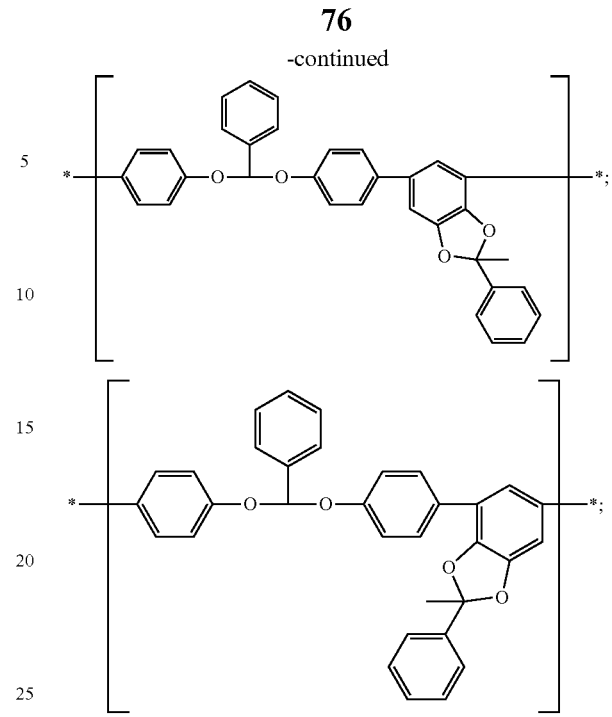

and combinations thereof.

9. The polymer of claim 1, wherein
    each occurrence of $Ar^1$ and $Ar^2$ is 1,4-phenylene;
    each occurrence of $Ar^3$ is unsubstituted or substituted 1,3-phenylene, wherein, in at least 40 mole percent of the plurality of repeat units, $Ar^3$ is substituted with at least one hydroxyl;
    each occurrence of $R^1$ is hydrogen; and
    each occurrence of $R^2$ is phenyl.

10. An article comprising the polymer of claim 1.

* * * * *